(12) United States Patent
Yasui et al.

(10) Patent No.: US 7,314,028 B2
(45) Date of Patent: Jan. 1, 2008

(54) CONTROL APPARATUS FOR INTERNAL COMBUSTION ENGINE

(75) Inventors: Yuji Yasui, Saitama-ken (JP); Hiroshi Tagami, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 52 days.

(21) Appl. No.: 11/446,296

(22) Filed: Jun. 5, 2006

(65) Prior Publication Data
US 2006/0283414 A1 Dec. 21, 2006

(30) Foreign Application Priority Data
Jun. 17, 2005 (JP) .............................. 2005-177750

(51) Int. Cl.
F01L 1/34 (2006.01)
(52) U.S. Cl. ............................... 123/90.16; 123/90.15; 123/403
(58) Field of Classification Search ............. 123/90.15, 123/90.16, 90.17, 90.18, 399, 403, 345, 346
See application file for complete search history.

(56) References Cited

U.S. PATENT DOCUMENTS

| | | | | |
|---|---|---|---|---|
| 7,124,717 | B2 * | 10/2006 | Gaessler et al. ............... | 123/64 |
| 2001/0042529 | A1 | 11/2001 | Kawasaki et al. | |
| 2005/0005908 | A1 | 1/2005 | Tanei et al. | |
| 2005/0005923 | A1 | 1/2005 | Herrin | |

FOREIGN PATENT DOCUMENTS

| | | |
|---|---|---|
| DE | 101 49 477 A1 | 4/2003 |
| DE | 103 55 481 A1 | 6/2004 |
| DE | 10 2004 001 825 A1 | 9/2004 |
| EP | 1 104 850 A2 | 6/2001 |
| EP | 1 211 402 A2 | 6/2001 |
| FR | 2 855 845 A1 | 12/2004 |
| JP | 8 177432 A | 7/1996 |
| JP | 8-177433 A | 7/1996 |
| JP | 2005-226511 A | 8/2005 |

* cited by examiner

*Primary Examiner*—Ching Chang
(74) *Attorney, Agent, or Firm*—Arent Fox LLP

(57) ABSTRACT

A control apparatus for an internal combustion engine for controlling the engine while compensating for a deviation of an intake air amount from the proper value, caused by the thermal expansion and contraction of a variable intake mechanism thereof, which makes it possible to improve the control accuracy, make the engine compact in size, increase the degree of freedom of design, and reduce manufacturing costs. An ECU of an control apparatus of the engine calculates an FF correction value based on a thermodynamic model of a variable valve lift mechanism, calculates an FB correction value according to an air-fuel ratio correction coefficient and an actual air-fuel ratio, calculates a lift correction value as the difference between the FF correction value and the FB correction value or as a value of the FF correction value, corrects the valve lift by the lift correction value to thereby calculate a corrected valve lift, and carries out air-fuel ratio control and ignition timing control according to the corrected valve lift.

16 Claims, 43 Drawing Sheets

FIG. 11

| Gcyl \ AP | AP1 · · · · · · · · · · APj |
|---|---|
| Gcyl1 | KCMD11 · · · · · · · · · · KCMD1j |
| ⋮ | ⋮            ⋮ |
| Gcyli | KCMDi1 · · · · · · · · · · KCMDij |

F I G. 1 6
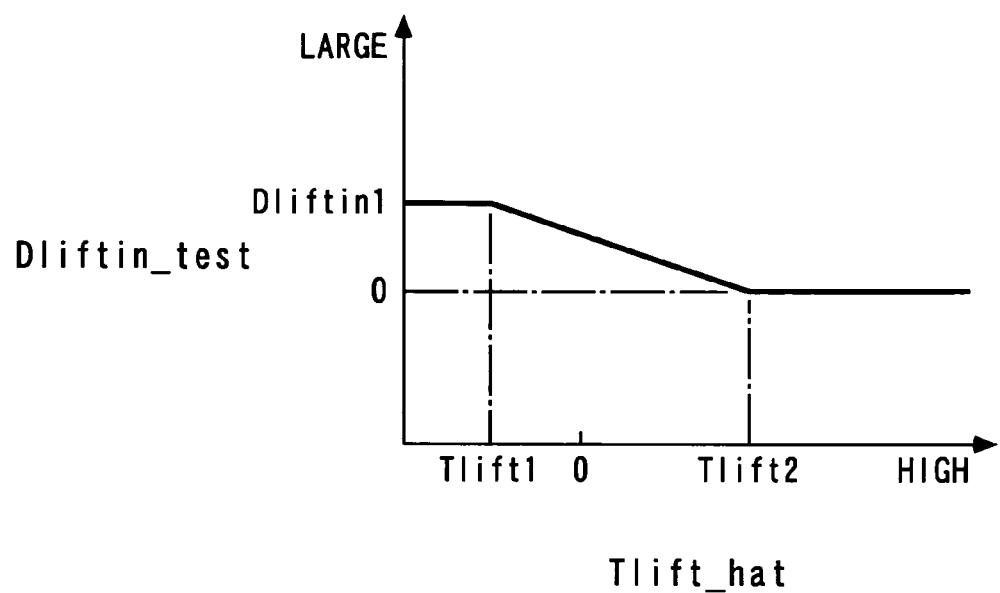

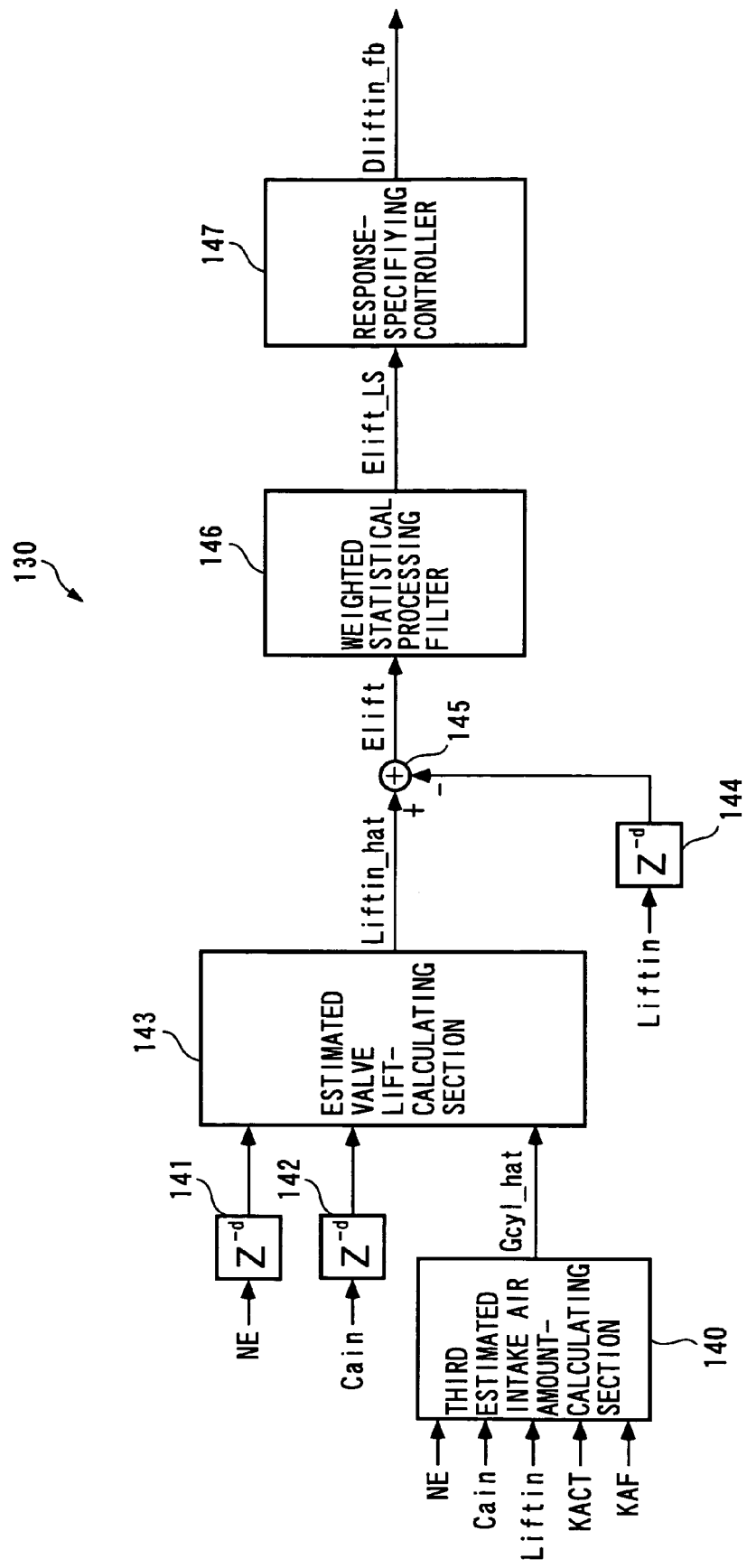

F I G. 2 4
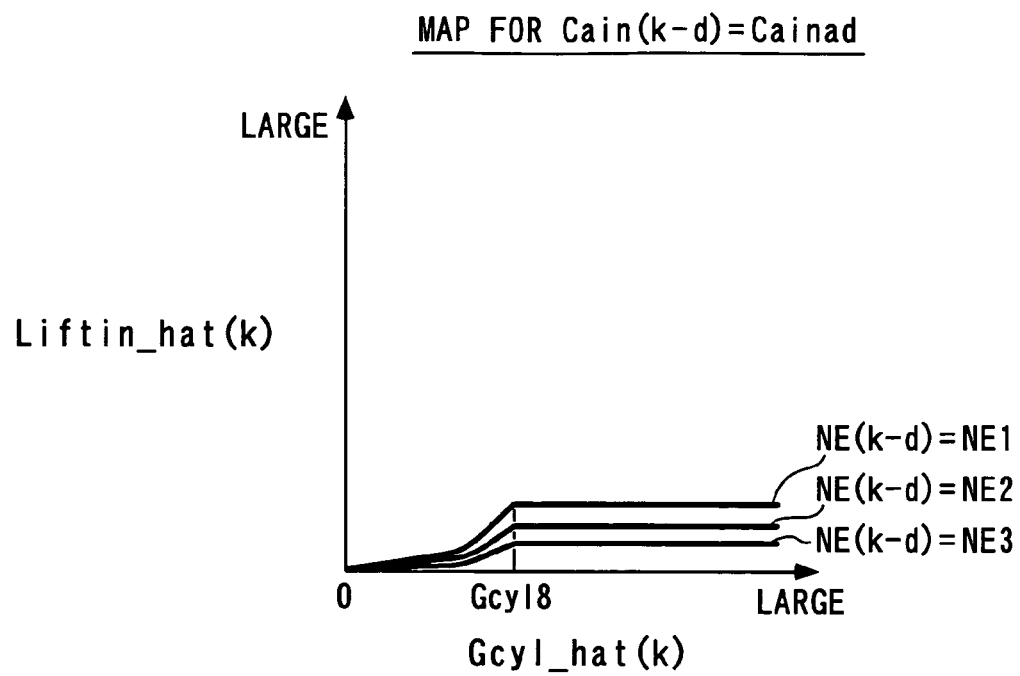
F I G. 2 5
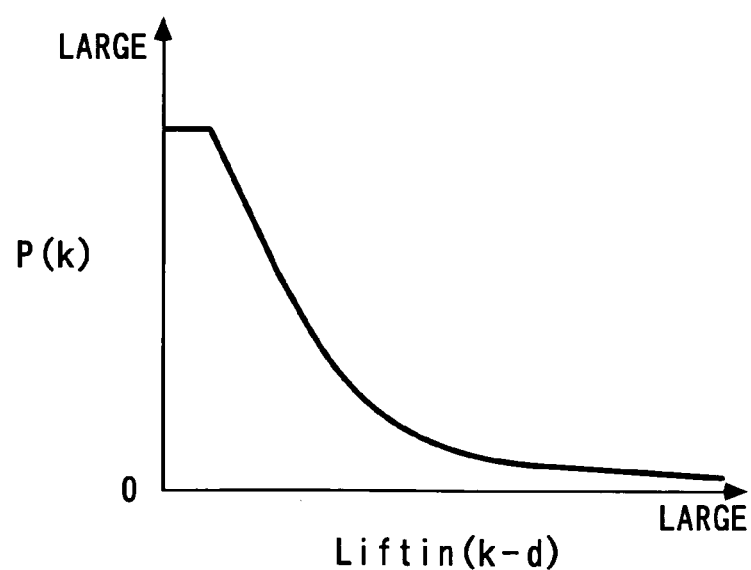

F I G. 5 3
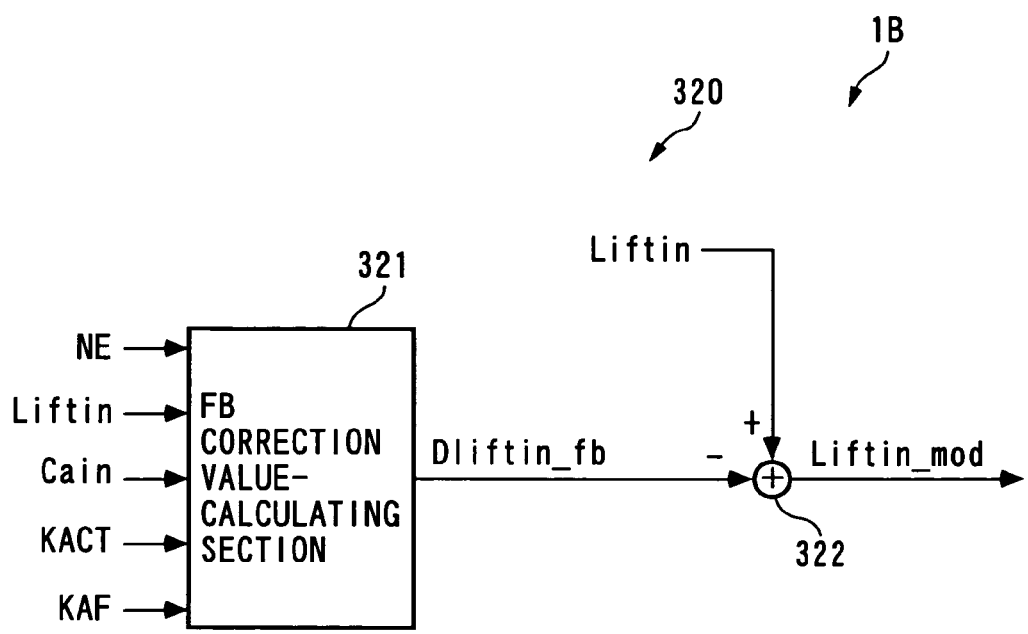

CONTROL APPARATUS FOR INTERNAL COMBUSTION ENGINE

BACKGROUND OF THE INVENTION

1. Field of the Invention

The present invention relates to a control apparatus for an internal combustion engine in which the amount of intake air drawn into cylinders is changed by a variable intake mechanism thereof.

2. Description of the Related Art

Conventionally, for an internal combustion engine in which the amount of intake air drawn into cylinders is changed by a variable intake mechanism thereof, there has been proposed a control apparatus that controls the amount of fuel injection, in Japanese Laid-Open Patent Publication (Kokai) No. 2004-353480. As the variable intake mechanism, the engine is equipped with a variable valve mechanism which is comprised of an actuator, a control shaft that is axially driven by the actuator, and a swinging cam that is driven by the control shaft such that the cam swings about the axis of the control shaft. The swinging cam is provided between an intake cam and a rocker arm, and has an input part and an output part which are in contact with the intake cam and the rocker arm, respectively. In this variable valve mechanism, when the control shaft is axially actuated by the actuator, the input part and the output part of the swinging cam swing about the axis of the control shaft in different directions, whereby the lift of the intake valves (hereinafter referred to as "the valve lift") and valve timing are changed.

In the variable valve mechanism described above, when the variable valve mechanism undergoes thermal expansion and contraction as the temperature of the variable valve mechanism changes, the valve lift and valve timing change, so that the accuracy of the fuel injection control degrades. Therefore, to carry out the fuel injection control while compensating for the influence of the thermal expansion and contraction of the variable valve mechanism, according to an example illustrated in FIGS. 8 to 11 of Japanese Laid-Open Patent Publication (Kokai) No. 2004-353480, the fuel injection amount is determined as follows:

First, target values of the valve lift and valve timing are determined according to the opening of an accelerator pedal, and the fuel injection amount is determined based on the valve lift and valve timing. Then, a temperature-dependent correction ratio is calculated according to the engine coolant temperature, and a timing correction ratio is calculated according to the target value of valve timing. The temperature-dependent correction ratio corrects or eliminates the influence of the thermal expansion and contraction of the variable valve mechanism on the intake air amount, while the timing correction ratio corrects a change in the degree of influence of the thermal expansion and contraction on the intake air amount, which is caused by a change in valve timing. Then, the fuel injection amount is multiplied by the two correction ratios to determine the final fuel injection amount.

In the case of the variable valve mechanism described above, the temperature thereof is not only changed by the influence of the engine coolant temperature but also by other temperature parameters, and hence the engine coolant temperature does not accurately or correctly reflect the degree of thermal expansion and contraction of the variable valve mechanism. What is more, after stoppage of the engine, the temperature of the variable valve mechanism sharply lowers due to dissipation of heat into the atmosphere, whereas the engine coolant temperature is more difficult to lower than the temperature of the variable valve mechanism due to the differences in heat capacity and specific heat, and hence when the engine is restarted after the stoppage, the correlation between the temperature of the variable valve mechanism and the engine coolant temperature becomes low. However, in carrying out the correction dependent on the temperature of the variable valve mechanism, the control apparatus proposed in Japanese Laid-Open Patent Publication (Kokai) No. 2004-353480 calculates the temperature-dependent correction ratio only based on the engine coolant temperature, and hence is incapable of properly performing the correction depending on the degree of thermal expansion and contraction of the variable valve mechanism, which degrades the accuracy of the control.

As a solution to the problem described above, it is contemplated as described in Paragraph Number [0022] of Japanese Laid-Open Patent Publication (Kokai) No. 2004-353480 that the temperature of the thermal expansion and contraction of the variable valve mechanism is directly detected by a temperature sensor or a strain sensor. However, this configuration requires a sensor for directly detecting the temperature of the thermal expansion and contraction of the variable valve mechanism to be provided separately in the vicinity of the variable valve mechanism of the engine, which brings about the problems of an increase in the size of the engine, a lowered degree of freedom of design, and an increase in the manufacturing costs.

Further, the variable intake mechanism including the variable valve mechanism suffers from the problem that due to other events than the thermal expansion and contraction, such as wear of components of the variable intake mechanism, attachment of stain, and play produced by aging, the intake air amount sometimes deviates from the proper value. In such a case, even when the degree of the thermal expansion and contraction of the variable intake mechanism is corrected, it is impossible to correct the deviation of the intake air amount caused by the other events than the thermal expansion and contraction, which can degrade the control accuracy.

SUMMARY OF THE INVENTION

It is an object of the present invention to provide a control apparatus for an internal combustion engine for controlling the engine while compensating for a deviation of the amount of intake air from the proper value, caused by the thermal expansion and contraction of a variable intake mechanism thereof, which makes it possible to improve the control accuracy, make the engine compact in size, increase the degree of freedom of design, and reduce manufacturing costs.

To attain the above object, in a first aspect of the present invention, there is provided a control apparatus for an internal combustion engine in which an amount of intake air drawn into a cylinder is changed by a variable intake mechanism thereof, comprising estimated mechanism temperature-calculating means for calculating an estimated value of temperature of the variable intake mechanism as an estimated mechanism temperature, based on a thermodynamic model formed by thermodynamically modeling the variable intake mechanism, operating state parameter-detecting means for detecting an operating state parameter indicative of an operating state of the variable intake mechanism, correction means for correcting a detected value of the operating state parameter according to the estimated mechanism temperature to thereby calculate a corrected parameter, and control means for controlling the engine according to the corrected parameter.

With the configuration of the control apparatus according to the first aspect of the present invention, an estimated mechanism temperature is calculated based on a thermodynamic model formed by thermodynamically modeling a variable intake mechanism, and a corrected parameter is calculated by correcting the detected value of an operating state parameter according to the estimated mechanism temperature. In this case, the variable intake mechanism changes the amount of intake air drawn into the cylinders, and hence the operating state parameter indicative of the operating state of the variable valve mechanism can be considered as a parameter indicative of the amount of intake air drawn into the cylinders. Therefore, if the detected value of the operating state parameter deviates from the proper value due to the thermal expansion and contraction of the variable intake mechanism, the amount of intake air deviates from the proper value. However, the control apparatus according to the first aspect of the present invention controls the engine based on the corrected parameter calculated based on the thermodynamic model, and hence it is possible to control the engine while compensating for the deviation of the amount of intake air due to the thermal expansion and contraction of variable intake mechanism without using a special sensor for directly detecting the temperature or the degree of thermal expansion and contraction of the variable valve mechanism, and therefore, it is possible to make the engine compact in size, increase the degree of freedom of design, and reduce manufacturing costs. In addition, by properly configuring the thermodynamic model, it is possible to enhance the estimation accuracy of the estimated mechanism temperature, and hence by correcting the operating state parameter according to the estimated mechanism temperature high in estimation accuracy, it is possible to improve the correction accuracy compared with the conventional cases where the correction is carried out only using the engine coolant temperature. As a result, it is possible to enhance the control accuracy. (It should be noted that throughout the specification, the term "detect" e.g. in "detect a parameter" is not limited to meaning direct detection of the parameter using a sensor or the like but also includes calculation of the parameter).

Preferably, the thermodynamic model is a model which defines a relationship between the estimated mechanism temperature, a temperature parameter indicative of a temperature condition of the engine, atmosphere temperature, and a load parameter indicative of load on the engine.

With the configuration of the preferred embodiment, the estimated mechanism temperature is calculated based on the thermodynamic model which defines relationship between the estimated mechanism temperature, a temperature parameter indicative of a temperature condition of the engine, atmosphere temperature, and a load parameter indicative of load on the engine. In this case, the load on the engine reflects a heated condition of the engine caused by the operation thereof, and hence the load parameter can be considered as a parameter indicative of influence of the heated condition of the engine on the temperature of the variable intake mechanism, and further, the temperature parameter and the atmosphere temperature themselves can be considered as parameters which affect the temperature of the variable intake mechanism. Therefore, by using the thermodynamic model that defines the relationship between various parameters affecting the temperature of the variable valve mechanism, and the estimated mechanism temperature, it is possible to improve the estimation accuracy of the estimated mechanism temperature, which makes it possible to positively improve the calculation accuracy of the corrected parameter.

Preferably, the control means controls at least one of the amount of intake air of the engine, an air-fuel ratio of the engine, an amount of fuel supplied to the engine, and ignition timing of the engine.

With the configuration of the preferred embodiment, according to the corrected parameter calculated as described above, at least one of the amount of intake air of the engine, the air-fuel ratio of the engine, the amount of fuel supplied to the engine, and ignition timing of the engine is controlled, and hence it is possible to ensure a high control accuracy of those types of control.

To attain the above object, in a second aspect of the present invention, there is provided a control apparatus for an internal combustion engine in which an amount of intake air drawn into a cylinder is changed by a variable intake mechanism thereof, comprising operating state parameter-detecting means for detecting an operating state parameter indicative of an operating state of the variable intake mechanism, air-fuel ratio parameter-detecting means for detecting an air-fuel ratio parameter indicative of an air-fuel ratio of exhaust gases flowing through an exhaust passage of the engine, target air-fuel ratio-calculating means for calculating a target air-fuel ratio which serves as a target of air-fuel ratio control of a mixture supplied to the engine, air-fuel ratio control parameter-calculating means for calculating an air-fuel ratio control parameter for controlling the air-fuel ratio of the mixture such that the air-fuel ratio becomes equal to the target air-fuel ratio, correction means for correcting a detected value of the operating state parameter according to the air-fuel ratio control parameter and the air-fuel ratio parameter to thereby calculate a corrected parameter, and fuel amount-determining means for determining an amount of fuel to be supplied to the engine according to the corrected parameter and the air-fuel ratio control parameter.

With the configuration of the control apparatus according to the second aspect of the present invention, an air-fuel ratio control parameter for controlling the air-fuel ratio of a mixture supplied to the engine such that the air-fuel ratio becomes equal to a target air-fuel ratio is calculated according to an air-fuel ratio parameter indicative of an air-fuel ratio of exhaust gases flowing through an exhaust passage of the engine, and the detected value of an operating state parameter is corrected by the air-fuel ratio control parameter and the air-fuel ratio parameter. The amount of fuel supplied to a combustion chamber is determined according to the corrected parameter and the air-fuel ratio control parameter. In this case, the amount of intake air drawn into the cylinder is changed by the variable intake mechanism, and hence the operating state parameter indicative of the operating state of the variable valve mechanism can be considered as a parameter indicative of the amount of intake air drawn into the cylinder. Therefore, during execution of the air-fuel ratio control, if the detected value of the operating state parameter deviates from the actual value, the amount of intake air deviates from the proper value, which causes the actual air-fuel ratio of the mixture to deviate toward the lean side or the rich side with respect to the target air-fuel ratio. On the other hand, the air-fuel ratio control parameter is calculated as a value for controlling the air-fuel ratio of the mixture according to the air-fuel ratio parameter such that the air-fuel ratio becomes equal to the target air-fuel ratio, i.e. as a value indicative of a direction of control of the air-fuel ratio which is controlled toward the lean side or the rich side, and hence the air-fuel ratio control parameter reflects the aforementioned deviation of the air-fuel ratio. Further, the air-fuel ratio parameter is a value indicative of the air-fuel ratio of exhaust gases flowing through the exhaust passage of the engine, and hence when the air-fuel ratio of the mixture is controlled such that it becomes equal to the target air-fuel ratio, it is also detected as a value reflecting the aforementioned deviation of the air-fuel ratio.

Therefore, by correcting the operating state parameter according to the air-fuel ratio control parameter and the air-fuel ratio parameter described above, the corrected parameter can be calculated as a value in which the deviation between the detected value and the actual value of the operating state parameter, i.e. the deviation of the amount of intake air from the proper value is properly corrected or eliminated. As a result, even when there is a deviation of the detected value of the operating state parameter from the actual value due to a drift of the detected value in the operating state parameter-detecting means, wear of components of the variable intake mechanism, attachment of stain, and play produced by aging, in addition to a thermal expansion and contraction of the variable intake mechanism, it is possible to properly determine the fuel amount while compensating for the deviation. That is, it is possible to properly control the amount of fuel supplied to the engine and the air-fuel ratio of the engine while compensating for the deviation of the amount of intake air caused by the thermal expansion and contraction of the variable intake mechanism and other events, without using a special sensor or the like for directly detecting the temperature of the variable valve mechanism or the degree of the thermal expansion and contraction. This makes it possible to improve the control accuracy, make the engine compact in size, increase the degree of freedom of design, and reduce manufacturing costs.

To attain the above object, in a third aspect of the present invention, there is provided a control apparatus for an internal combustion engine in which an amount of intake air drawn into a cylinder is changed by a variable intake mechanism thereof, comprising operating state parameter-detecting means for detecting an operating state parameter indicative of an operating state of the variable intake mechanism, air-fuel ratio parameter-detecting means for detecting an air-fuel ratio parameter indicative of an air-fuel ratio of exhaust gases flowing through an exhaust passage of the engine, target air-fuel ratio-calculating means for calculating a target air-fuel ratio which serves as a target of air-fuel ratio control of a mixture supplied to the engine, air-fuel ratio control means for controlling an air-fuel ratio of the mixture supplied to the engine according to the air-fuel ratio parameter such that the air-fuel ratio becomes equal to the target air-fuel ratio, correction means for correcting a detected value of the operating state parameter according to an air-fuel ratio control parameter indicative of a state of control of the air-fuel ratio by the air-fuel ratio control means and the air-fuel ratio parameter to thereby calculate a corrected parameter, and ignition timing-determining means for determining ignition timing of the mixture supplied to the engine according to the corrected parameter.

With the configuration of the control apparatus according to the third aspect of the present invention, air-fuel ratio control means controls the air-fuel ratio of a mixture according to an air-fuel ratio parameter indicative of the air-fuel ratio of exhaust gases flowing through an exhaust passage of the engine, such that the air-fuel ratio becomes equal to a target air-fuel ratio, and a corrected parameter is calculated by correcting the detected value of an operating state parameter indicative of an operating state of a variable valve mechanism according to an air-fuel ratio control parameter indicative of a state of control of the air-fuel ratio of the mixture by the air-fuel ratio control means and the air-fuel ratio parameter. Ignition timing is determined according to the corrected parameter. As described hereinabove, the operating state parameter indicative of the operating state of the variable valve mechanism can be considered as a parameter indicative of the amount of intake air drawn into the cylinders. Therefore, during execution of the air-fuel ratio control, if the detected value of the operating state parameter deviates from the actual value, the amount of intake air deviates from the proper value, which causes the actual air-fuel ratio of the mixture to deviate toward the lean side or the rich side with respect to the target air-fuel ratio. On the other hand, the air-fuel ratio control means controls the air-fuel ratio of the mixture such that the air-fuel ratio becomes equal to the target air-fuel ratio, and hence the air-fuel ratio parameter indicative of a state of the air-fuel ratio control reflects the aforementioned deviation of the air-fuel ratio. Further, the air-fuel ratio parameter is a value indicative of the air-fuel ratio of exhaust gases flowing through the exhaust passage of the engine, and therefore, when the air-fuel ratio of the mixture is controlled such that it becomes equal to the target air-fuel ratio, it is also detected as a value reflecting the aforementioned deviation of the air-fuel ratio.

Therefore, by correcting the operating state parameter according to the air-fuel ratio control parameter and the air-fuel ratio parameter described above, the corrected parameter can be calculated as a value in which the deviation between the detected value and the actual value of the operating state parameter, i.e. the deviation of the amount of intake air from the proper value is properly corrected or eliminated. As a result, even when there is a deviation of the detected value of the operating state parameter from the actual value due to a drift of the detected value in the operating state parameter-detecting means, wear of components of the variable intake mechanism, attachment of stain, and play produced by aging, in addition to a thermal expansion and contraction of the variable intake mechanism, it is possible to properly determine ignition timing of the engine while compensating for the deviation. That is, it is possible to properly control the ignition timing while compensating for the deviation of the amount of intake air caused by the thermal expansion and contraction of the variable intake mechanism and other events, without using a special sensor or the like for directly detecting the temperature of the variable valve mechanism or the degree of the thermal expansion and contraction. This makes it possible to improve the control accuracy, make the engine compact in size, increase the degree of freedom of design, and reduce manufacturing costs.

Preferably, the control apparatus further comprises estimated mechanism temperature-calculating means for calculating an estimated value of temperature of the variable intake mechanism as an estimated mechanism temperature, based on a thermodynamic model formed by thermodynamically modeling the variable intake mechanism, and the correction means calculates the corrected parameter further according to the estimated mechanism temperature.

With the configuration of the preferred embodiment, the corrected parameter is calculated according to the air-fuel ratio parameter detected and the air-fuel ratio control parameter calculated when the air-fuel ratio of the mixture is being controlled such that it becomes equal to the target air-fuel ratio. Therefore, when the control accuracy of the air-fuel ratio is low e.g. at the start of the air-fuel ratio control or before the air-fuel ratio parameter-detecting means becomes active, there is a fear of the calculation accuracy of the corrected parameter being degraded. However, according to this control apparatus, the estimated mechanism temperature is calculated based on the thermodynamic model formed by thermodynamically modeling the variable intake mechanism, and the corrected parameter is calculated by correcting the detected value of the operating state parameter further according to the estimated mechanism temperature. Therefore, even when the control accuracy of the air-fuel ratio is low as described above, the corrected parameter can be calculated as a value of the operating state parameter in which the influence of the thermal expansion and contraction of the variable intake mechanism is properly corrected or eliminated. This makes it possible to further improve the control accuracy.

Preferably, the thermodynamic model is a model which defines a relationship between the estimated mechanism temperature, a temperature parameter indicative of a temperature condition of the engine, atmosphere temperature, and a load parameter indicative of load on the engine.

With the configuration of the preferred embodiment, as described hereinabove, the estimated mechanism temperature is calculated using the thermodynamic model defining the relationship between various parameters affecting the temperature of the variable intake mechanism and the estimated mechanism temperature. Therefore, compared with the conventional cases where only the engine coolant temperature is used, it is possible to positively improve the estimation accuracy of the estimated mechanism temperature. As a result, since the detected value of the operating state parameter is corrected further according to the estimated mechanism temperature high in estimation accuracy, it is possible to calculate the corrected parameter as a value in which the influence of the thermal expansion and contraction of the variable intake mechanism is corrected or eliminated, whereby a high control accuracy can be secured.

To attain the above object, in a fourth aspect of the present invention, there is provided a control apparatus for an internal combustion engine in which an amount of intake air drawn into a cylinder is changed by a variable intake mechanism thereof, comprising operating state parameter-detecting means for detecting an operating state parameter indicative of an operating state of the variable intake mechanism, air-fuel ratio parameter-detecting means for detecting an air-fuel ratio parameter indicative of an air-fuel ratio of exhaust gases flowing through an exhaust passage of the engine, target air-fuel ratio-calculating means for calculating a target air-fuel ratio which serves as a target of air-fuel ratio control of a mixture supplied to the engine, air-fuel ratio control parameter-calculating means for calculating an air-fuel ratio control parameter for controlling the air-fuel ratio of the mixture such that the air-fuel ratio becomes equal to the target air-fuel ratio, operating state parameter estimated value-calculating means for calculating an estimated value of the operating state parameter according to at least one of the air-fuel ratio parameter and the air-fuel ratio control parameter, correction amount-calculating means for calculating a correction amount according to the estimated value of the operating state parameter and a detected value of the operating state parameter, corrected parameter-calculating means for correcting the detected value of the operating state parameter by the correction amount to thereby calculate a corrected parameter, and fuel amount-determining means for determining an amount of fuel to be supplied to the engine according to the corrected parameter and the air-fuel ratio control parameter.

With the configuration of the control apparatus according to the fourth aspect of the present invention, an air-fuel ratio control parameter for controlling the air-fuel ratio of a mixture such that the air-fuel ratio becomes equal to a target air-fuel ratio is calculated according to an air-fuel ratio parameter indicative of the air-fuel ratio of exhaust gases flowing through an exhaust passage of the engine, and an estimated value of an operating state parameter is calculated according to at least one of the air-fuel ratio parameter and the air-fuel ratio control parameter. A correction amount is calculated according to the estimated value of the operating state parameter and the detected value of the same, and a corrected parameter is calculated by correcting the detected value of the operating state parameter by the correction amount. The amount of fuel supplied to the engine is determined according to the corrected parameter and the air-fuel ratio control parameter. In this case, as described above, during execution of the air-fuel ratio control, if the detected value of the operating state parameter deviates from the actual value, the amount of intake air deviates from the proper value, which causes the actual air-fuel ratio of the mixture to deviate toward the lean side or the rich side with respect to the target air-fuel ratio, and the air-fuel ratio control parameter and the air-fuel ratio parameter reflect such a deviation of the air-fuel ratio.

Therefore, since the correction amount is calculated according to the estimated value of the operating state parameter calculated according to at least one of the air-fuel ratio control parameter and the air-fuel ratio parameter, and the detected value of the operating state parameter, and the corrected parameter is calculated by correcting the operating state parameter according to the correction amount, the corrected parameter can be calculated as a value in which the deviation between the detected value and the actual value of the operating state parameter, i.e. the deviation of the amount of intake air from the proper value is properly corrected or eliminated. As a result, even when there is a deviation of the detected value of the operating state parameter from the actual value due to a drift of the detected value in the operating state parameter-detecting means, wear of components of the variable intake mechanism, attachment of stain, and play produced by aging, in addition to a thermal expansion and contraction of the variable intake mechanism, it is possible to properly determine the fuel amount while compensating for the deviation. That is, it is possible to properly control the amount of fuel supplied to the engine and the air-fuel ratio of the engine while compensating for the deviation of the amount of intake air caused by the thermal expansion and contraction of the variable intake mechanism and other events, without using a special sensor or the like for directly detecting the temperature of the variable valve mechanism or the degree of the thermal expansion and contraction. This makes it possible to improve the control accuracy, make the engine compact in size, increase the degree of freedom of design, and reduce manufacturing costs.

To attain the above object, in a fifth aspect of the present invention, there is provided a control apparatus for an internal combustion engine in which an amount of intake air drawn into a cylinder is changed by a variable intake mechanism thereof, comprising operating state parameter-detecting means for detecting an operating state parameter indicative of an operating state of the variable intake mechanism, air-fuel ratio parameter-detecting means for detecting an air-fuel ratio parameter indicative of an air-fuel ratio of exhaust gases flowing through an exhaust passage of the engine, target air-fuel ratio-calculating means for calculating a target air-fuel ratio which serves as a target of air-fuel ratio control of a mixture supplied to the engine, air-fuel ratio control means for controlling an air-fuel ratio of the mixture supplied to the engine according to the air-fuel ratio parameter such that the air-fuel ratio becomes equal to the target air-fuel ratio, operating state parameter estimated value-calculating means for calculating an estimated value of the operating state parameter according to at least one of an air-fuel ratio control parameter indicative of a state of control of the air-fuel ratio by the air-fuel ratio control means and the air-fuel ratio parameter, correction amount-calculating means for calculating a correction amount according to the estimated value of the operating state parameter and a detected value of the operating state parameter, corrected parameter-calculating means for correcting the detected value of the operating state parameter by the correction amount to thereby calculate a corrected parameter, and ignition timing-determining means for determining ignition timing of the mixture supplied to the engine according to the corrected parameter.

With the configuration of the control apparatus according to the fifth aspect of the present invention, an estimated value of an operating state parameter is calculated according to at least one of an air-fuel ratio control parameter indicative of a state of the air-fuel ratio control and an air-fuel ratio parameter, and a correction amount is calculated according to the estimated value of the operating state parameter and the detected value of the same. A corrected parameter is calculated by correcting the detected value of the operating state parameter by the correction amount, and the ignition timing of the engine is determined according to the corrected parameter. In this case, as described above, during execution of the air-fuel ratio control, if the detected value of the operating state parameter deviates from the actual value, the amount of intake air deviates from the proper value, which causes the actual air-fuel ratio of the mixture to deviate toward the lean side or the rich side with respect to the target air-fuel ratio, and the air-fuel ratio control parameter and the air-fuel ratio parameter reflect such a deviation of the air-fuel ratio.

Therefore, since the correction amount is calculated according to the estimated value of the operating state parameter calculated according to at least one of the air-fuel ratio control parameter and the air-fuel ratio parameter, and the detected value of the operating state parameter, and the corrected parameter is calculated by correcting the operating state parameter according to the correction amount, the corrected parameter can be calculated as a value in which the deviation between the detected value and the actual value of the operating state parameter, i.e. the deviation of the amount of intake air is properly corrected or eliminated. As a result, even when there is a deviation of the detected value of the operating state parameter from the actual value due to a drift of the detected value in the operating state parameter-detecting means, wear of components of the variable intake mechanism, attachment of stain, and play produced by aging, in addition to a thermal expansion and contraction of the variable intake mechanism, it is possible to properly determine ignition timing of the engine while compensating for the deviation. That is, it is possible to properly control the ignition timing while compensating for the deviation of the amount of intake air caused by the thermal expansion and contraction of the variable intake mechanism and other events, without using a special sensor or the like for directly detecting the temperature of the variable valve mechanism or the degree of the thermal expansion and contraction. This makes it possible to improve the control accuracy, make the engine compact in size, increase the degree of freedom of design, and reduce manufacturing costs.

Preferably, the control apparatus further comprises estimated mechanism temperature-calculating means for calculating an estimated value of temperature of the variable intake mechanism as an estimated mechanism temperature, based on a thermodynamic model formed by thermodynamically modeling the variable intake mechanism, and the correction amount-calculating means calculates the correction amount further according to the estimated mechanism temperature.

With the configuration of the preferred embodiment, the estimated value of the operating state parameter is calculated according to at least one of the air-fuel ratio parameter detected and the air-fuel ratio control parameter calculated when the air-fuel ratio of the mixture is being controlled such that it becomes equal to the target air-fuel ratio. Therefore, when the control accuracy of the air-fuel ratio is low e.g. at the start of the air-fuel ratio control or before the air-fuel ratio parameter-detecting means becomes active, there is a fear of the calculation accuracy of the estimated value of the operating state parameter, i.e. the calculation accuracy of the correction amount being degraded, resulting in a decrease in the calculation accuracy of the corrected parameter. However, according to this control apparatus, the estimated mechanism temperature is calculated based on the thermodynamic model formed by thermodynamically modeling the variable intake mechanism, and the correction amount is calculated further according to the estimated mechanism temperature. Therefore, even when the control accuracy of the air-fuel ratio is low as described above, the influence of the thermal expansion and contraction of the variable intake mechanism on the operating state parameter can be properly corrected or eliminated by the correction amount, which makes it possible to further improve the control accuracy.

More preferably, the thermodynamic model is a model which defines a relationship between the estimated mechanism temperature, a temperature parameter indicative of a temperature condition of the engine, atmosphere temperature, and a load parameter indicative of load on the engine.

With the configuration of the preferred embodiment, as described hereinabove, the estimated mechanism temperature is calculated using the thermodynamic model defining the relationship between various parameters affecting the temperature of the variable intake mechanism and the estimated mechanism temperature. Therefore, compared with the conventional cases where only the engine coolant temperature is used, it is possible to positively improve the estimation accuracy of the estimated mechanism temperature. As a result, since the correction amount is calculated further according to the estimated mechanism temperature high in estimation accuracy, it is possible to further improve the calculation accuracy of the corrected parameter, i.e. that of the operating state parameter, whereby the control accuracy can be further improved.

Preferably, the correction amount-calculating means calculates a difference between the estimated value of the operating state parameter and the detected value of the operating state parameter as an estimation error, and calculates the correction amount with a predetermined algorithm to which is applied a response-specifying control algorithm, such that the estimation error becomes minimum.

With the configuration of the preferred embodiment, the difference between the estimated value of the operating state parameter and the detected value of the operating state parameter is calculated as an estimation error, and the correction amount is calculated with a predetermined algorithm to which is applied a response-specifying control algorithm such that the estimation error becomes minimum. Therefore, the correction amount, i.e. the corrected parameter is calculated such that the estimation error is gently exponentially reduced. As a result, even when the estimation error temporarily becomes too large a value due to a disturbance or an erroneous estimation, the corrected parameter can be calculated while avoiding the influence of the too large value, whereby the control accuracy can be further enhanced.

Preferably, the correction amount-calculating means calculates a difference between the estimated value of the operating state parameter and the detected value of the operating state parameter as an estimation error, calculates a statistically processed value of the estimation error by subjecting the estimation error to predetermined sequential statistical processing, and calculates the correction amount with a predetermined algorithm, such that the statistically-processed value of the estimation error becomes minimum.

With the configuration of the preferred embodiment, the difference between the estimated value of the operating state parameter and the detected value of the operating state parameter is calculated as an estimation error, and a statistically processed value of the estimation error is calculated by subjecting the estimation error to predetermined sequential statistical processing. The correction amount is calculated with a predetermined algorithm such that the statistically processed value of the estimation error becomes minimum. As a result, even when the estimation error temporarily becomes too large a value due to a disturbance or an erroneous estimation, the control amount i.e. the corrected parameter can be calculated while avoiding the influence of the too large value, whereby the control accuracy can be further enhanced.

More preferably, the variable intake mechanism is a variable valve lift mechanism that changes the amount of intake air by changing a lift of intake valves of the engine, and the operating state parameter is the lift of the intake valves, an algorithm of the predetermined sequential statistical processing being a weighted sequential statistical processing algorithm which weights the estimation error with a weighting gain, the weighting gain being set to a smaller value as the detected value of the lift of the intake valves is larger.

In the case of the variable valve lift mechanism which changes the amount of intake air by changing the lift of the intake valves of the engine, as the lift of the intake valves is larger, the degree of discrepancy between the estimated value and the detected value of the lift, i.e. the estimation error, tends to increase. However, in this control apparatus, the statistically processed value of the estimation error is calculated with a predetermined sequential statistical processing algorithm which weights the estimation error with a weighting gain, and the weighting gain is set to a smaller value as the detected value of the lift of the intake valves is larger. Therefore, as there is a higher possibility of the degree of discrepancy between the estimated value and the detected value becoming large, the weight of the estimation error is set to a smaller value, whereby the calculation accuracy of the statistically processed value of the estimation error, i.e. the calculation accuracy of the correction amount can be further enhanced. This makes it possible to further improve the control accuracy.

The above and other objects, features, and advantages of the present invention will become more apparent from the following detailed description taken in conjunction with the accompanying drawings.

BRIEF DESCRIPTION OF THE DRAWINGS

FIG. 11 is a diagram showing an example of a map for use in calculating a target air-fuel ratio KCMD;

FIG. 16 is a diagram showing an example of a map for use in calculating a FF correction value Dliftin_test;

FIG. 17 is a schematic block diagram of a FB correction value-calculating section;

FIG. 24 is a diagram showing a map for Cain(k−d)=Cainad for use in calculating the estimated valve lift Liftin_hat;

FIG. 25 is a diagram showing an example of a map for use in calculating a weighting gain P;

FIG. 53 is a schematic block diagram of a corrected valve lift-calculating section of a control apparatus according to a third embodiment of the present invention.

DETAILED DESCRIPTION OF PREFERRED EMBODIMENTS

Figure 2:
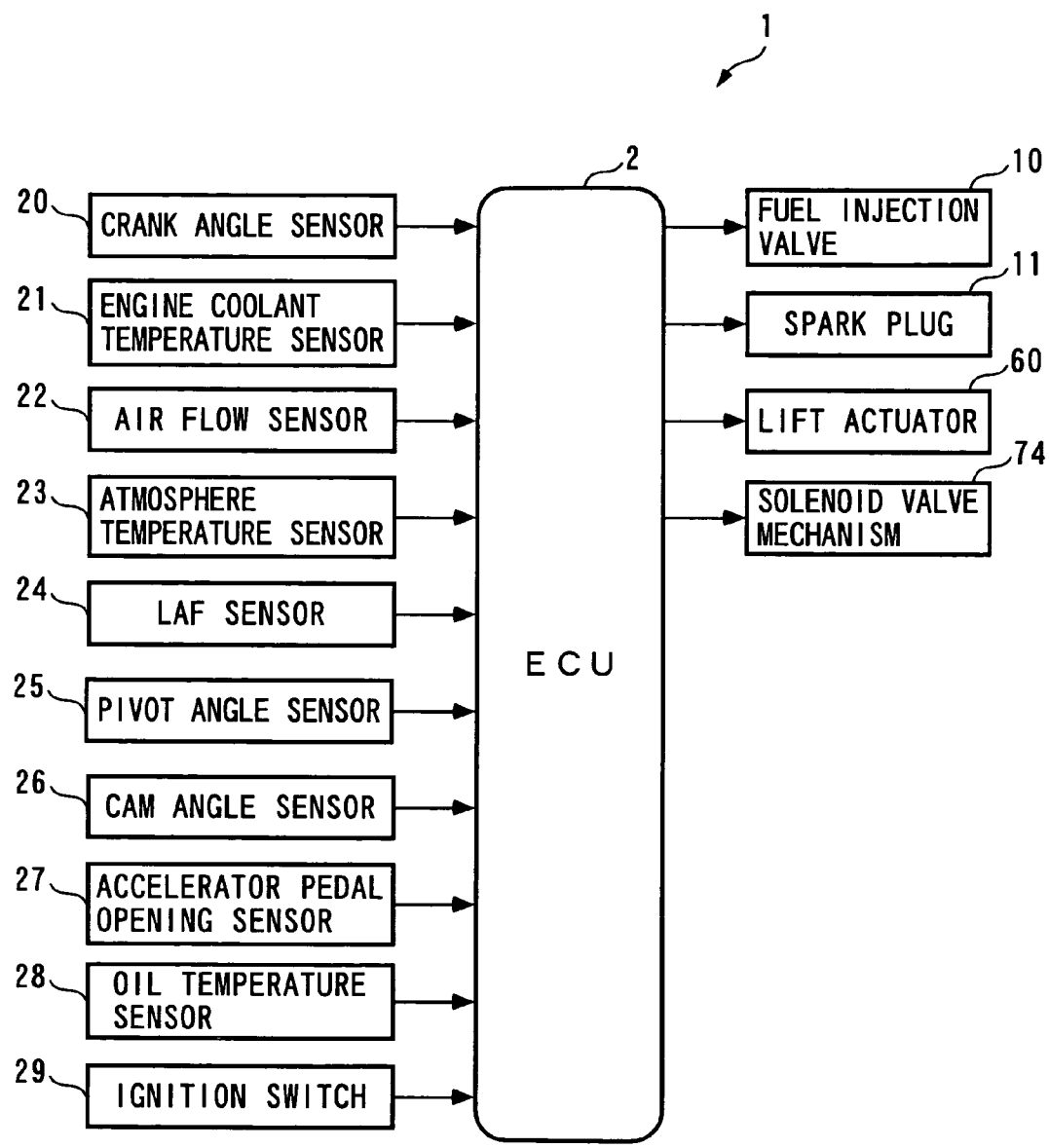
FIG. 2 is a schematic block diagram of the control apparatus.

Hereafter, a control apparatus for an internal combustion engine, according a first embodiment of the present invention, will be described with reference to the drawings. As shown in FIG. 2, the control apparatus 1 includes an ECU 2. As described hereinafter, the ECU 2 carries out various control processes for controlling an air-fuel ratio, ignition timing, and variable mechanism, etc., depending on operating conditions of an internal combustion engine (hereinafter simply referred to as "the engine") 3.

Figure 1:
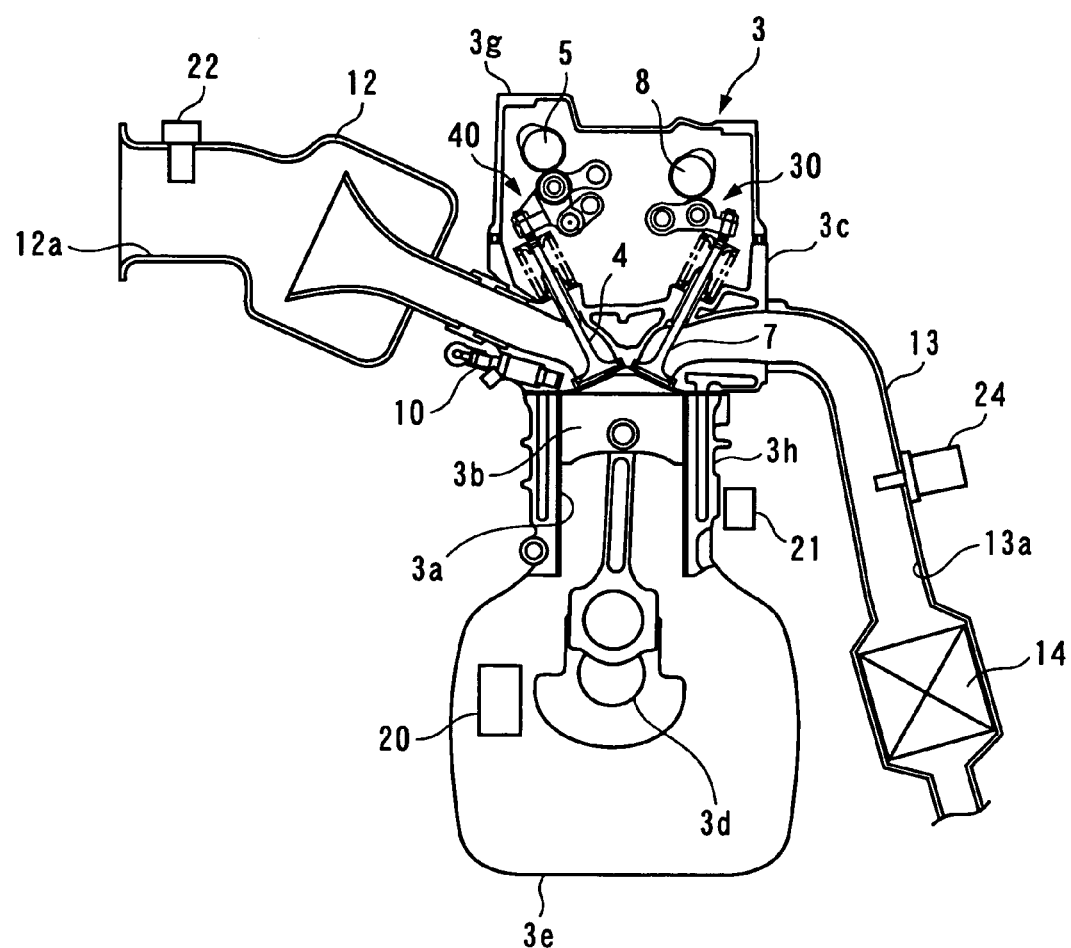
FIG. 1 is a schematic diagram of an internal combustion engine to which is applied a control apparatus according to a first embodiment of the present invention.
Figure 3:
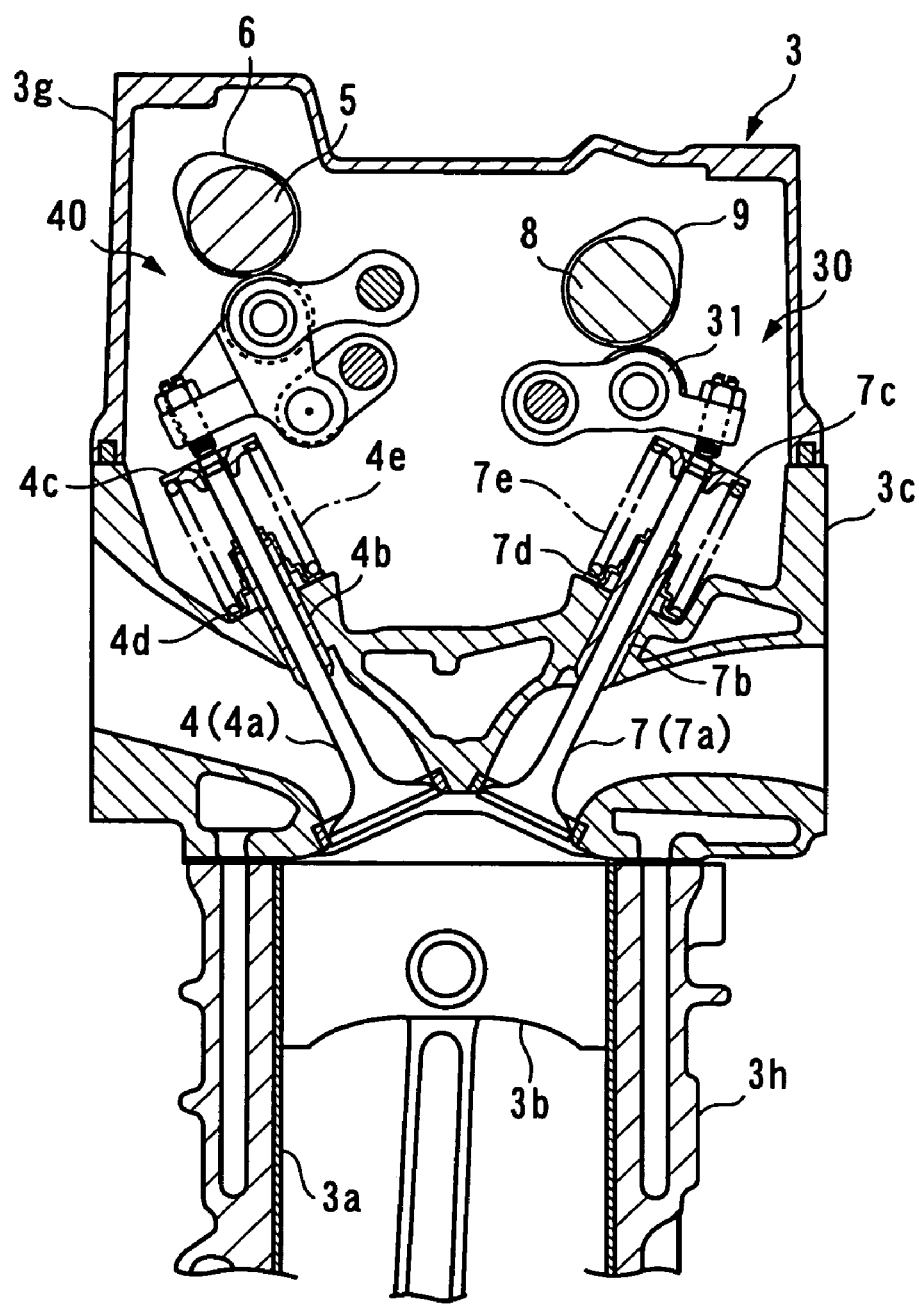
FIG. 3 is a schematic cross-sectional view of a variable intake valve-actuating mechanism and an exhaust valve-actuating mechanism of the engine.

Referring to FIGS. 1 and 3, the engine 3 is an in-line four-cylinder gasoline engine having a four pairs of cylinders 3a and pistons 3b (only one pair of which is shown), and installed on a vehicle with an automatic transmission, not shown. The engine 3 includes an intake valve 4 and an exhaust valve 7 provided for each cylinder 3a, for opening and closing an intake port and an exhaust port thereof, respectively, an intake camshaft 5 and intake cams 6 for actuating the intake valves 4, a variable intake valve-actuating mechanism 40 that actuates the intake valves 4 to open and close the same, an exhaust camshaft 8 and exhaust cams 9 for actuating the exhaust valves 7, an exhaust valve-actuating mechanism 30 that actuates the exhaust valves 7 to open and close the same, fuel injection valves 10, spark plugs 11 (see FIG. 2), and so forth.

Figure 4:
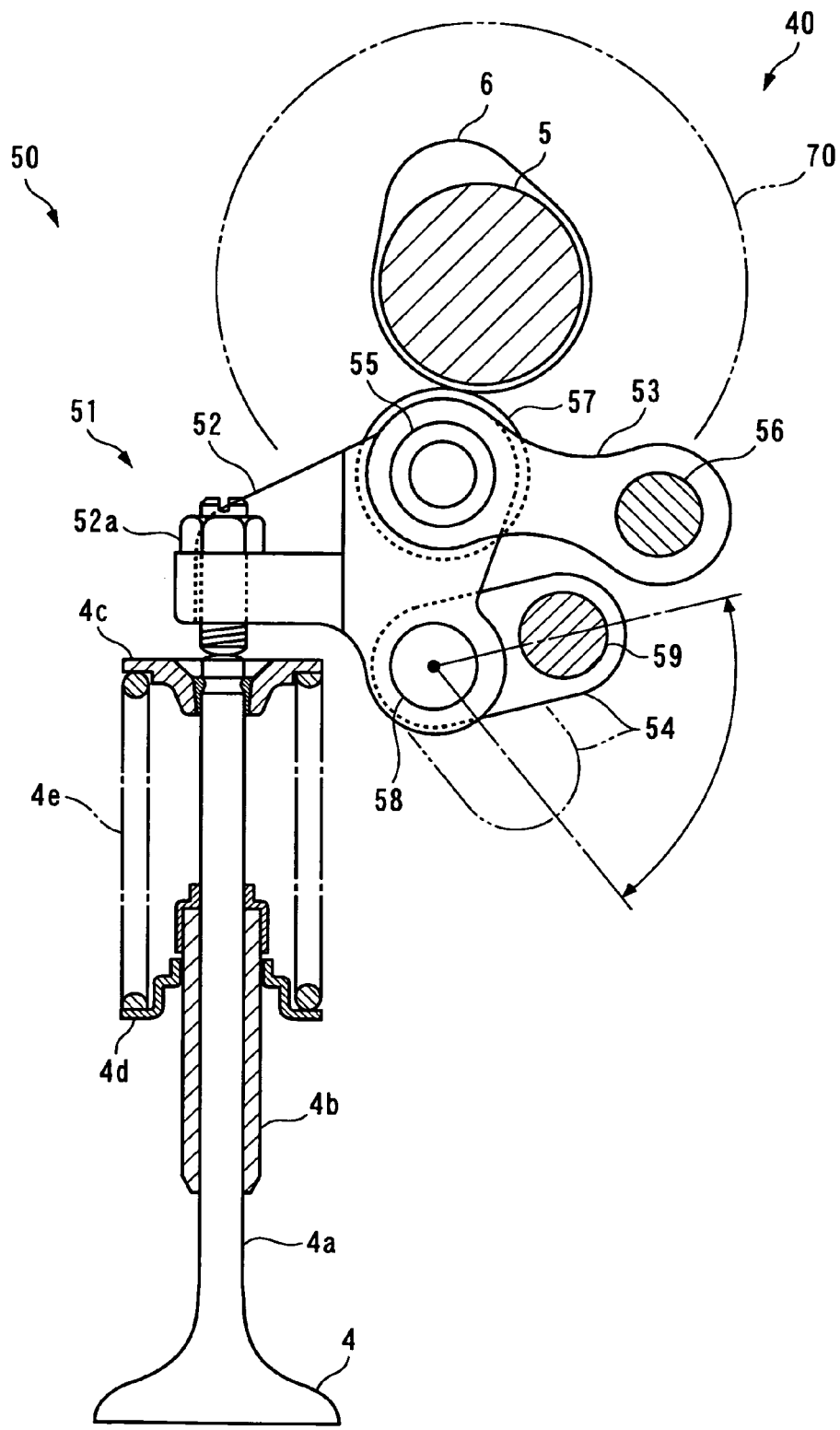
FIG. 4 is a schematic cross-sectional view of a variable valve lift mechanism of the variable intake valve-actuating mechanism.

The intake valve 4 has a stem 4a thereof slidably fitted in a guide 4b. The guide 4b is rigidly fixed to a cylinder head 3c. Further, as shown in FIG. 4, the intake valve 4 includes upper and lower spring sheets 4c and 4d, and a valve spring 4e disposed therebetween, and is urged by the valve spring 4e in the valve-closing direction.

Further, the intake camshaft 5 and the exhaust camshaft 8 are rotatably mounted through the cylinder head 3c via holders, not shown. The intake camshaft 5 has an intake sprocket (not shown) coaxially and rotatably fitted on one end thereof. The intake sprocket is connected to a crankshaft 3d via a timing chain, not shown, and connected to the intake camshaft 5 via a variable cam phase mechanism 70, described hereinafter. With the above arrangement, the intake camshaft 5 performs one rotation per two rotations of the crankshaft 3d. Further, the intake cam 6 is provided on the intake camshaft 5 for each cylinder 3a such that the intake cam 6 rotates in unison with the intake camshaft 5.

Furthermore, the variable intake valve-actuating mechanism 40 is provided for actuating the intake valve 4 of each cylinder 3a so as to open and close the same, in accordance with rotation of the intake camshaft 5, and continuously changing the lift and the valve timing of the intake valve 4, which will be described in detail hereinafter. It should be noted that in the present embodiment, "the lift of the intake valve 4" (hereinafter referred to as "the valve lift"). represents the maximum lift of the intake valve 4.

On the other hand, the exhaust valve 7 has a stem 7a thereof slidably fitted in a guide 7b. The guide 7b is rigidly fixed to the cylinder head 3c. Further, the exhaust valve 7 includes upper and lower spring sheets 7c and 7d, and a valve spring 7e disposed therebetween, and is urged by the valve spring 7e in the valve-closing direction.

Further, the exhaust camshaft 8 has an exhaust sprocket (not shown) integrally formed therewith, and is connected to the crankshaft 3d by the exhaust sprocket and the timing chain, not shown, whereby the exhaust camshaft 8 performs one rotation per two rotations of the crankshaft 3d. Further, the exhaust cam 9 is provided on the exhaust camshaft 8 for each cylinder 3a such that the exhaust cam 9 rotates in unison with the exhaust camshaft 8.

Further, the exhaust valve-actuating mechanism 30 includes rocker arms 31. Each rocker arm 31 is pivotally moved in accordance with rotation of the associated exhaust cam 9 to thereby actuate the exhaust valve 7 for opening and closing the same against the urging force of the valve spring 7e.

On the other hand, the fuel injection valve 10 is provided for each cylinder 3a, and mounted through the cylinder head 3c in a tilted state such that fuel is directly injected into a combustion chamber. That is, the engine 3 is configured as a direct injection engine. Further, the fuel injection valve 10 is electrically connected to the ECU 2 and the valve-opening time period and the valve-opening timing thereof are controlled by the ECU 2, whereby the fuel injection amount is controlled.

The spark plug 11 as well is provided for each cylinder 3a, and mounted through the cylinder head 3c. The spark plug 11 is electrically connected to the ECU 2, and a state of spark discharge is controlled by the ECU 2 such that a mixture in the combustion chamber is burned in timing corresponding to ignition timing, as described hereinafter.

On the other hand, the engine 3 is provided with a crank angle sensor 20 and an engine coolant temperature sensor 21. The crank angle sensor 20 is comprised of a magnet rotor and an MRE (magnetic resistance element) pickup, and delivers a CRK signal and a TDC signal, which are pulse signals, to the ECU 2 in accordance with rotation of the crankshaft 3d. Each pulse of the CRK signal is generated whenever the crankshaft 3d rotates through a predetermined angle (e.g. 10°). The ECU 2 calculates the rotational speed NE of the engine 3 (hereinafter referred to as "the engine speed NE") based on the CRK signal. The TDC signal indicates that the piston 3b of each cylinder 3a is at a predetermined crank angle position in the vicinity of the top dead center (TDC) at the start of the suction stroke thereof, and each pulse thereof is delivered whenever the crankshaft 3d rotates through a predetermined crank angle.

The engine coolant temperature sensor 21 is implemented e.g. by a thermistor, and detects an engine coolant temperature TW to deliver a signal indicative of the sensed engine coolant temperature TW to the ECU 2. The engine coolant temperature TW is the temperature of an engine coolant circulating through a cylinder block 3h of the engine 3. In the present embodiment, the engine coolant temperature TW corresponds to a temperature parameter.

Further, the engine 3 has an intake pipe 12 from which a throttle valve mechanism is omitted, and an intake passage 12a having a large diameter is formed through the intake pipe 12, whereby the engine 3 is configured such that flow resistance is smaller than in an ordinary engine. The intake pipe 12 is provided with an air flow sensor 22 and an atmosphere temperature sensor 23 (see FIG. 2).

The air flow sensor 22 is formed by a hot-wire air flow meter, and detects the flow rate Gin of air flowing through the intake passage 12a (hereinafter referred to as "the air flow rate Gin") to deliver a signal indicative of the sensed air flow rate Gin to the ECU 2. Further, the atmosphere temperature sensor 23 detects the temperature of atmosphere (hereinafter referred to as "the atmosphere temperature") TA, and delivers a signal indicative of the sensed atmosphere temperature TA to the ECU 2.

Further, a LAF sensor 24 and a catalytic converter 14 are inserted into an exhaust pipe 13 of the engine 3 at respective locations in this order from upstream side. The LAF sensor 24 is comprised of a zirconia layer and platinum electrodes, and linearly detects the concentration of oxygen in exhaust gases flowing through an exhaust passage 13a of the exhaust pipe 13, in a broad air-fuel ratio range from a rich region richer than the stoichiometric ratio to a very lean region, to deliver a signal indicative of the sensed oxygen concentration to the ECU 2.

The ECU 2 calculates an actual air-fuel ratio KACT indicative of an air-fuel ratio in the exhaust gases, based on a value of the signal output from the LAF sensor 24. In this case, the actual air-fuel ratio KACT is calculated as an equivalent ratio. It should be noted that in the present embodiment, the LAF sensor 24 corresponds to air-fuel ratio parameter-calculating means, and the actual air-fuel ratio KACT corresponds to an air-fuel ratio parameter.

Next, a description will be given of the aforementioned variable intake valve-actuating mechanism 40. As shown in FIG. 4, the variable intake valve-actuating mechanism 40 is comprised of the intake camshaft 5, the intake cams 6, a variable valve lift mechanism 50, and the variable cam phase mechanism 70. It should be noted that in the present embodiment, the variable valve lift mechanism 50 corresponds to a variable intake mechanism.

The variable valve lift mechanism 50 actuates the intake valves 4 to open and close the same, in accordance with rotation of the intake camshaft 5, and continuously changes the valve lift Liftin between a predetermined maximum value Liftinmax and a predetermined minimum value Liftinmin. The variable valve lift mechanism 50 is comprised of rocker arm mechanisms 51 of a four joint link type, provided for the respective cylinders 3a, and a lift actuator 60 (see FIGS. 5A and 5B) simultaneously actuating these rocker arm mechanisms 51.

Each rocker arm mechanism 51 is comprised of a rocker arm 52, and upper and lower links 53 and 54. The upper link 53 has one end pivotally mounted to an upper end of the rocker arm 52 by an upper pin 55, and the other end pivotally mounted to a rocker arm shaft 56. The rocker arm shaft 56 is mounted through the cylinder head 3c via holders, not shown.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52a is mounted to an end of the rocker arm 52 toward the intake valve 4. When the rocker arm 52 is vertically moved in accordance with rotation of the intake cam 6, the adjusting bolt 52a vertically drives the stem 4a to open and close the intake valve 4, against the urging force of the valve spring 4e.

Further, the lower link 54 has one end pivotally mounted to a lower end of the rocker arm 52 by a lower pin 58, and the other end of the lower link 54 has a connection shaft 59 pivotally mounted thereto. The lower link 54 is connected to a short arm 65, described hereinafter, of the lift actuator 60 by the connection shaft 59.

Figure 5A:
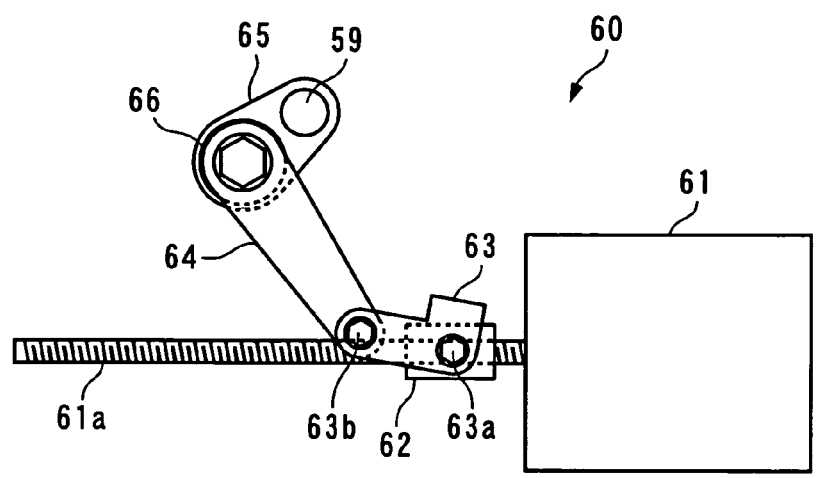
FIG. 5A is a diagram showing a lift actuator in a state in which a short arm thereof is in a maximum lift position.
Figure 5B:
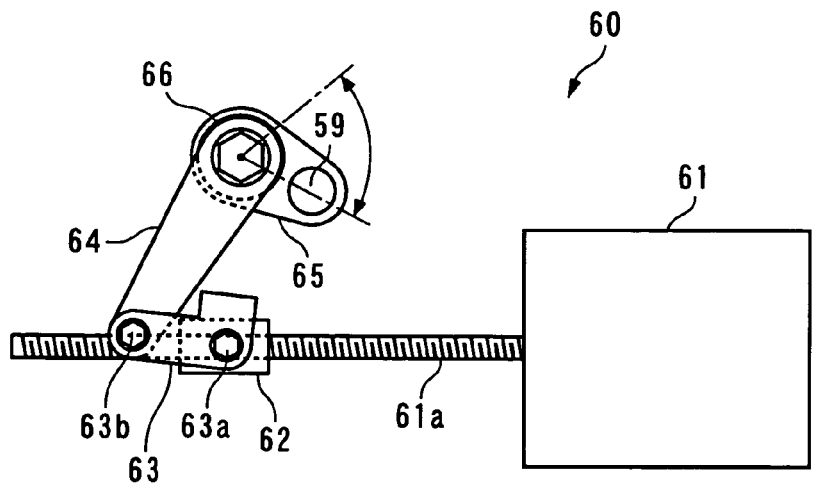
FIG. 5B is a diagram showing the lift actuator in a state in which the short arm thereof is in the minimum lift position.

On the other hand, as shown in FIGS. 5A and 5B, the lift actuator 60 is comprised of a motor 61, a nut 62, a link 63, a long arm 64, and the short arm 65. The motor 61 is connected to the ECU 2, and disposed outside a head cover 3g of the engine 3. The rotating shaft of the motor 61 is a screw shaft 61a formed with a male screw and the nut 62 is screwed onto the screw shaft 61a. The nut 62 is connected to the long arm 64 by the link 63. The link 63 has one end pivotally mounted to the nut 62 by a pin 63a, and the other end pivotally mounted to one end of the long arm 64 by a pin 63b.

Further, the other end of the long arm 64 is attached to one end of the short arm 65 by a pivot shaft 66. The pivot shaft 66 is circular in cross section, and extends through the head cover 3g of the engine 3 such that it is pivotally supported by the head cover 3g. The long arm 64 and the short arm 65 are pivotally moved in unison with the pivot shaft 66 in accordance with pivotal motion of the pivot shaft 66.

Furthermore, the aforementioned connection shaft 59 rotatably extends through the other end of the short arm 65, whereby the short arm 65 is connected to the lower link 54 by the connection shaft 59.

Next, a description will be given of the operation of the variable valve lift mechanism 50 constructed as above. In the variable valve lift mechanism 50, when a lift control input U_Liftin, described hereinafter, is input from the ECU 2 to the lift actuator 60, the screw shaft 61a rotates, and the nut 62 is moved in accordance with the rotation of the screw shaft 61a, whereby the long arm 64 and the short arm 65 are pivotally moved about the pivot shaft 66, and in accordance with the pivotal motion of the short arm 65, the lower link 54 of the rocker arm mechanism 51 is pivotally moved about the lower pin 58. That is, the lower link 54 is driven by the lift actuator 60.

During the above process, under the control of the ECU 2, the range of pivotal motion of the short arm 65 is restricted between the maximum lift position shown in FIG. 5A and the minimum lift position shown in FIG. 5B, whereby the range of pivotal motion of the lower link 54 is also restricted between the maximum lift position indicated by the solid line in FIG. 4 and the minimum lift position indicated by the two-dot chain line in FIG. 4.

Figure 6A:
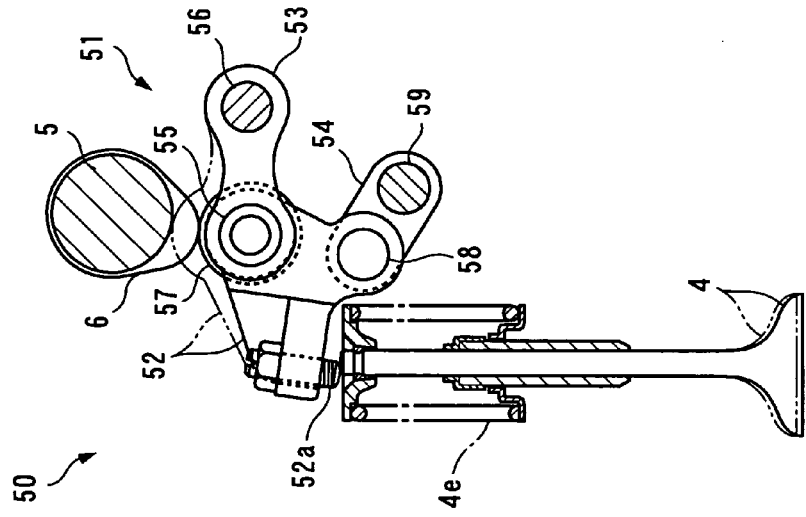
FIG. 6A is a diagram showing an intake valve placed in an open state when a lower link of the variable valve lift mechanism is in a maximum lift position.

The four joint link formed by the rocker arm shaft 56, the upper and lower pins 55 and 58, and the connection shaft 59 is configured such that when the lower link 54 is in the maximum lift position, the distance between the center of the upper pin 55 and the center of the lower pin 58 becomes longer than the distance between the center of the rocker arm shaft 56 and the center of the connection shaft 59, whereby as shown in FIG. 6A, when the intake cam 6 rotates, the amount of movement of the adjusting bolt 52a becomes larger than the amount of movement of a contact point where the intake cam 6 and the roller 57 are in contact with each other.

Figure 6B:
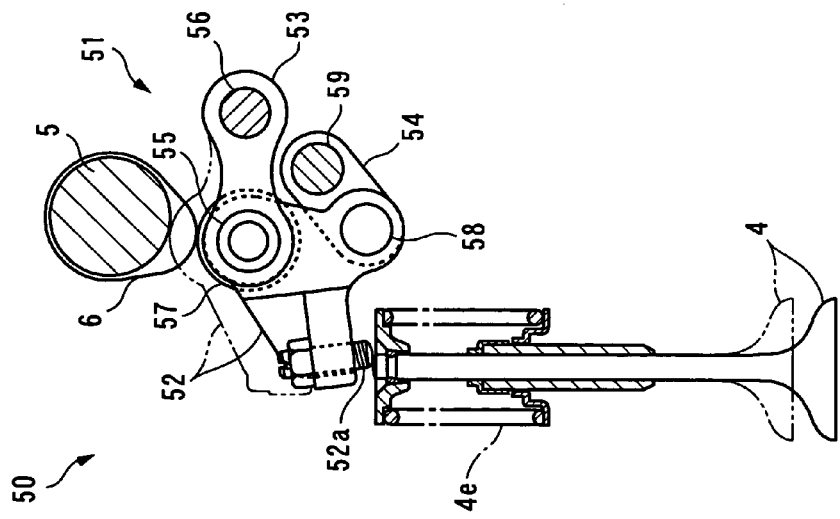
FIG. 6B is a diagram showing the intake valve placed in an open state when the lower link of the variable valve lift mechanism is in the minimum lift position.

On the other hand, the four joint link is configured such that when the lower link 54 is in the minimum lift position, the distance between the center of the upper pin 55 and the center of the lower pin 58 becomes shorter than the distance between the center of the rocker arm shaft 56 and the center of the connection shaft 59, whereby as shown in FIG. 6B, when the intake cam 6 rotates, the amount of movement of the adjusting bolt 52a becomes smaller than the amount of movement of the contact point where the intake cam 6 and the roller 57 are in contact with each other.

Figure 7:
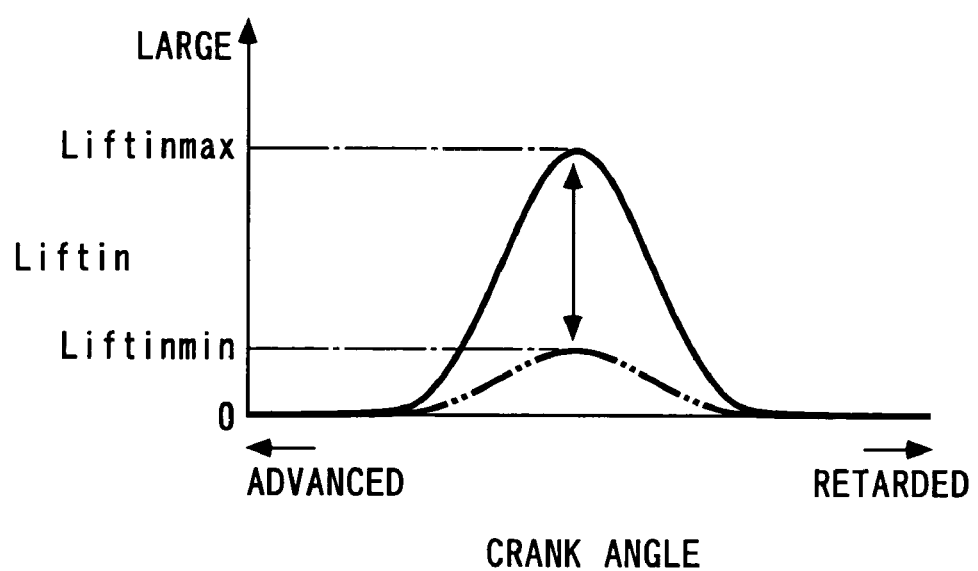
FIG. 7 is a diagram showing a valve lift curve (solid line) obtained when the lower link of the variable valve lift mechanism is in the maximum lift position, and a valve lift curve (two-dot chain line) obtained when the lower link of the variable valve lift mechanism is in the minimum lift position.

For the above reason, when the lower link 54 is in the maximum lift position, the intake valve 4 is opened with a larger valve lift Liftin than when the lower link 54 is in the minimum lift position. More specifically, during rotation of the intake cam 6, when the lower link 54 is in the maximum lift position, the intake valve 4 is opened according to a valve lift curve indicated by a solid line in FIG. 7, and the valve lift Liftin assumes its maximum value Liftinmax. On the other hand, when the lower link 54 is in the minimum lift position, the intake valve 4 is opened according to a valve lift curve indicated by a two-dot chain line in FIG. 7, and the valve lift Liftin assumes its minimum value Liftinmin.

Therefore, in the variable valve lift mechanism 50, the lower link 54 is pivotally moved by the lift actuator 60 between the maximum lift position and the minimum lift position, whereby it is possible to steplessly change the valve lift Liftin between the maximum value Liftinmax and the minimum value Liftinmin.

It should be noted that the variable valve lift mechanism 50 is provided with a lock mechanism, not shown, and the lock mechanism locks the operation of the variable valve lift mechanism 50 when the lift control input U_Liftin is set to a failure-time value U_Liftin_fs, as described hereinafter, or when the lift control input U_Liftin is not input from the ECU 2 to the lift actuator 60 e.g. due to a disconnection. That is, the variable valve lift mechanism 50 is inhibited from changing the valve lift Liftin, whereby the valve lift Liftin is held at the minimum value Liftinmin. It should be noted that when a cam phase Cain, referred to hereinafter, is held at a predetermined locked value, referred to hereinafter, the minimum value Liftinmin is set to such a value as will ensure a predetermined failure-time value of the intake air amount. The predetermined failure-time value is set to a value which is capable of suitably carrying out idling or starting of the engine 3 during stoppage of the vehicle, and capable of holding the vehicle in a state of low-speed traveling when the vehicle is traveling.

The engine 3 is provided with a pivot angle sensor 25 (see FIG. 2). The pivot angle sensor 25 detects a pivot angle of the rotating shaft 66 i.e. the short arm 65, and delivers a signal indicative of the detected pivot angle of the short arm 65 to the ECU 2. The ECU 2 calculates the valve lift Liftin based on the detection signal from the pivot angle sensor 25. In the present embodiment, the pivot angle sensor 25 corresponds to operating state parameter-detecting means, and the valve lift Liftin corresponds to an operating state parameter.

Figure 8:
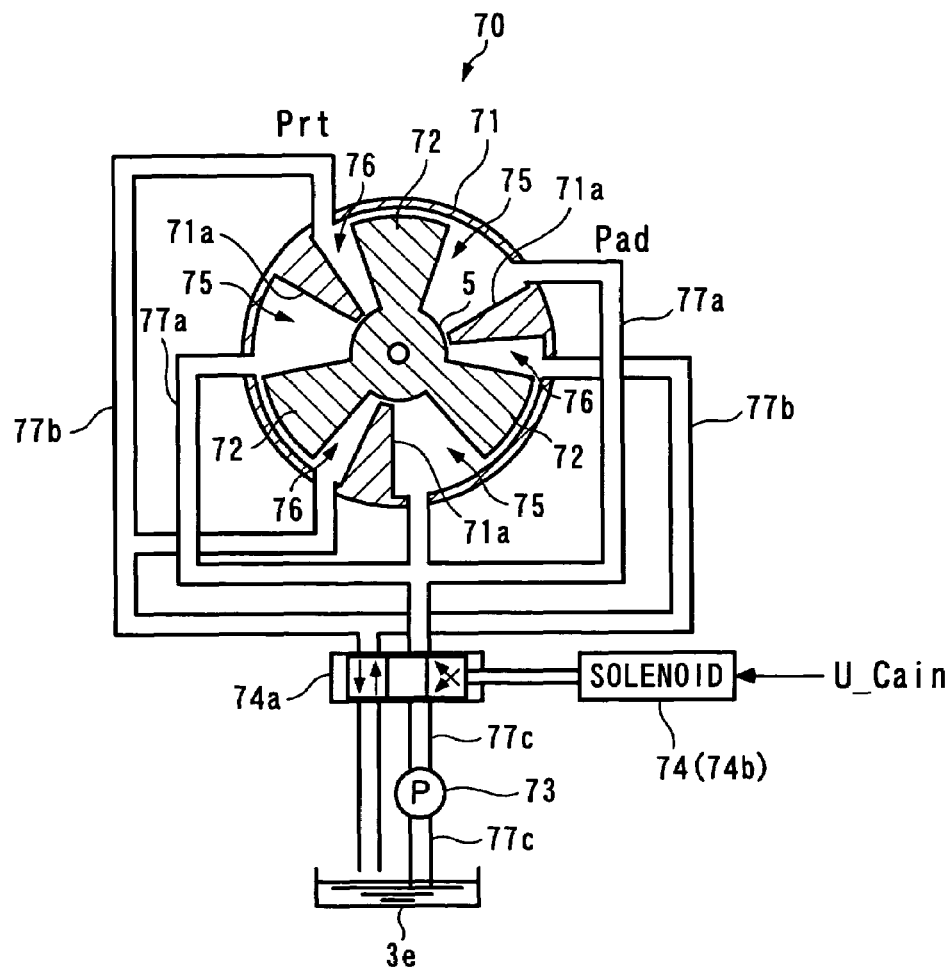
FIG. 8 is a schematic diagram of a variable cam phase mechanism.

Next, a description will be given of the aforementioned variable cam phase mechanism 70. The variable cam phase mechanism 70 is provided for continuously advancing or retarding the relative phase Cain of the intake camshaft 5 with respect to the crankshaft 3d (hereinafter referred to as "the cam phase Cain"), and mounted on an intake sprocket-side end of the intake camshaft 5. As shown in FIG. 8, the variable cam phase mechanism 70 includes a housing 71, a three-bladed vane 72, an oil pressure pump 73, and a solenoid valve mechanism 74.

The housing 71 is integrally formed with the intake sprocket on the intake camshaft 5, and divided by three partition walls 71a formed at equal intervals. The vane 72 is coaxially mounted on the intake sprocket-side end of the intake camshaft 5, such that the vane 72 radially extends outward from the intake camshaft 5, and rotatably housed in the housing 71. Further, the housing 71 has three advance chambers 75 and three retard chambers 76 each formed between one of the partition walls 71a and one of the three blades of the vane 72.

The oil pressure pump 73 is of a mechanical type which is connected to the crankshaft 3d. As the crankshaft 3d rotates, the oil pressure pump 73 draws lubricating oil (also serving as working fluid) stored in an oil pan 3e of the engine 3 via an oil passage 77c, for pressurization, and supplies the pressurized oil to the solenoid valve mechanism 74 via the oil passage 77c.

The solenoid valve mechanism 74 is formed by combining a spool valve mechanism 74a and a solenoid 74b, and is connected to the advance chambers 75 and the retard chambers 76 via an advance oil passage 77a and a retard oil passage 77b such that oil pressure supplied from the oil pressure pump 73 is output to the advance chambers 75 and the retard chambers 76 as advance oil pressure Pad and retard oil pressure Prt. The solenoid 74b of the solenoid valve mechanism 74 is electrically connected to the ECU 2. When a phase control input U_Cain, referred to hereinafter, is input from the ECU 2, the solenoid 74b moves a spool valve element of the spool valve mechanism 74a within a predetermined range of motion according to the phase control input U_Cain to thereby change both the advance oil pressure Pad and the retard oil pressure Prt.

Figure 9:
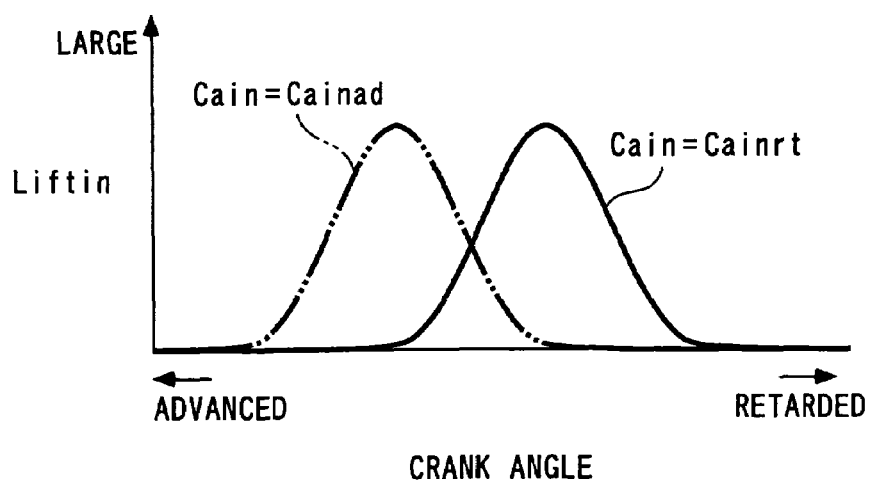
FIG. 9 is a diagram showing a valve lift curve (solid line) obtained when a cam phase is set to a most retarded value by the variable cam phase mechanism, and a valve lift curve (two-dot chain line) obtained when the cam phase is set to a most advanced value by the variable cam phase mechanism.

In the variable cam phase mechanism 70 constructed as above, during operation of the oil pressure pump 73, the solenoid valve mechanism 74 is operated according to the phase control input U_Cain, to supply the advance oil pressure Pad to the advance chambers 75 and the retard oil pressure Prt to the retard chambers 76, whereby the relative phase between the vane 72 and the housing 71 is changed toward an advanced side or a retarded side. As a result, the cam phase Cain described above is continuously changed between a most retarded value Cainrt and a most advanced value Cainad, whereby valve timing of the intake valve 4 is continuously changed between a most retarded timing indicated by a solid line in FIG. 9 and a most advanced timing indicated by a two-dot chain line in FIG. 9. It should be noted that in the control process, described hereinafter, the most retarded value Cainrt is set to 0°, and the most retarded value Cainad is set to a predetermined positive angle (e.g. 100°).

Further, the variable cam phase mechanism 70 is provided with a lock mechanism, not shown, which locks operation of the variable cam phase mechanism 70, when oil pressure supplied from the oil pressure pump 73 is low, when the control input U_Cain is set to a failure-time value U_Cain_fs, referred to hereinafter, or when the phase control input U_Cain is not input to the solenoid valve mechanism 74 e.g. due to a disconnection. That is, the variable cam phase mechanism 70 is inhibited from changing the cam phase Cain, whereby the cam phase Cain is held at the predetermined locked value. The predetermined locked value is set to such a value as will make it possible to ensure a predetermined failure-time value of the intake air amount when the valve lift Liftin is held at the minimum value Liftinmin, as described above.

As described above, in the variable intake valve-actuating mechanism 40 of the present embodiment, the variable valve lift mechanism 50 steplessly changes the valve lift Liftin, and the variable cam phase mechanism 70 steplessly changes the cam phase Cain, i.e. the valve timing of the intake valves 4 between the most retarded timing and the most advanced timing, referred to hereinbefore. Further, the ECU 2 controls the valve lift Liftin and the cam phase Cain via the variable valve lift mechanism 50 and the variable cam phase mechanism 70, whereby the intake air amount is controlled. It should be noted in the following description, the variable valve lift mechanism 50 and the variable cam phase mechanism 70 are collectively referred to as "the two variable mechanisms".

On the other hand, a cam angle sensor 26 (see FIG. 2) is disposed at an end of the intake camshaft 5 opposite from the variable cam phase mechanism 70. The cam angle sensor 26 is implemented e.g. by a magnet rotor and an MRE pickup, for delivering a CAM signal, which is a pulse signal, to the ECU 2 along with rotation of the intake camshaft 5. Each pulse of the CAM signal is generated whenever the intake camshaft 5 rotates through a predetermined cam angle (e.g. 1°). The ECU 2 calculates the cam phase Cain based on the CAM signal and the CRK signal, described above.

Next, as shown in FIG. 2, connected to the ECU 2 are an accelerator pedal opening sensor 27, an oil temperature sensor 28, and an ignition switch (hereinafter referred to as "the IG·SW") 29. The accelerator pedal opening sensor 27 detects a stepped-on amount AP of an accelerator pedal, not shown, of the vehicle (hereinafter referred to as "the accelerator pedal opening AP") and delivers a signal indicative of the sensed accelerator pedal opening AP to the ECU 2.

Further, the oil temperature sensor 28 is implemented e.g. by a thermistor, and detects an oil temperature Toil to deliver a signal indicative of the sensed oil temperature Toil to the ECU 2. It should be noted that in the present embodiment, the oil temperature Toil corresponds to the temperature parameter. Further, the IG·SW 29 is turned on or off by operation of an ignition key, not shown, and delivers a signal indicative of the ON/OFF state thereof to the ECU 2.

The ECU 2, which is implemented by a microcomputer comprised of a CPU, a RAM, a ROM and an I/O interface (none of which are shown), determines operating conditions of the engine 3 based on the detection signals from the aforementioned sensors 20 to 28, the ON/OFF signal from the IG·SW 29, and so forth, and executes air-fuel ratio control, ignition timing control, variable mechanism control, and so forth. The RAM of the ECU2 is equipped with a power failure compensation function, and holds data stored therein even after the IG·SW 29 has been turned off to stop the engine 3.

It should be noted that in the present embodiment, the ECU 2 corresponds to estimated mechanism temperature-calculating means, operating state parameter-detecting means, correction means, control means, air-fuel ratio parameter-detecting means, target air-fuel ratio-calculating means, air-fuel ratio control parameter-calculating means, fuel amount-determining means, air-fuel ratio control means, ignition timing-determining means, operating state parameter estimated value-calculating means, correction amount-calculating means, and corrected parameter-calculating means.

Next, a description will be given of the control apparatus 1 according to the present embodiment. The control apparatus 1 includes an air-fuel ratio controller 100 (see FIG. 10), and an ignition timing controller 180 that executes ignition timing control (see FIG. 26), both of which are implemented by the ECU 2.

Figure 10:
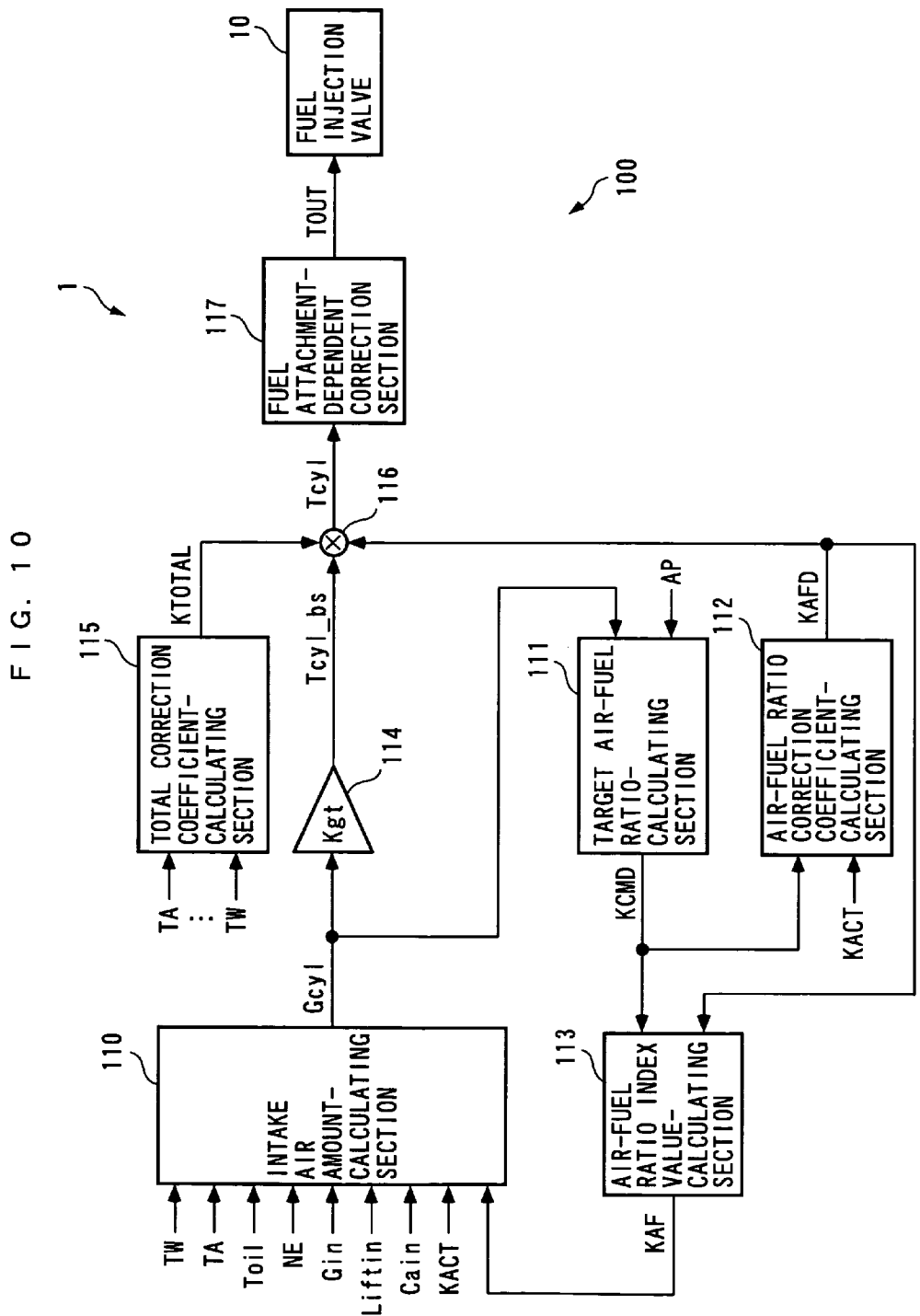
FIG. 10 is a schematic block diagram of an air-fuel ratio controller.

First, a description will be given of the air-fuel ratio controller 100. It should be noted that in the present embodiment, the air-fuel ratio controller 100 corresponds to the control means, the fuel amount-determining means, and the air-fuel ratio control means. As will be described hereinafter, the air-fuel ratio controller 100 is provided for calculating a fuel injection amount TOUT for each fuel injection valve 10, and as shown in FIG. 10, includes an intake air amount-calculating section 110, a target air-fuel ratio-calculating section 111, an air-fuel ratio correction coefficient-calculating section 112, an air-fuel ratio indicator value-calculating section 113, an amplification element 114, a total correction coefficient-calculating section 115, a multiplication element 116, and a fuel attachment-dependent correction section 117.

The intake air amount-calculating section 110 calculates an intake air amount Gcyl according to the engine coolant temperature TW, the atmosphere temperature TA, the oil temperature Toil, the engine speed NE, the air flow rate Gin, the valve lift Liftin, the cam phase Cain, the actual air-fuel ratio KACT, and an air-fuel ratio indicator value KAF, referred to hereinafter.

Further, the target air-fuel ratio-calculating section 111 (target air-fuel ratio-calculating means) calculates a target air-fuel ratio KCMD by searching a map shown in FIG. 11 according to the intake air amount Gcyl and the accelerator pedal opening AP. In this map, the value of the target air-fuel ratio KCMD is set as an equivalent ratio, and basically, it is set to a value corresponding to a stoichiometric air-fuel ratio (1. 0) so as to maintain excellent emission-reducing performance of the catalytic converter 14.

On the other hand, the air-fuel ratio correction coefficient-calculating section 112 calculates an air-fuel ratio correction coefficient KAFD according to the actual air-fuel ratio KACT and the target air-fuel ratio KCMD. More specifically, the air-fuel ratio correction coefficient KAFD is calculated with a simplified response-specifying algorithm (a sliding mode control algorithm or a back-stepping control algorithm) expressed by the following equations (1) to (5) such that the air-fuel ratio of the mixture, i.e. the actual air-fuel ratio KACT is caused to converge to the target air-fuel ratio KCMD, and as a value in terms of the equivalent ratio.

$$KAFD(n)=Urch(n)+Uadp(n) \quad (1)$$

$$Urch(n)=-Krch' \cdot \sigma'(n) \quad (2)$$

$$Uadp(n)=Uadp(n-1)-Kadp' \cdot \sigma'(n) \quad (3)$$

$$\sigma'(n)=e(n)+S' \cdot e(n-1) \quad (4)$$

$$e(n)=KACT(n)-KCMD(n) \quad (5)$$

In the above equations (1) to (5), discrete data with a symbol (n) indicates that it is data sampled or calculated at a control period ΔTn synchronous with generation of each TDC signal pulse. The symbol n indicates a position in the sequence of sampling of respective discrete data. For example, the symbol n indicates that discrete data therewith is a value sampled or calculated in the current control timing, and a symbol n−1 indicates that discrete data therewith is a value sampled or calculated in the immediately preceding control timing. This also applies to the following discrete data. It should be noted that in the following description, the symbol (n) provided for the discrete data are omitted as deemed appropriate.

As shown in the equation (1), the air-fuel ratio correction coefficient KAFD is calculated as the sum of a reaching law input Urch and an adaptive law input Uadp and the reaching law input Urch is calculated using the equation (2). In the equation (2), Krch' represents a predetermined reaching law gain, and σ' represents a switching function defined by the equation (4). In the equation (4), S' represents a switching function-setting parameter set to a value which satisfies the relationship of −1<S'<0 and the symbol e represents a follow-up error defined by the equation (5).

Furthermore, the adaptive law input Uadp is calculated by the equation (3). In the equation (3), Kadp' represents a predetermined adaptive law gain. It should be noted that the initial value of the adaptive law input Uadp is set to 1.

As described above, the air-fuel ratio correction coefficient-calculating section 112 calculates the air-fuel ratio correction coefficient KAFD according to the actual air-fuel ratio KACT and the target air-fuel ratio KCMD. It should be noted that in the present embodiment, the air-fuel ratio correction coefficient-calculating section 112 corresponds to the air-fuel ratio control parameter-calculating means and the air-fuel ratio correction coefficient KAFD corresponds to the air-fuel ratio control parameter.

On the other hand, the air-fuel ratio indicator value-calculating means 113 calculates the air-fuel ratio indicator value KAF according to the air-fuel ratio correction coefficient KAFD and the target air-fuel ratio KCMD by the following equation (6):

$$KAF(n) = \frac{KAFD(n)}{KCMD(n)} \quad (6)$$

Furthermore, the amplification element 114 calculates a basic fuel injection amount Tcyl_bs based on the intake air amount Gcyl, by the following equation (7):

$$Tcyl\_bs(n)=Kgt \cdot Gcyl(n) \quad (7)$$

wherein Kgt represents a conversion coefficient set in advance for each fuel injection valve 10.

On the other hand, the total correction coefficient-calculating section 115 calculates various correction coefficients by searching maps, not shown, according to parameters, such as the engine coolant temperature TW and the atmosphere temperature TA, indicative of the operating conditions of the engine, and calculates a total correction coefficient KTOTAL by multiplying the thus calculated correction coefficients by each other.

Further, the multiplication element 116 calculates a required fuel injection amount Tcyl by the following equation (8):

$$Tcyl(n)=Tcyl\_bs(n) \cdot KAFD(n) \cdot KTOTAL(n) \quad (8)$$

Furthermore, the fuel attachment-dependent correction section 117 calculates the fuel injection amount TOUT (fuel amount) by performing a predetermined fuel attachment-dependent correction process on the required fuel injection amount Tcyl calculated as above. Then, the fuel injection valve 10 is controlled such that the fuel injection timing and the valve-opening time period thereof are determined based on the fuel injection amount TOUT.

Figure 12:
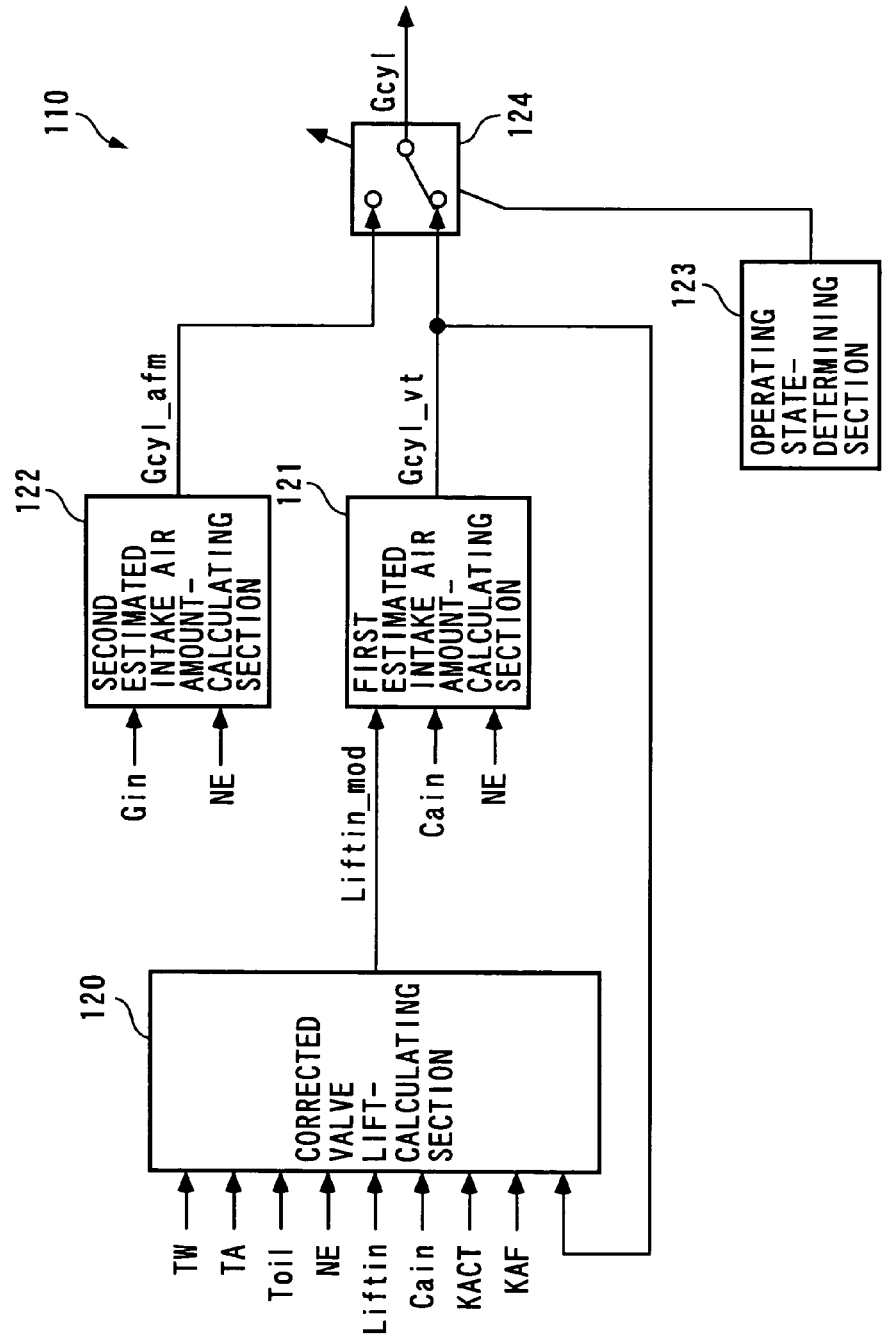
FIG. 12 is a schematic block diagram of an intake air amount-calculating section.

Next, a description will be given of the aforementioned intake air amount-calculating section 110. The intake air amount-calculating section 110 includes, as shown in FIG. 12, a corrected valve lift-calculating section 120, a first estimated intake air amount-calculating section 121, a second estimated intake air amount-calculating section 122, an operating state-determining section 123, and an intake air amount-selecting section 124.

The corrected valve lift-calculating section 120 calculates, as described hereinafter, a corrected valve lift Liftin_mod according to various parameters including the engine coolant temperature TW at a predetermined control period ΔT (e.g. 10 msec) different from the aforementioned control period ΔTn. It should be noted that in the present embodiment, the corrected valve lift Liftin_mod corresponds to a corrected parameter.

Figure 13:
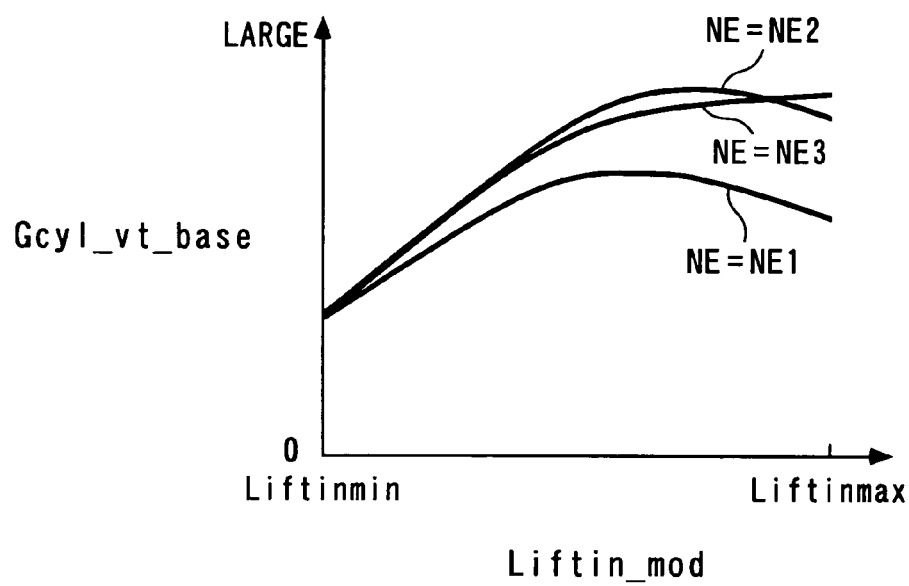
FIG. 13 is a diagram showing an example of a map for use in calculating a map value Gcyl_vt_base.

Further, the first estimated intake air amount-calculating section 121 calculates a first estimated intake air amount Gcyl_vt by the equation (9). It should be noted that in the present embodiment, the first estimated intake air amount Gcyl_vt corresponds to a load parameter.

$$Gcyl\_vt(n) = K\_gcy\_vt(n) \cdot Gcyl\_vt\_base(n) \qquad (9)$$

wherein Gcyl_vt_base represents a map value of the first estimated intake air amount, and K_gcyl_vt represents a correction coefficient, and these are calculated as follows:

First, a map value Gcyl_vt_base is calculated by searching a map shown in FIG. 13 according to the engine speed NE and the corrected valve lift Liftin_mod. In this case, since the corrected valve lift Liftin_mod is calculated at the predetermined control period ΔT different from the aforementioned control period ΔTn, and hence the value Liftin_mod(n) is used which is sampled at the control period ΔTn. Further, in FIG. 13, NE1 to NE3 represent predetermined values of the engine speed NE, between which the relationship of NE1<NE2<NE3 holds. This also applies to the following description.

In this map, when NE=NE1 or NE2 holds, in a region where the corrected valve lift Liftin_mod is small, the map value Gcyl_vt_base is set to a larger value as the corrected valve lift Liftin_mod is larger, whereas in a region where the corrected valve lift Liftin_mod is close to the maximum value Liftinmax, the map value Gcyl_vt_base is set to a smaller value as corrected valve lift Liftin_mod is larger. This is because in a low-to-medium engine speed region, as the corrected valve lift Liftin_mod is larger in the region where the corrected valve lift Liftin_mod is close to the maximum value Liftinmax, the valve-opening time period of the intake valve 4 becomes longer, whereby charging efficiency is reduced by blow-back of intake air.

Further, when NE=NE3 holds, the map value Gcyl_vt_base is set to a larger value as the corrected valve lift Liftin_mod is larger. This is because in a high engine speed region, the above-described blow-back of intake air is made difficult to occur even in a region where the corrected valve lift Liftin_mod is large, due to the inertia force of intake air, so that the charging efficiency becomes higher as the corrected valve lift Liftin_mod is larger.

Figure 14:
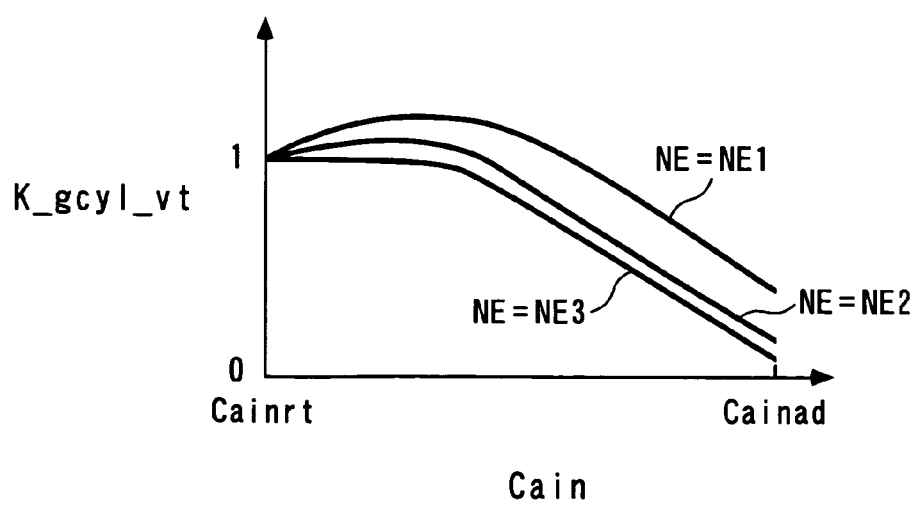
FIG. 14 is a diagram showing an example of a map for use in calculating a correction coefficient K_gcyl_vt.

On the other hand, the correction coefficient K_gcyl_vt is calculated by searching a map shown in FIG. 14 according to the engine speed NE and the cam phase Cain. In the FIG. 14 map, when NE=NE1 or NE2 holds, in a region where the cam phase Cain is close to the most retarded value Cainrt, the correction coefficient K_gcyl_vt is set to a smaller value as the cam phase Cain is closer to the most retarded value Cainrt, and in the other regions, the correction coefficient K_gcyl_vt is set to a smaller value as the cam phase Cain assumes a value closer to the most advanced value Cainad. This is because in the low-to-medium engine speed region, as the cam phase Cain is closer to the most retarded value Cainrt in the region where the cam phase Cain is close to the most retarded value Cainrt, the valve-closing timing of the intake valves 4 is retarded, whereby the charging efficiency is degraded by the blow-back of intake air, and in the other regions, as the cam phase Cain assumes a value closer to the most advanced value Cainad, the valve overlap increases to increase the internal EGR amount, whereby the charging efficiency is degraded.

Further, when NE=NE3 holds, in the region where the cam phase Cain is close to the most retarded value Cainrt, the correction coefficient K_gcyl_vt is set to a fixed value (a value of 1), and in the other regions, the correction coefficient K_gcyl_vt is set to a smaller value as the cam phase Cain assumes a value closer to the most advanced value Cainad. This is because in the high engine speed region, the blow-back of intake air is made difficult to occur even in a region where the cam phase Cain is close to the most advanced value Cainad, due to the above-mentioned inertia force of intake air.

On the other hand, the second estimated intake air amount-calculating section 122 calculates a second estimated intake air amount Gcyl_afm based on the air flow rate Gin and the engine speed NE, by the following equation (10):

$$Gcyl\_afm(n) = \frac{Gin(n) \cdot 60}{2 \cdot NE(n)} \qquad (10)$$

Further, the operating state-determining section 123 determines whether or not at least one of the variable valve lift mechanism 50 and the variable cam phase mechanism 70 is faulty, and according to the result of the determination, a value of the variable mechanism failure flag F_VDNG is set. It should be noted that in the following description, the variable valve lift mechanism 50 and the variable cam phase mechanism 70 are collectively referred to as "the two variable mechanisms". The variable mechanism failure flag F_VDNG is set to 1, when it is determined that at least one of the variable valve lift mechanism 50 and the variable cam phase mechanism 70 is faulty, whereas when it is determined that the variable valve lift mechanism 50 and the variable cam phase mechanism 70 are both normal, the variable mechanism failure flag F_VDNG is set to 0.

In this case, the determination of failure of the variable valve lift mechanism 50 is executed as follows: When a state in which the absolute value of the difference between the valve lift Liftin and a target valve lift Liftin_cmd exceeds a predetermined threshold value has continued for a predetermined time period or longer, or when a state in which the absolute value of the lift control input U_Liftin exceeds a predetermined value has continued for a predetermined time period or longer, it is determined that the valve lift mechanism 50 is faulty, and otherwise that the valve lift mechanism 50 is normal.

The determination of failure of the variable cam phase mechanism 70 is executed similarly to that of failure of the variable valve lift mechanism 50. More specifically, when a state in which the absolute value of the difference between the cam phase Cain and the target cam phase Cain_cmd exceeds a predetermined threshold value has continued for a predetermined time period or longer, or when a state in which the absolute value of the phase control input U_Cain exceeds a predetermined value has continued for a predetermined time period or longer, it is determined that the variable cam phase mechanism 70 is faulty, and otherwise that the variable cam phase mechanism 70 is normal.

Then, the intake air amount-selecting section 124 calculates the intake air amount Gcyl depending on the value of the variable mechanism failure flag F_VDNG set by the operating state-determining section 123 by a corresponding one of the following equations (11) and (12):

WHEN F_VDNG=0, $$Gcyl(n)=Gcyl\_vt(n) \tag{11}$$

WHEN F_VDNG=1, $$Gcyl(n)=Gcyl\_afm(n) \tag{12}$$

More specifically, when the two variable mechanism are both normal, the first estimated intake air amount Gcyl_vt is selected as the intake air amount Gcyl, and otherwise, the second estimated intake air amount Gcyl_afm is selected as the intake air amount Gcyl.

Next, a description will be given of the aforementioned corrected valve lift-calculating section 120. It should be noted that in the present embodiment, the corrected valve lift-calculating section 120 corresponds to the estimated mechanism temperature-calculating means, the correction means, the operating state parameter estimated value-calculating means, the correction amount-calculating means, and the corrected parameter-calculating means.

Figure 15:
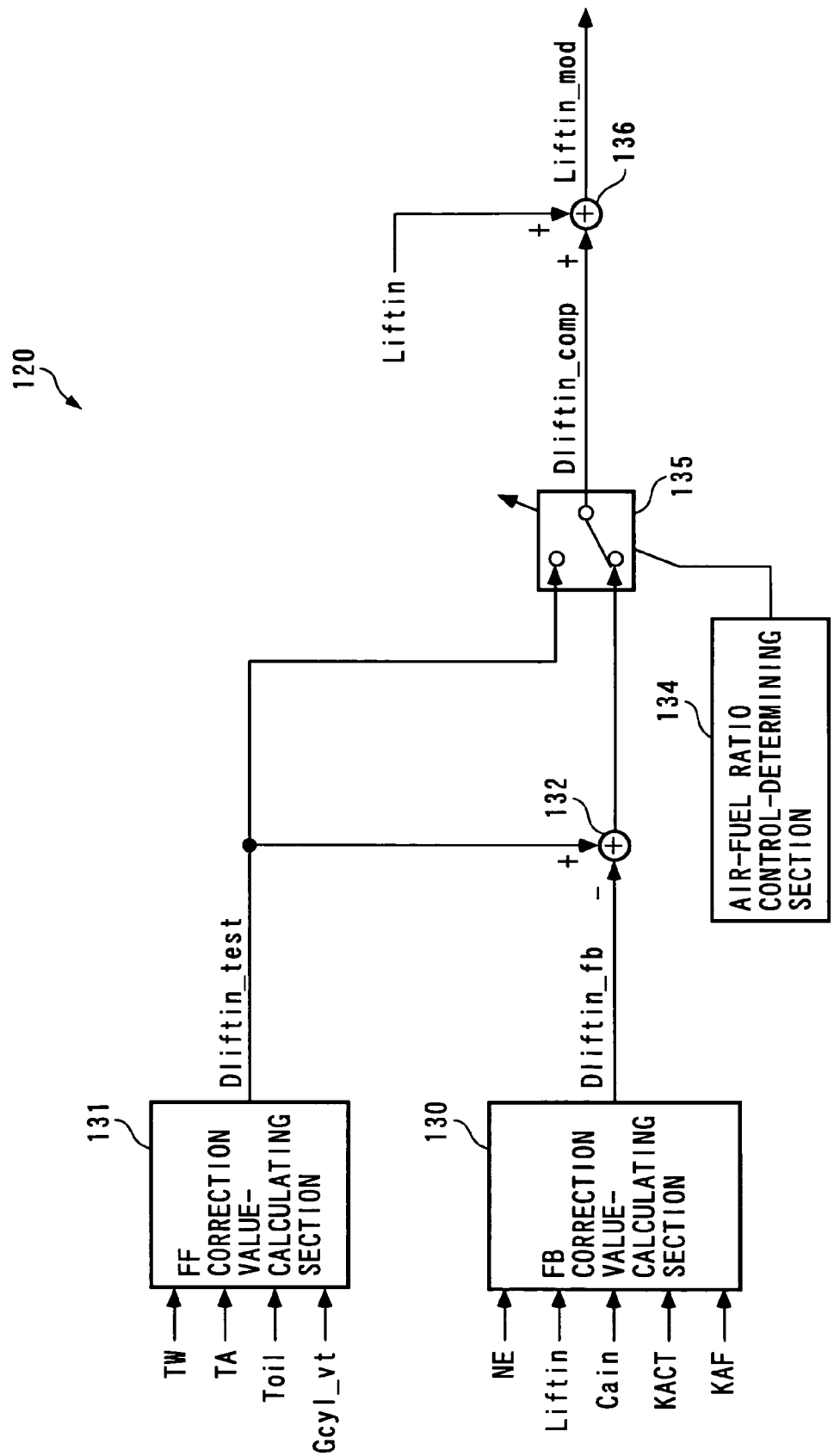
FIG. 15 is a schematic block diagram of a corrected valve lift-calculating section.

The corrected valve lift-calculating section 120 calculates the corrected valve lift Liftin_mod as described hereinafter, and as shown in FIG. 15, includes an FB correction value-calculating section 130, an FF correction value-calculating section 131, a subtraction element 132, an air-fuel ratio control-determining section 134, a corrected value-selecting section 135, and an addition element 136.

First, the FB correction value-calculating section 130 calculates the FB correction value Dliftin_fb according to the engine speed NE, the valve lift Liftin, the cam phase Cain, the actual air-fuel ratio KACT, and the air-fuel ratio indicator value KAF, as described hereinafter.

On the other hand, the FF corrected value-calculating section 131 calculates an FF correction value Dliftin_test by a method described below. The FF correction value Dliftin_test corrects the valve lift Liftin since when the temperature of the variable valve lift mechanism 50 per se changes, the valve lift Liftin calculated based on the detection signal from the pivot angle sensor 25 deviates from the actual valve lift value due to thermal expansion and contraction of the variable valve lift mechanism 50.

Further, when the variable valve lift mechanism 50 is thermodynamically modeled, a thermodynamic model is obtained which is represented by the following equation (13):

$$\frac{\text{Tlift\_hat}(K+1) - \text{Tlift\_hat}(K)}{\Delta T} = \alpha \cdot \text{Gcyl\_vt}(k) + \beta \cdot \tag{13}$$

$$(\text{Tlift\_hat}(k) - TA(k)) +$$

$$\gamma \cdot (\text{Tlift\_hat}(k) - TW(k)) +$$

$$\delta \cdot (\text{Tlift\_hat}(k) - Toil(k))$$

In the equation (13), each portion with (k) represents discrete data sampled or calculated in synchronism with an aforementioned predetermined control period ΔT. It should be noted that in the following description, the symbol (k) and the like provided for the discrete data are omitted as deemed appropriate. Further, in the equation (13), Tlift_hat represents an estimated temperature of the variable valve lift mechanism 50 (hereinafter referred to as "the estimated mechanism temperature"), and α, β, γ, and δ represent predetermined model parameters.

Here, the first term α·Gcyl_vt of the right side of the equation (13) represents influence of the heated condition of the engine 3 on the variable valve lift mechanism 50, while the second term β·(Tlift_hat−TA) of the right side of the same represents a heat transfer condition between the variable valve lift mechanism 50 and the atmosphere. Further, the third term γ·(Tlift_hat−TW) of the right side of the same represents a heat transfer condition between the variable valve lift mechanism 50 and the coolant of the engine 3, and the fourth term δ·(Tlift_hat−Toil) of the right side of the same represents a heat transfer condition between the variable valve lift mechanism 50 and lubricating oil.

When the above equation (13) is rearranged with respect to the estimated mechanism temperature Tlift_hat, and is shifted to the past side by one discrete time step, the following equation (14) is obtained by which the estimated mechanism temperature Tlift_hat is calculated:

$$\text{Tlift\_hat}(k) = \alpha \cdot \Delta T \cdot \text{Gcyl\_vt}(k-1) + \tag{14}$$

$$\{1 + (\beta + \gamma + \delta)\Delta T\}\text{Tlift\_hat}(k-1) -$$

$$\beta \cdot \Delta T \cdot TA(k-1) - \gamma \cdot \Delta T \cdot TW(k-1) -$$

$$\delta \cdot \Delta T \cdot Toil(k-1)$$

Then, by searching a map shown in FIG. 16 according to the estimated mechanism temperature Tlift_hat calculated by the equation (14), the FF correction value Dliftin_test is calculated. In FIG. 16, Tlift1 and Tlift2 represent predetermined values of the estimated mechanism temperature which satisfy the relationship of Tlift1<Tlift2, and Dliftin1 is a predetermined positive value.

In this map, within the range of Tlift1<Tlift_hat<Tlift2, the FF correction value Dliftin_test is set to a larger value as the estimated mechanism temperature Tlift_hat is lower. This is for the following reason: The variable valve lift mechanism 50 has a characteristic dependent on the structure thereof that when it is in a low-temperature condition, the valve lift Liftin exhibits a smaller value than the actual lift of the intake valves 4, and the difference between the actual lift and the valve lift Liftin becomes larger as the temperature of the variable valve lift mechanism 50 is lower. Therefore, to compensate for the deviation, as described hereinafter, the FF correction value Dliftin_test is used as the addition correction term for the valve lift Liftin, and set to have the tendency described above. Further, the map is configured such that within the range of Tlift_hat≦Tlift1, Dliftin_test=Dliftin1 holds. This is to avoid degradation of the operating state of the engine due to an excessive temperature-dependent correction of the intake air amount Gcyl.

Further, the map is configured such that within the range of Tlift2≦Tlift_hat, Dliftin_test=0 holds. This is because in such a temperature region, the variable valve lift mechanism 50 is in a stable state without undergoing neither expansion nor contraction, and hence the temperature-dependent correction of the valve lift Liftin becomes unnecessary.

Next, the subtraction element 132 calculates the difference (Dliftin_test−Dliftin_fb) between the FF correction value and the FB correction value.

On the other hand, the air-fuel ratio control-determining section 134 determines whether or not the air-fuel ratio feedback control is being performed, and depending on the result of the determination, the value of a feedback control execution flag F_AFFB is set. More specifically, the feedback control execution flag F_AFFB is set to 1 during the air-fuel ratio feedback control, and otherwise to 0.

Next, depending on the value of the feedback control execution flag F_AFFB set by the air-fuel ratio control-determining section 134, the corrected value-selecting section 135 calculates a lift correction value Dliftin_comp by a corresponding one of the following equations (15) and (16):

WHEN F_AFFB=1, $$\text{Dliftin\_comp}(k)=\text{Dliftin\_test}(k)-\text{Dliftin\_fb}(k) \quad (15)$$

WHEN F_AFFB=0, $$\text{Dliftin\_comp}(k)=\text{Dliftin\_test}(k) \quad (16)$$

More specifically, during the air-fuel ratio feedback control, the difference (Dliftin_test−Dliftin_fb) between the FF correction value and the FB correction value is selected as the lift correction value Dliftin_comp, and otherwise, the FF correction value Dliftin_test is selected as the lift correction value Dliftin_comp. It should be noted that in the present embodiment, the lift correction value Dliftin_comp and the FB correction value Dliftin_fb correspond to the correction amount.

Then, the addition element 136 calculates the corrected valve lift Liftin_mod by the following equation (17):

$$\text{Liftin\_mod}(k)=\text{Liftin}(k)+\text{Dliftin\_comp}(k) \quad (17)$$

Next, a description will be given of the aforementioned FB correction value-calculating section 130. As shown in FIG. 17, the FB correction value-calculating section 130 is comprised of a third estimated intake air amount-calculating section 140, delay elements 141, 142, and 144, an estimated valve lift-calculating section 143, a subtraction element 145, a weighted statistical processing filter 146, and a response-specifying controller 147.

Figure 18:
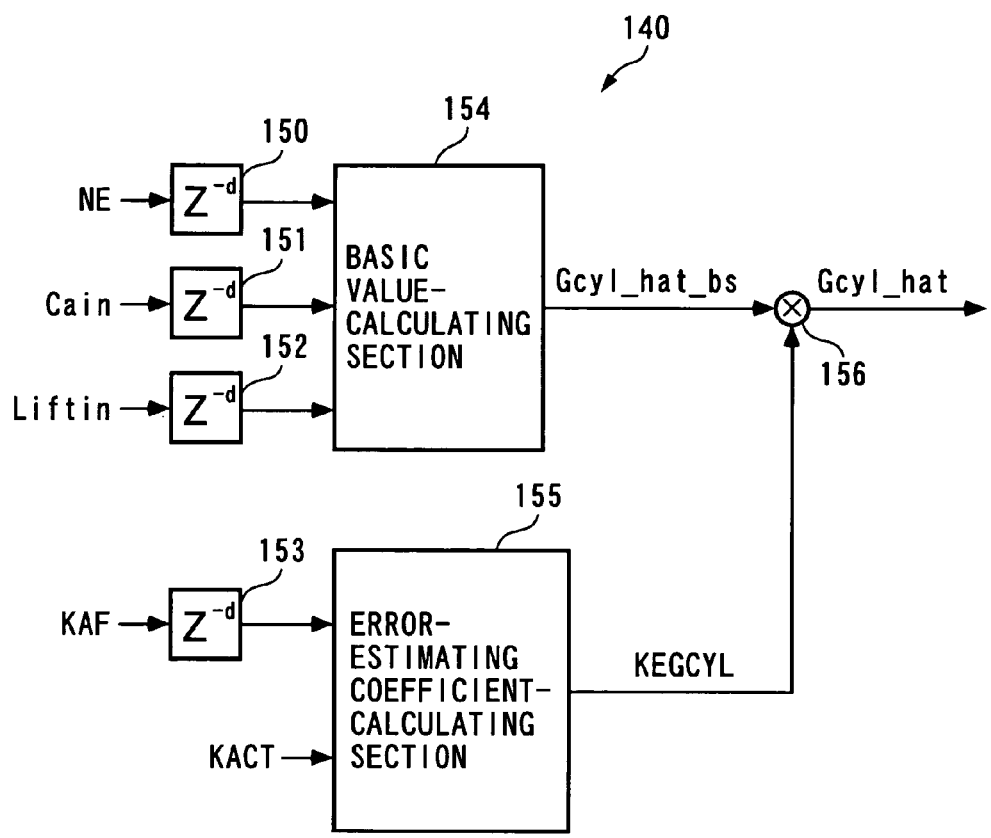
FIG. 18 is a schematic block diagram of a third estimated intake air amount-calculating section.

First, a description will be given of the third estimated intake air amount-calculating section 140. The third estimated intake air amount-calculating section 140 calculates a third estimated intake air amount Gcyl_hat at the aforementioned control period ΔTn. More specifically, as shown in FIG. 18, the third estimated intake air amount-calculating section 140 is comprised of four delay elements 150 to 153, a basic value-calculating section 154, an error estimation coefficient-calculating section 155, and a multiplication element 156.

The four delay element 150 to 153 calculate respective values NE(n−d), Cain(n−d), Liftin(n−d), and KAF(n−d) of the engine speed NE, the cam phase Cain, the valve lift Liftin, and the air-fuel ratio indicator value KAF, in all of which is reflected dead time d. The dead time d is a time period estimated to be taken before combustion gases generated in the combustion chamber by combustion of the mixture reach the LAF sensor 24, and is more specifically calculated by searching a map shown in FIG. 19 according to the engine speed NE and the first estimated intake air amount Gcyl_vt.

Figure 19:
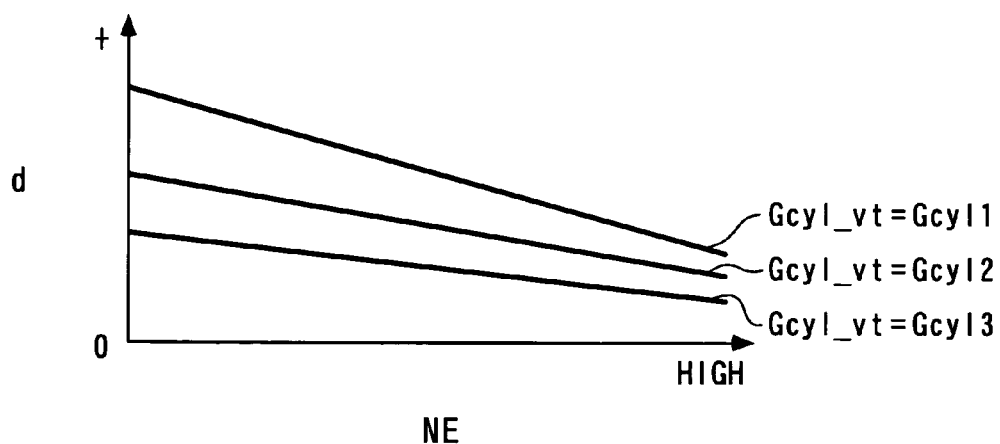
FIG. 19 is a diagram showing an example of a map for use in calculating dead time d.

In FIG. 19, Gcyl1 to Gclyl3 are predetermined values of the first estimated intake air amount Gcyl_vt set to satisfy the relationship of Gcyl1<Gcyl2<Gclyl3. In this map, as the engine speed NE is higher, or the first estimated intake air amount Gcyl_vt is larger (i.e. as the load is higher), the dead time d is set to a smaller value. This is due to the fact that in such an operating condition of the engine, the flow speed of exhaust gases become high, so that the time taken before the exhaust gases reach the LAF sensor 24, i.e. dead time d becomes shorter. It should be noted that in this map, the dead time d is set to a value indicative of the number of executions of the computation performed at the control period ΔTn.

Figure 20:
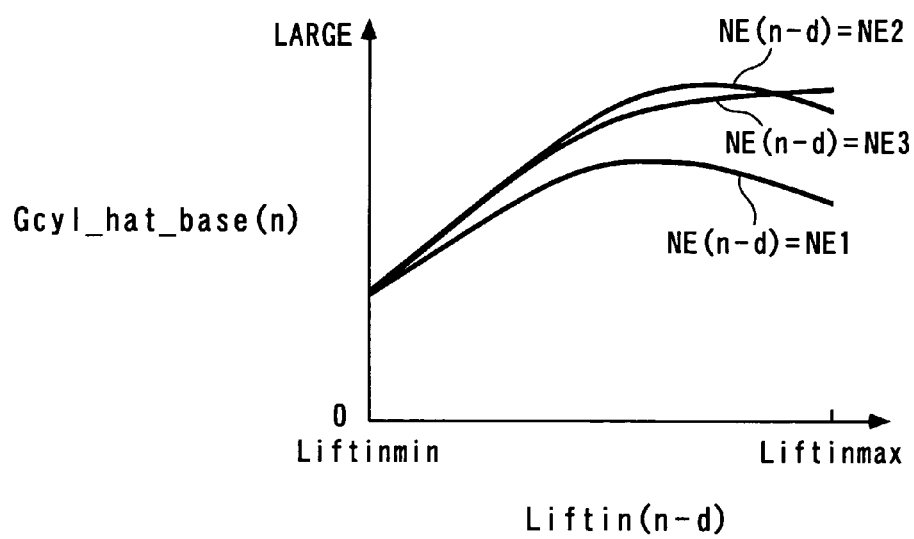
FIG. 20 is a diagram showing an example of a map for use in calculating a map value Gcyl_hat_base.

Then, the basic value-calculating section 154 calculates a basic value Gcyl_hat_bs to be used for the calculation of the third estimated intake air amount Gcyl_hat by the following equation (18):

$$\text{Gcyl\_hat\_bs}(n)=K\_\text{gcyl\_hat}(n)\_\text{Gcyl\_hat\_base}(n) \quad (18)$$

wherein Gcyl_hat_base represents a map value of the third estimated intake air amount, and K_gcyl_hat represents a correction coefficient. These are calculated as follows:

First, the map value Gcyl_hat_base is calculated by searching a map shown in FIG. 20 according to the engine speed NE(n−d) and the valve lift Liftin(n−d). In this map, the map value Gcyl_hat_base is set to have the same tendency as that of the above-described map value Gcyl_vt_base shown in FIG. 13. This is for the same reason as described hereinabove with reference to FIG. 13.

Figure 21:
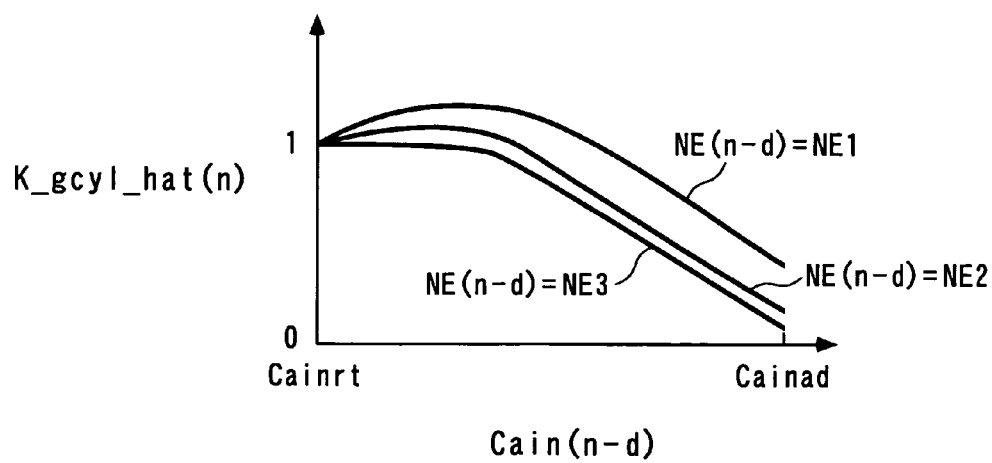
FIG. 21 is a diagram showing an example of a map for use in calculating a correction coefficient K_gcyl_hat.

Further, the correction coefficient K_gcyl_hat is calculated by searching a map shown in FIG. 21 according to the engine speed NE(n−d) and the cam phase Cain(n−d). In this map, the correction coefficient K_gcyl_hat is set to have the same tendency as that of the correction coefficient K_gcyl_vt shown in FIG. 14. This is for the same reason as described hereinabove with reference to FIG. 14.

On the other hand, the error estimation coefficient-calculating section 155 calculates an error estimation coefficient KEGCYL by the following equation (19):

$$KEGCYL(n) = \frac{KACT(n)}{KAF(n-d)} \quad (19)$$

Then, the multiplication element 156 calculates the third estimated intake air amount Gcyl_hat by the following equation (20):

$$\text{Gcyl\_hat}(n)=KEGCYL(n)\cdot\text{Gcyl\_hat\_bs}(n) \quad (20)$$

As described above, the third estimated intake air amount-calculating section 140 calculates the third estimated intake air amount Gcyl_hat using the values NE(n−d), Cain(n−d), Liftin(n−d), and KAF(n−d) of the engine speed NE, the cam phase Cain, the valve lift Liftin, and the air-fuel ratio indicator value KAF, in all of which is reflected the dead time d, and the present value KACT(n) of the actual air-fuel ratio, and the dead time d is set according to the engine speed NE and the first estimated intake air amount Gcyl_vt. This makes it possible to cause the dead time d which is taken before exhaust gases generated within the combustion chamber by combustion of the mixture reach the LAF sensor 24 to be reflected in the result of calculation of the third estimated intake air amount Gcyl_hat, and also cause a change in the dead time d caused by changes in the engine speed NE and the first estimated intake air amount Gcyl_vt to be reflected therein. As a result, the calculation accuracy of the third estimated intake air amount Gcyl_hat can be enhanced.

Referring again to FIG. 17, the aforementioned delay elements 141 and 142 calculate the values NE(k−d) and Cain(k−d) of the engine speed NE and the cam phase Cain in which the dead time d is reflected. In this case, as described above, the dead time d is calculated as the number of executions of the operation at the control period ΔTn different from the control period ΔT, and hence a value is used which is converted based on the engine speed NE, from time such that it corresponds to the number of executions of the operation at the control period ΔT.

Further, the estimated valve lift-calculating section 143 calculates an estimated valve lift Liftin_hat(k) by searching a map according to the sampled value Gcyl_hat(k) of the third estimated intake air amount at the control period ΔT, the engine speed NE(k−d), and the cam phase Cain(k−d). It should be noted that in the present embodiment, the estimated valve lift Liftin_hat corresponds to an estimated value of the operating state parameter.

Figure 22:
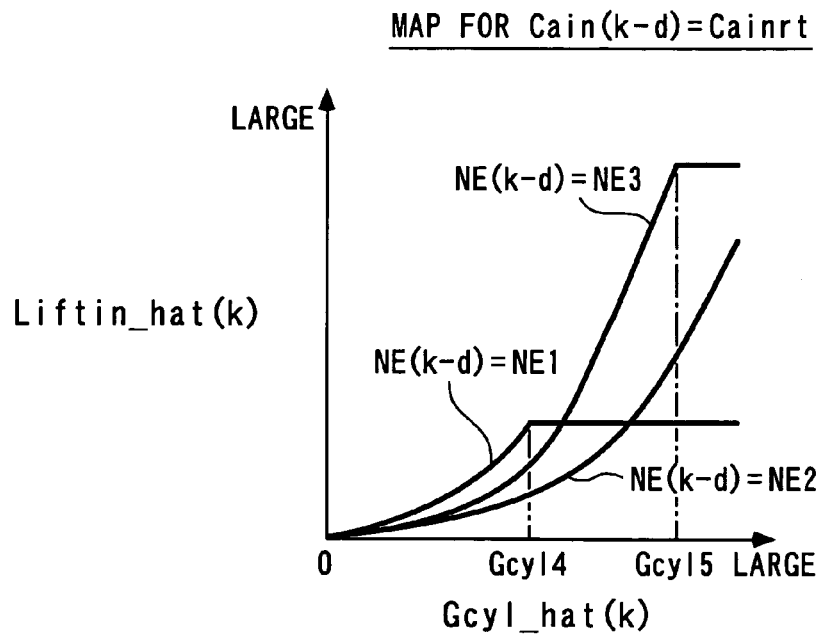
FIG. 22 is a diagram showing a map for Cain(k−d)=Cainrt for use in calculating an estimated valve lift Liftin_hat.
Figure 23:
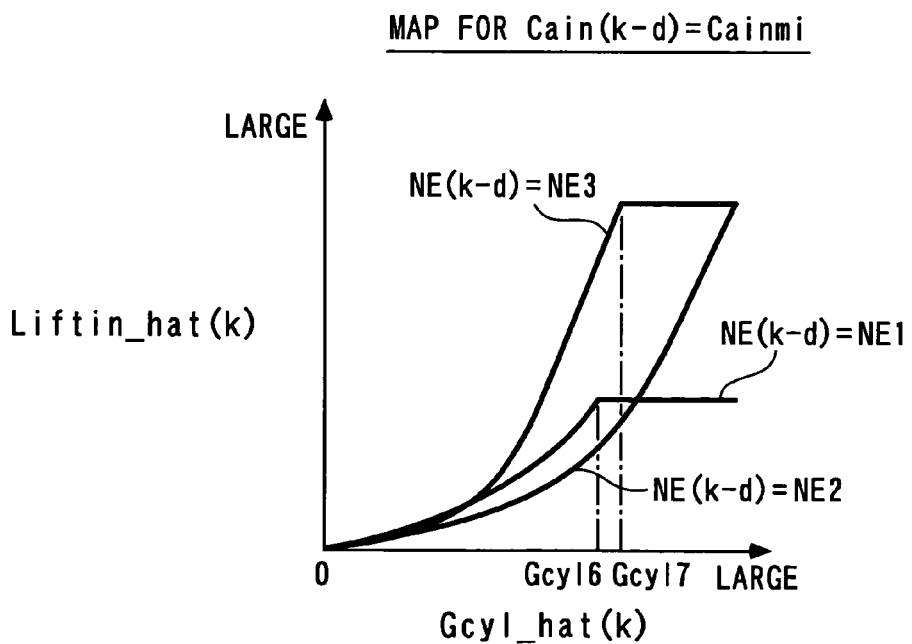
FIG. 23 is a diagram showing a map for Cain(k−d)=Cainmi for use in calculating the estimated valve lift Liftin_hat.

In this case, as the maps for use in the calculation of the estimated valve lift Liftin_hat(k), there are employed a map for Cain(k−d)=Cainrt shown in FIG. 22, a map for Cain(k−d)=Cainmi (value corresponding to Cainad/2) shown in FIG. 23, a map for Cain(k−d)=Cainad shown in FIG. 24, a large number of maps (not shown) configured in a manner corresponding respectively to a large number of values of the cam phase Cain(k−d) between Cainrt and Cainmi and between Cainmi and Cainad. In the above-described search of the maps, a plurality of values are selected based on the engine speed NE(k−d), the cam phase Cain(k−d), and the third estimated intake air amount Gcyl_hat(k), and the estimated valve lift Liftin_hat(k) is calculated by interpolation of the selected values.

In the map for Cain(k−d)=Cainrt shown in FIG. 22, the estimated valve lift Liftin_hat(k) is set to a large value as Gcyl_hat(k) is larger when NE(k−d)=NE2 holds. Further, in the range where Gcyl_hat(k) is smaller than a predetermined value Gcyl4, when NE(k−d)=NE1 holds, the estimated valve lift Liftin_hat(k) is set to a value which is larger than when NE(k−d)=NE2 holds and at the same is larger as Gcyl_hat(k) is larger. This is because as the engine speed NE varies, the charging efficiency varies due to the resonance effect, inertia effect of intake air, etc., and in a low speed region, the charging efficiency is higher as the engine speed NE is lower, so that the valve lift Liftin required for obtaining the intake air amount Gcyl becomes smaller. Further, when NE(k−d)=NE1 holds, in the range of Gcyl_hat(k)≧Gcyl4, the estimated valve lift Liftin_hat(k) is set to a fixed value. This is because when NE(k−d)=NE1 holds, even if the valve lift Liftin is set to a larger value than when Gcyl_hat(k)=Gcyl4 holds, it is impossible to obtain the intake air amount Gcyl which exceeds the maximum value Gcyl4.

Further, in the range where Gcyl_hat(k) is smaller than a predetermined value Gcyl5, the estimated valve lift Liftin_hat(k) is set to a value which is larger than when NE(k−d)=NE2 holds when the NE(k−d)=NE3, and at the same larger as Gcyl_hat(k) is larger. This is because, as described above, as the engine speed NE varies, the charging efficiency varies, and in a high engine speed region, as the engine speed NE is higher, the valve lift Liftin required for obtaining the intake air amount Gcyl becomes larger. Also, when NE(k−d)=NE3 holds, in the range of Gcyl_hat(k)≦Gcyl5, the estimated valve lift Liftin_hat(k) is set to a fixed value. This is because when NE(k−d)=NE3 holds, even if the valve Liftin is set to a larger value than when Gcyl_hat(k)=Gcyl5 holds, it is impossible to obtain the intake air amount Gcyl which exceeds the maximum value Gcyl5.

In the map for Cain(k−d)=Cainmi shown in FIG. 23, when NE(k−d)=NE1 holds, in the range where Gcyl_hat(k) is smaller than a predetermined value Gcyl6 larger than the aforementioned predetermined value Gcyl4, the estimated valve lift Liftin_hat(k) is set to a larger value as Gcyl_hat(k) is larger. This is because when Cain(k−d)=Cainrt holds, in a low engine speed region, a blow-back occurs due to delayed closing of the intake valves 4, whereas when Cain(k−d)=Cainmi holds, no such a blow-back occurs even in a low engine speed region, which makes the maximum value of the intake air amount Gcyl larger.

Further, in this map, when NE(k−d)=NE3 holds, in the range where Gcyl_hat(k) is smaller than a predetermined value Gcyl7 smaller than the aforementioned predetermined value Gcyl5, the estimated valve lift Liftin_hat(k) is set to a large value as Gcyl_hat(k) is larger. This is because when Cain(k−d)=Cainmi holds, in a high engine speed region, the inertia effect of intake air becomes smaller than when Cain(k−d)=Cainrt holds, which makes the maximum value of the intake air amount Gcyl smaller.

On the other hand, in the map for Cain(k−d)=Cainad shown in FIG. 24, when any of NE(k−d)=NE1, NE(k−d)=NE2, and NE(k−d)=NE3 holds, in the range where Gcyl_hat(k) is smaller than a predetermined value Gcyl8, the estimated valve lift Liftin_hat(k) is set to a larger value as Gcyl_hat(k) is larger. At the same time, the map values are set to values in a low lift region, as a whole. This is because, when Cain(k−d)=Cainad holds, as the valve overlap increases, the internal EGR amount increases, so that the intake air amount Gcyl decreases, and therefore to secure stability of combustion, a value in the low lift region is used as the valve lift Liftin. Further, in this map, the estimated valve lift Liftin_hat(k) is set to a smaller value as the engine speed NE is higher. This is because as the engine speed NE is higher, the scavenging effect of exhaust gases is improved to reduce the internal EGR amount, which reduces the valve lift Liftin for obtaining the same intake air amount Gcyl.

On the other hand, the delay element 144 calculates the value Liftin(k−d) in which the dead time d of the valve lift Liftin is reflected. Then, the subtraction element 145 calculates an estimation error Elift by the following equation (21):

$$\text{Elift}(k) = \text{Liftin\_hat}(k) - \text{Liftin}(k\text{-}d) \tag{21}$$

Then, the weighted statistical processing filter 146 calculates a statistically-processed value Elift_LS of the estimation error with a weighted sequential statistical processing algorithm expressed by the following equations (22) and (23):

$$\text{Elift\_LS}(k) = \text{Elift\_LS}(k-1) + \frac{P(k)}{1+P(k)} E\_LS(k) \tag{22}$$

$$E\_LS(k) = \text{Elift}(k) - \text{Elift\_LS}(k-1) \tag{23}$$

In the above equation (22), P represents a weighting gain, and E_LS is a difference defined by the equation (23). The weighting gain P is calculated by searching a map shown in FIG. 25 according to the valve lift Liftin(k−d). In this map, the weighting gain P is set to a smaller value as the valve lift Liftin(k−d) is larger. This is for the following reason:

As shown in FIGS. 22 to 24, referred to hereinbefore, in the region where the third estimated intake air amount Gcyl_hat is large, the slope of a curve indicative of the estimated valve lift Liftin_hat with respect to the third estimated intake air amount is larger, which means that the sensitivity of the estimated valve lift Liftin_hat becomes higher, and hence if the estimation error of the third estimated intake air amount Gcyl_hat is larger, the estimation error Elift of the estimated valve lift Liftin_hat also increases. As a result, as the estimation error Elift of the estimated valve lift Liftin_hat increases, the calculation accuracy of the FB correction value Dliftin_fb accordingly lowers. Therefore, to enhance the calculation accuracy of the FB correction value Dliftin_fb, i.e. the calculation accuracy of the corrected valve lift Liftin_cmd, the weighting gain P is set to a smaller value as the valve lift Liftin(k−d) is larger.

Next, the response-specifying controller 147 calculates the FB correction value Dliftin_fb with a simplified response-specifying control algorithm expressed by the following equations (24) and (25):

$$\text{Dliftin\_fb}(k) = -Krch \cdot \sigma(k) - Kadp \cdot \sum_i^k \sigma(i) \quad (24)$$

$$\sigma(k) = \text{Elift\_LS}(k) + S \cdot \text{Elift\_LS}(k-1) \quad (25)$$

In the equation (24), Krch and Kadp represent a predetermined reaching law gain and a predetermined adaptive law gain, respectively. Further, σ represents a switching function defined by the equation (25). In the equation (25), S represents a switching function-setting parameter set to a value which satisfies the relationship of −1<S<0.

Thus, the response-specifying controller 147 calculates the FB correction value Dliftin_fb with the simplified response-specifying control algorithm, and hence, such that the statistically-processed value Elift_LS of the estimation error is caused to converge to a value of 0. That is, the FB correction value Dliftin_fb is calculated such that the statistically-processed value Elift_LS of the estimation error becomes the minimum, and as a consequence, it is calculated such that the estimation error Elift becomes the minimum.

It should be noted that the reason for using the values NE(k−d), Cain(k−d), and Liftin(k−d) of the engine speed NE, the cam phase Cain, and the valve lift Liftin in all of which the dead time d is reflected, in the calculation of the FB correction value Dliftin_fb, is the same as that set forth hereinbefore in the description of the calculation of the third estimated intake air amount Gcyl_hat.

Figure 26:
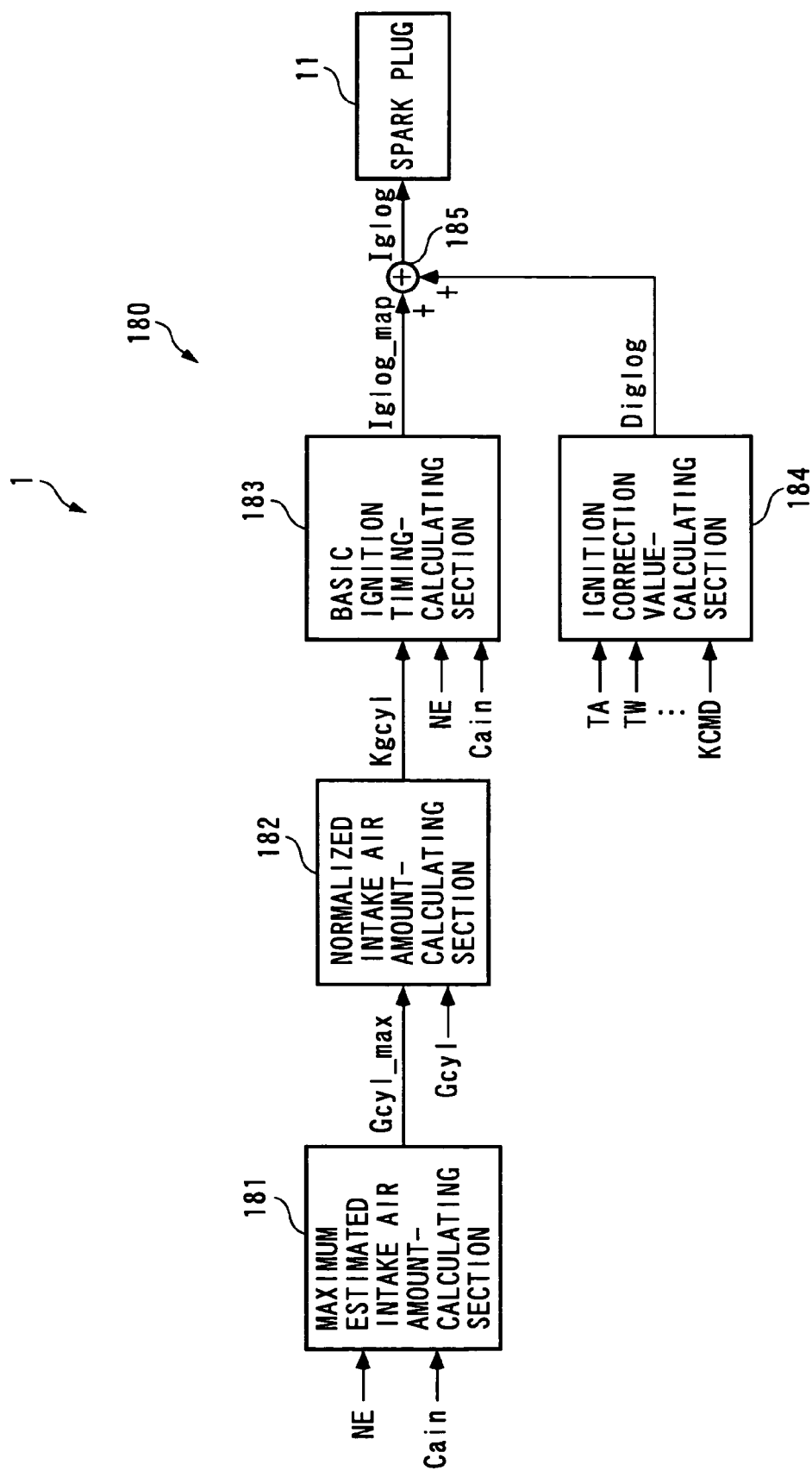
FIG. 26 is a schematic block diagram of an ignition timing controller.

Next, the ignition timing controller 180 will be described with reference to FIG. 26. It should be noted that in the present embodiment, the ignition timing controller 180 corresponds to the control means and the ignition timing-determining means. As described hereinafter, the ignition timing controller 180 calculates ignition timing Iglog, and is comprised of a maximum estimated intake air amount-calculating section 181, a normalized intake air amount-calculating section 182, a basic ignition timing-calculating section 183, an ignition correction value-calculating section 184, and an addition element 185.

Figure 27:
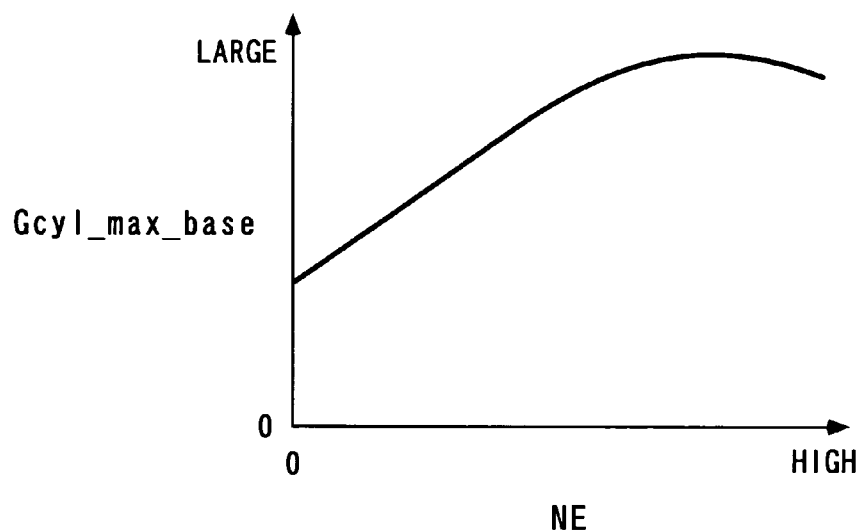
FIG. 27 is a diagram showing an example of a map for use in calculating a basic value of the maximum estimated intake air amount Gcyl_max_base.

The maximum estimated intake air amount-calculating section 181 calculates a maximum estimated intake air amount Gcyl_max according to the engine speed NE and the cam phase Cain. More specifically, first, a basic value Gcyl_max_base of the maximum estimated intake air amount is calculated by searching a map shown in FIG. 27 according to the engine speed NE.

This map is configured such that the basic value Gcyl_max_base is set to a larger value as the engine speed NE is higher in the low-to-medium engine speed region, and to a smaller value as the engine speed NE is higher in the high engine speed region, and assumes the maximum value when the engine speed NE is equal to a predetermined value in the medium engine speed region. This is because the intake system is configured such that from view point of drivability, the charging efficiency becomes highest when the engine speed NE is equal to the predetermined value in the medium engine speed region.

Figure 28:
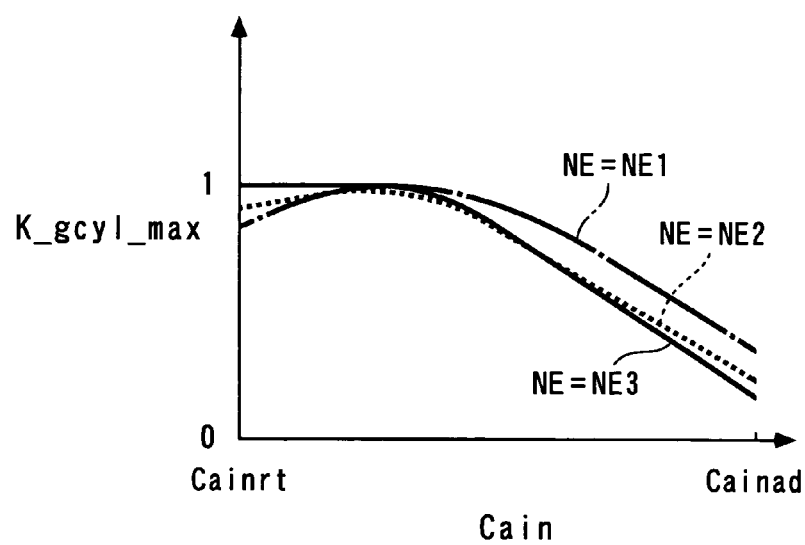
FIG. 28 is a diagram showing an example of a map for use in calculating a correction coefficient K_gcyl_max.

Further, a correction coefficient K_gcyl_max is calculated by searching a map shown in FIG. 28 according to the engine speed NE and the cam phase Cain. This map is configured such that when NE=NE1 or NE=NE2 holds, in a region where the cam phase Cain is close to the most retarded value Cainrt, the correction coefficient K_gcyl_max is set to a smaller value as the cam phase Cain is closer to the most retarded value Cainrt, and in the other regions, it is set to a smaller value as the cam phase Cain is closer to the most advanced value Cainad. Further, the map is configured such that when NE=NE3 holds, the correction coefficient K_gcyl_max is set to a fixed value (a value of 1) when the cam phase Cain is close to the most retarded value Cainrt, and in the other regions, it is set to a smaller value as the cam phase Cain is closer to the most advanced value Cainad. The reason for setting the correction coefficient K_gcyl_max as described above is the same as set forth hereinabove in the description of the map shown FIG. 14 which is used for calculation of the aforementioned correction coefficient K_gcyl_vt.

Further, the maximum estimated intake air amount Gcyl_max is calculated using the basic value Gcyl_max_base of the maximum estimated intake air amount and the correction coefficient K_gcyl_max by the following equation (26):

$$Gcyl\_\max(n) = K\_gcyl\_\max(n) \cdot Gcyl\_\max\_base(n) \quad (26)$$

Then, the normalized intake air amount-calculating section 182 calculates a normalized intake air amount Kgcyl by the following equation (27). In this case, as the intake air amount Gcyl, there is used a value calculated by the above-described intake air amount-calculating section 110.

$$Kgcyl(n) = \frac{Gcyl(n)}{Gcyl\_\max(n)} \quad (27)$$

Figure 29:
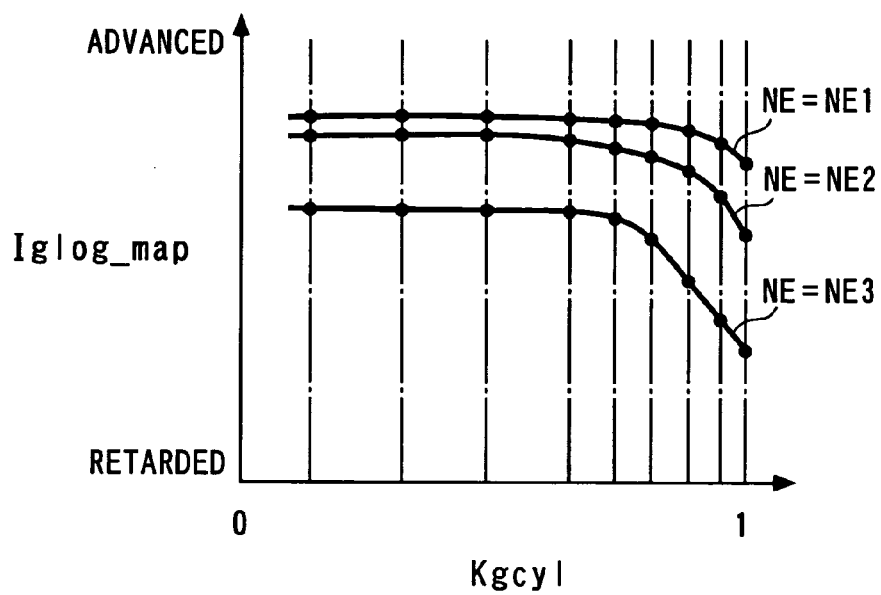
FIG. 29 is a diagram showing an example of a map for Cain=Cainrt for use in calculating basic ignition timing.
Figure 30:
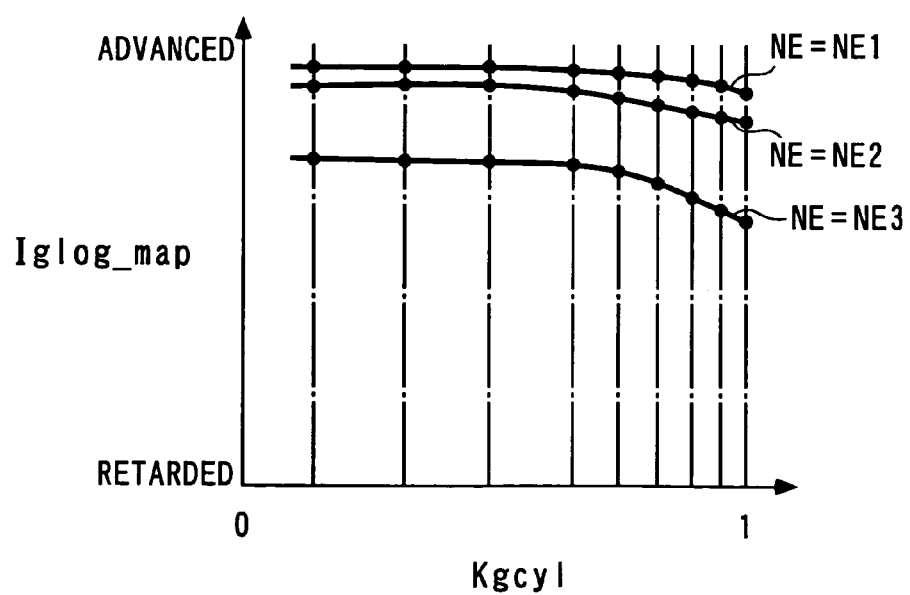
FIG. 30 is a diagram showing an example of a map for Cain=Cainad for use in calculating the basic ignition timing.

Further, the basic ignition timing-calculating section 183 calculates a basic ignition timing Iglog_map by searching a basic ignition map according to the normalized intake air amount Kgcyl, the engine speed NE, and the cam phase Cain. In this case, the basic ignition timing map is comprised of a map for Cain=Cainrt shown in FIG. 29, a map for Cain=Cainad shown in FIG. 30, and a plurality of maps (not shown) configured in a manner corresponding respectively to a plurality of steps of values of the cam phase Cain between the most retarded value Cainrt and the most advanced value Cainad of the cam phase Cain.

In searching the basic ignition timing maps described above, a plurality of values are selected based on the normalized intake air amount Kgcyl, the engine speed NE, and the cam phase Cain, and the basic ignition timing Iglog_map is calculated by interpolation of the selected values.

Further, the ignition correction value-calculating section 184 calculates various correction values by searching maps, not shown, according to the atmosphere temperature TA, the engine coolant temperature TW, the target air-fuel ratio KCMD, etc., and calculates an ignition correction value Diglog based on the calculated correction values.

Then, the addition element 185 calculates the ignition timing Iglog by the following equation (28):

$$Iglog(n) = Iglog\_map(n) + Diglog(n) \quad (28)$$

The spark plug 11 is controlled to cause a spark discharge in spark discharge timing dependent on the ignition timing Iglog.

Figure 31:
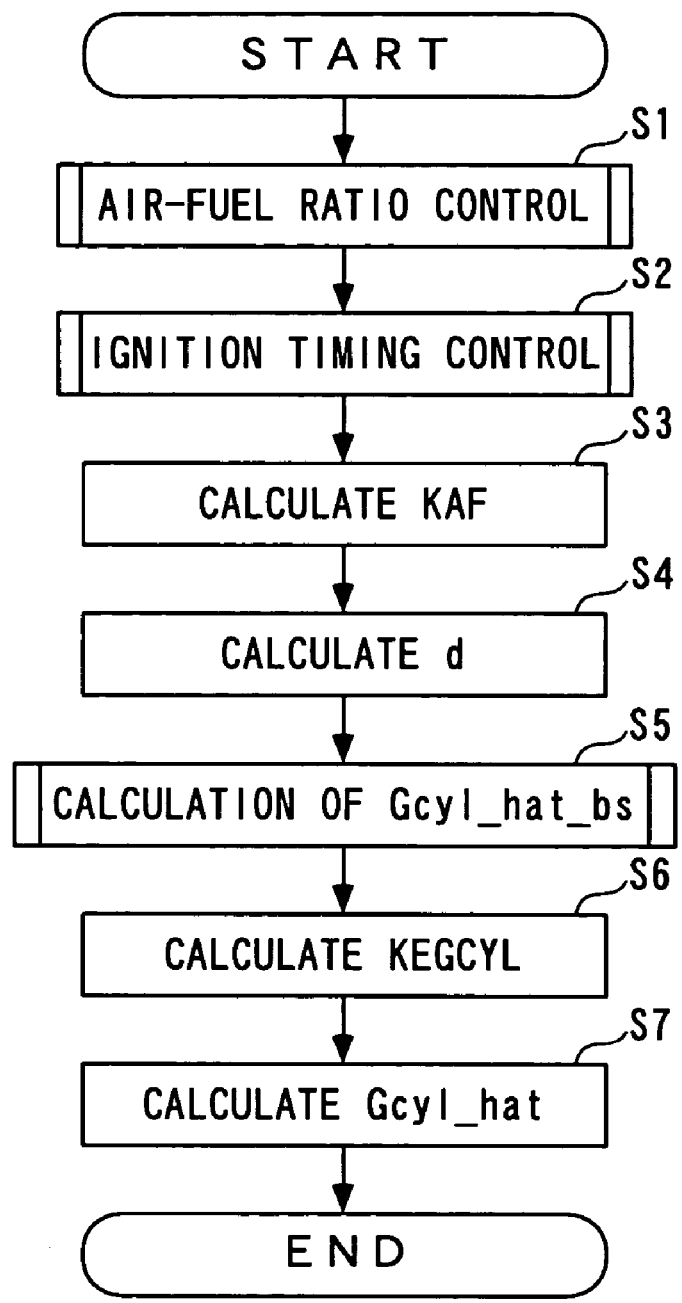
FIG. 31 is a flowchart showing a control process executed at a control period ΔTn.

Now, a description will be given of a control process executed by the ECU 2 at the aforementioned control period ΔTn with reference to FIG. 31. It is assumed that various values calculated in the following description are stored in the RAM of the ECU 2. In this process, first, in a step (in a step 1 (shown as S1 in abbreviated form in FIG. 31; the following steps are also shown in abbreviated form), an air-fuel ratio control process is executed in which the fuel injection amount TOUT is calculated. Details of the air-fuel ratio control process will be described in detail hereinafter.

Then, in a step 2, an ignition timing control process is executed in which ignition timing Iglog is calculated. Details of the ignition timing control process will be described hereinafter.

Next, in a step 3, the air-fuel ratio indicator value KAF is calculated using the air-fuel ratio correction coefficient KAFD and the target air-fuel ratio KCMD by the aforementioned equation (6). Then, in a step 4, the dead time d is calculated by searching the above-described map shown in FIG. 19 according to the first estimated intake air amount Gcyl_vt and the engine speed NE.

Then, in a step 5, the basic value Gcyl_hat_bs is calculated by the above-described calculation method. More specifically, the map value Gcyl_hat_base is calculated by searching the map shown in FIG. 20 according to the engine speed NE(n−d) and the valve lift Liftin(n−d), and further, the correction coefficient K_gcyl_hat is calculated by searching the map shown in FIG. 21 according to the engine speed NE(n−d) and the cam phase Cain(n−d). Then, the map value Gcyl_hat_bs is calculated using these values Gcyl_hat_bs and K_gcyl_hat by the aforementioned equation (18).

Next, the process proceeds to a step 6, wherein the error estimation coefficient KEGCYL is calculated by the aforementioned equation (19), and in the following step 7, the third estimated intake air amount Gcyl_hat is calculated by the aforementioned equation (20), followed by terminating the present process.

Figure 32:
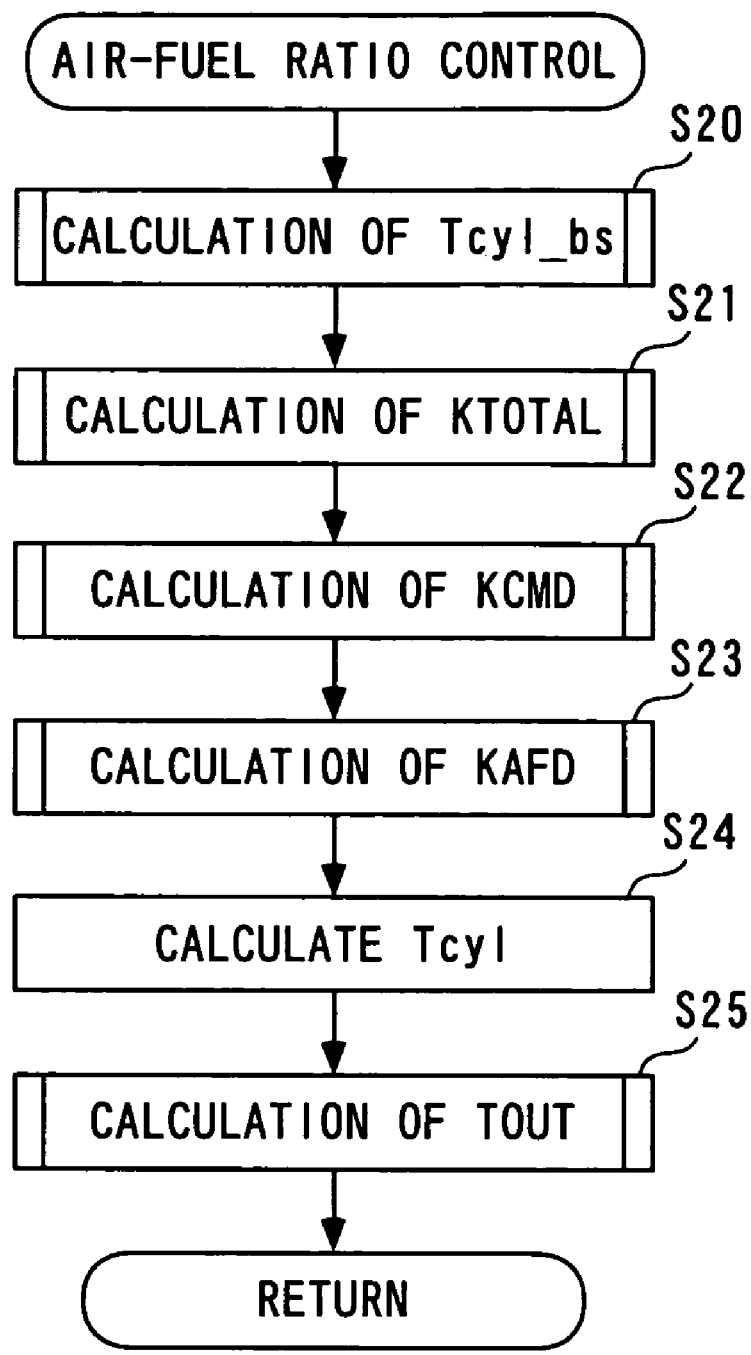
FIG. 32 is a flowchart showing an air-fuel ratio control process.

Hereinafter, the air-fuel ratio control process in the aforementioned step 1 will be described with reference to FIG. 32. The present process calculates the fuel injection amount TOUT for each fuel injection valve 10, and corresponds to the calculation by the air-fuel ratio controller 100, described hereinabove.

Figure 33:
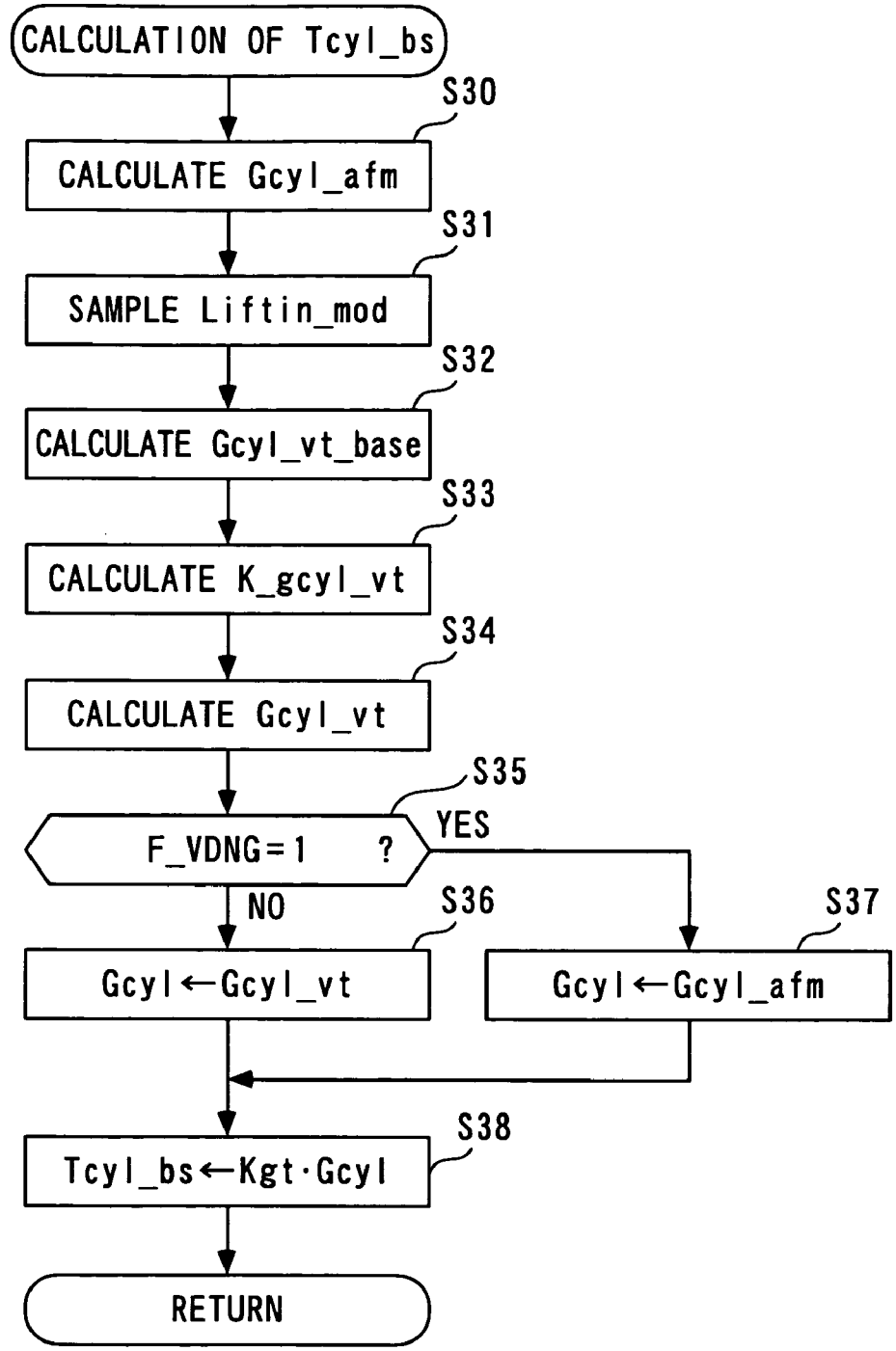
FIG. 33 is a flowchart showing a process for calculating a basic fuel injection amount Tcyl_bs.

First, in this process, in a step 20, the basic fuel injection amount Tcyl_bs is calculated. More specifically, the process for calculating the basic fuel injection amount Tcyl_bs is executed as shown in FIG. 33. That is, first, in a step 30, the second estimated intake air amount Gcyl_afm is calculated by the aforementioned equation (10).

Next, in a step 31, a value of the corrected valve lift Liftin_mod stored in the RAM is sampled. It should be noted that the corrected valve lift Liftin_mod is calculated at the control period ΔT different from the control period ΔTn of the present process.

Then, in a step 32 to a step 34, the first estimated intake air amount Gcyl_vt is calculated by the method described above. More specifically, the map value Gcyl_vt_base is calculated by searching the above-described map shown in FIG. 13 according to the engine speed NE and the corrected valve lift Liftin_mod (step 32), and the correction coefficient K_gcyl_vt is calculated by searching the above-described map shown in FIG. 14, described hereinabove, according to the engine speed NE and the cam phase Cain (step 33). Then, the first estimated intake air amount Gcyl_vt is calculated by the aforementioned equation (9) (step 34).

Next, the process proceeds to a step 35, wherein it is determined whether or not the aforementioned variable mechanism failure flag F_VDNG is equal to 1. If the answer to the question of the step 33 is negative (NO), i.e. if the two variable mechanisms are both normal, the process proceeds to a step 36, wherein the intake air amount Gcyl is set to the first estimated intake air amount Gcyl_vt.

On the other hand, if the answer to the question of the step 35 is affirmative (YES), i.e. if at least one of the variable valve lift mechanisms is faulty, the process proceeds to a step 37, wherein the intake air amount Gcyl is set to the second estimated intake air amount Gcyl_afm.

In a step 38 following the step 36 or 37, the basic fuel injection amount Tcyl_bs is set to the product Kgt·Gcyl of the conversion coefficient and the intake air amount, followed by terminating the present process.

Referring again to FIG. 32, after the basic fuel injection amount Tcyl_bs is determined in the step 20 as described above, the process proceeds to a step 21, wherein the total correction coefficient KTOTAL is calculated. More specifically, as described hereinabove, the total correction coefficient KTOTAL is calculated by calculating the various correction coefficients by searching the maps according to the operating parameters (e.g. the atmosphere temperature TA, atmospheric pressure PA, the engine coolant temperature TW, the accelerator pedal opening AP, and so forth), and then multiplying the thus calculated correction coefficients by each other.

Then, the process proceeds to a step 22, wherein as described hereinabove, the target air-fuel ratio KCMD is calculated by searching the map shown in FIG. 11 according to the accelerator pedal opening AP and the intake air amount Gcyl.

Figure 34:
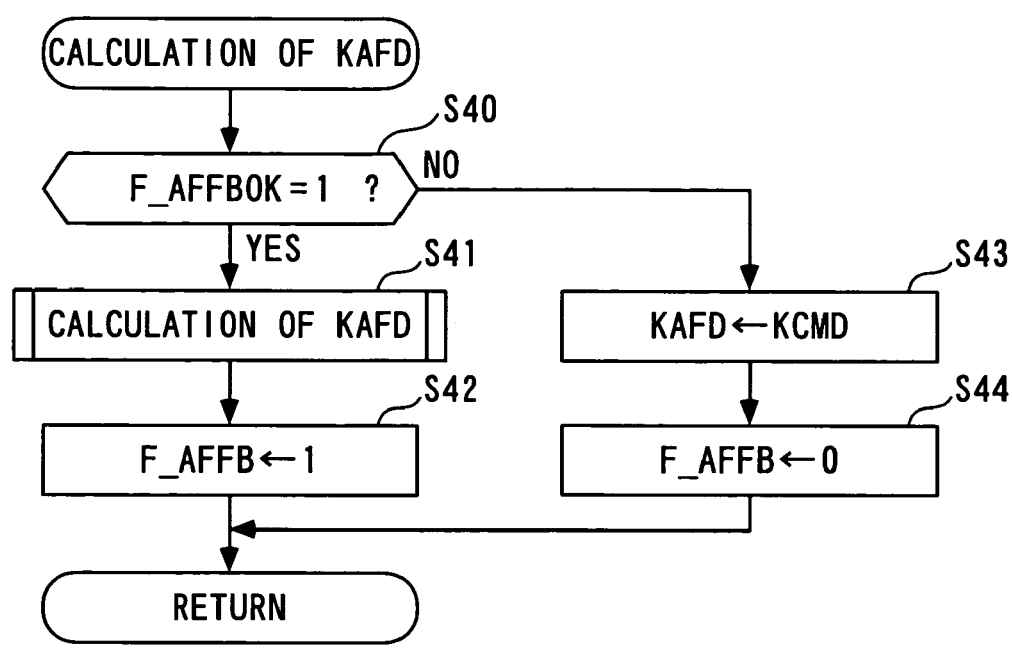
FIG. 34 is a flowchart showing a process for calculating an air-fuel ratio correction coefficient KAFD.

Next, the process proceeds to a step 23, wherein the air-fuel ratio correction coefficient KAFD is calculated. More specifically, the calculation of the air-fuel ratio correction coefficient KAFD is executed as shown in FIG. 34.

First, in a step 40, it is determined whether or not an executing condition flag F_AFFBOK is equal to 1. The executing condition flag F_AFFBOK represents whether or not executing conditions for performing the air-fuel ratio feedback control are satisfied. In a process, not shown, when the following executing conditions (c1) to (c4) are all satisfied, the executing condition flag F_AFFBOK is set to 1, and when at least one of the executing conditions (c1) to (c4) is not satisfied, the executing condition flag F_AFFBOK is set to 0.

(c1) The LAF sensor has been activated.

(c2) The engine 3 is not performing either lean-burn operation nor fuel cut-off operation.

(c3) The engine speed NE and the accelerator pedal opening AP both assume values within respective predetermined ranges.

(c4) Retardation of ignition timing is not being executed.

If the answer to the question of the step 40 is affirmative (YES), i.e. if the executing conditions for performing the air-fuel ratio feedback control are satisfied, the process proceeds to a step 41, wherein the air-fuel ratio correction coefficient KAFD is calculated with a simplified response-specifying algorithm expressed by the aforementioned equations (1) to (5).

Next, the process proceeds to a step 42, in order to indicate that the air-fuel ratio correction coefficient KAFD has been calculated by the aforementioned equations (1) to (5), i.e. that the air-fuel ratio feedback control is being executed, the feedback control execution flag F_AFFB is set to 1, followed by terminating the present process.

On the other hand, if the answer to the question of the step 40 is negative (NO), i.e. if the executing conditions for performing the air-fuel ratio feedback control are not satisfied, the process proceeds to a step 43, wherein the air-fuel ratio correction coefficient KAFD is set to the target air-fuel ratio KCMD. Then, in a step 44, in order to indicate that the air-fuel ratio feedback control is not being executed, the feedback control execution flag F_AFFB is set to 0, followed by terminating the present process.

Referring again to FIG. 32, after the air-fuel ratio correction coefficient KAFD is determined in the step 23 as described above, the process proceeds to a step 24, wherein the required fuel injection amount Tcyl is calculated by the aforementioned equation (8). After that, in a step 25, as described hereinbefore, the fuel injection amount TOUT is calculated by performing a predetermined fuel attachment-dependent correction process on the required fuel injection amount Tcyl, followed by terminating the present process. Thus, the fuel injection timing and the valve-opening time period of each fuel injection valve 10 are determined based on the fuel injection amount TOUT calculated by the ECU2 as described hereinabove, to thereby control the fuel injection valve 10. As a result, the air-fuel ratio of the mixture, i.e. the actual air-fuel ratio KACT is feedback-controlled such that it converges to the target air-fuel ratio KCMD.

Figure 35:
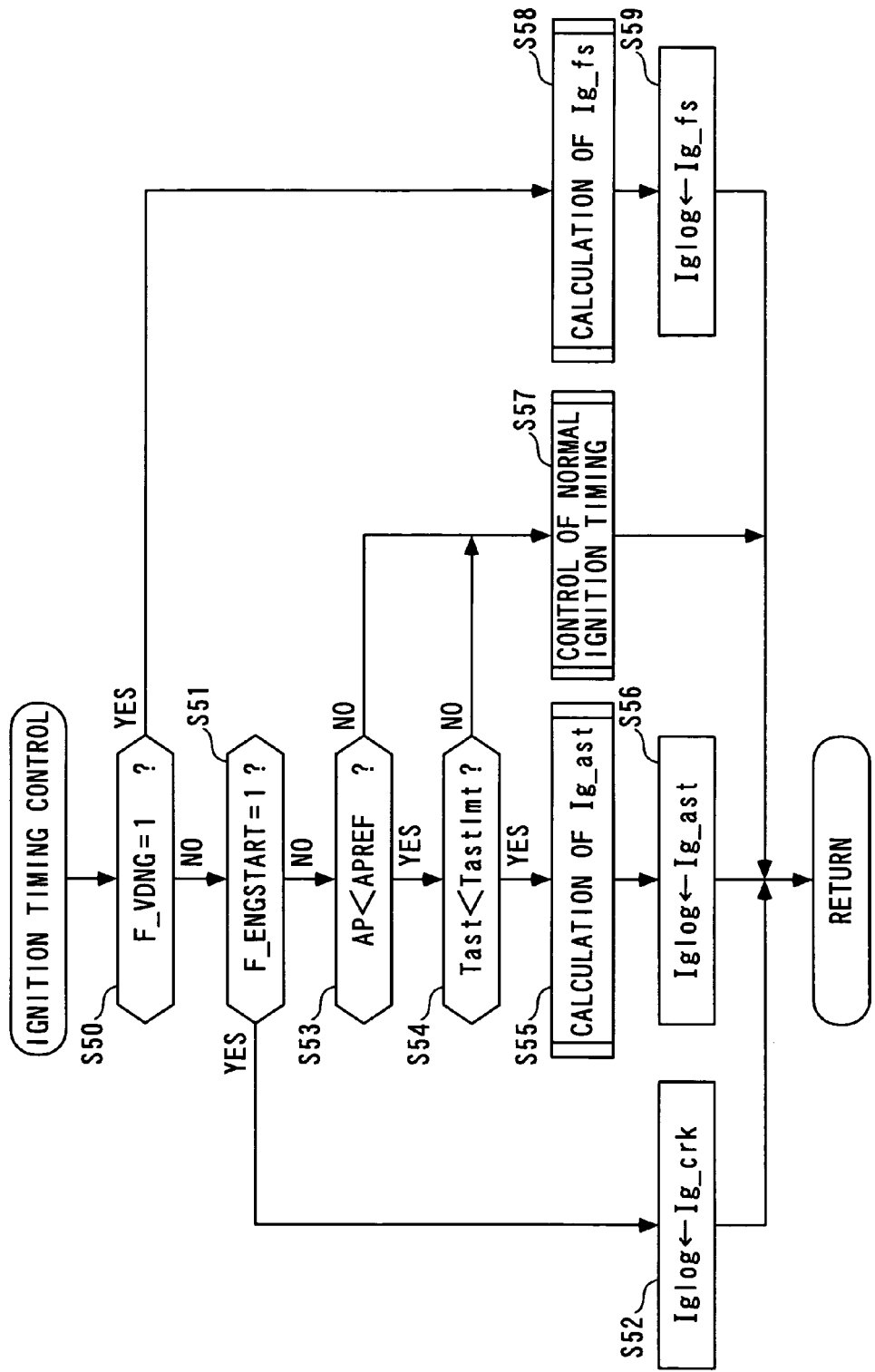
FIG. 35 is a flowchart showing an ignition timing control process.

Next, the ignition timing control process in the aforementioned step 2 will be described with reference to FIG. 35. The present process calculates the ignition timing Iglog, as described hereinafter, and corresponds to the above-described calculation by the ignition timing controller 180.

In this process, first, it is determined in a step 50 whether or not the aforementioned variable mechanism failure flag F_VDNG is equal to 1. If the answer to this question is negative (NO), i.e. if the two variable mechanisms are both normal, the process proceeds to a step 51, wherein it is determined whether or not an engine start flag F_ENGSTART is equal to 1.

The above engine start flag F_ENGSTART is set by determining in a determination process, not shown, whether or not engine starting control, i.e. cranking is being executed, based on the engine speed NE and the ON/OFF signal output from the IG·SW 29. More specifically, when the engine starting control is being executed, the engine start flag F_ENGSTART is set to 1, and otherwise set to 0.

If the answer to the question of the step 51 is affirmative (YES), i.e. if the engine starting control is being executed, the process proceeds to a step 52, wherein the ignition timing Iglog is set to a predetermined start-time value Ig_crk (e.g. BTDC 10°) for starting of the engine 3, followed by terminating the present process.

On the other hand, if the answer to the question of the step 51 is negative (NO), i.e. if the engine starting control is not being executed, the process proceeds to a step 53, wherein it is determined whether or not the accelerator pedal opening AP is smaller than a predetermined value APREF. The predetermined value APREF is for determining that the accelerator pedal is not stepped on, and set to a value (e.g. 1°) capable of determining that the accelerator pedal is not stepped on.

If the answer to this question is affirmative (YES), i.e. if the accelerator pedal is not stepped on, the process proceeds to a step 54, wherein it is determined whether or not the count Tast of a after-start timer is smaller than a predetermined value Tastlmt. The after-start timer counts time elapsed after the termination of the engine start control, and is implemented by an up-count timer.

If the answer to this question is affirmative (YES), i.e. if Tast<Tastlmt holds, it is judged that the catalyst warmup control should be executed, so that the process proceeds to a step 55, wherein a catalyst warmup value Ig_ast is calculated. More specifically, the catalyst warmup value Ig_ast is calculated with a response-specifying control algorithm expressed by the following equations (29) to (31).

$$Ig\_ast(n) = Ig\_ast\_base - Krch\_ig \cdot \sigma\_ig(n) - \quad (29)$$
$$Kadp\_ig \cdot \sum_{i=0}^{n} \sigma\_ig(i)$$

$$\sigma\_ig(n) = Enast(n) + pole\_ig \cdot Enast(n-1) \quad (30)$$

$$Enast(n) = NE(n) - NE\_ast \quad (31)$$

In the equation (29), Ig_ast_base represents a predetermined catalyst warmup reference ignition timing (e.g. BTDC 5°), and Krch_ig and Kadp_ig represent a predetermined reaching law gain and a predetermined adaptive law gain, respectively. Further, σ_ig represents a switching function defined by the equation (30). In the equation (30), pole_ig represents a switching function-setting parameter set to a value which satisfies the relationship of $-1<pole\_ig<0$, and Enast represents a follow-up error calculated by the equation (31). In the equation (31), NE_ast represents a predetermined catalyst warmup target engine speed (e.g. 1800 rpm). With the above-described control algorithm, the catalyst warmup value Ig_ast is calculated as a value for causing the engine speed NE to converge to the catalyst warmup target engine speed NE_ast.

Then, the process proceeds to a step 56, wherein the ignition timing Iglog is set to the catalyst warmup value Ig_ast, followed by terminating the present process.

On the other hand, if the answer to the question of the step 53 or the step 54 is negative (NO), i.e. if Tast≧Tastlmt holds, or if the accelerator pedal is stepped on, the process proceeds to a step 57, wherein a normal ignition timing control process is carried out.

Figure 36:
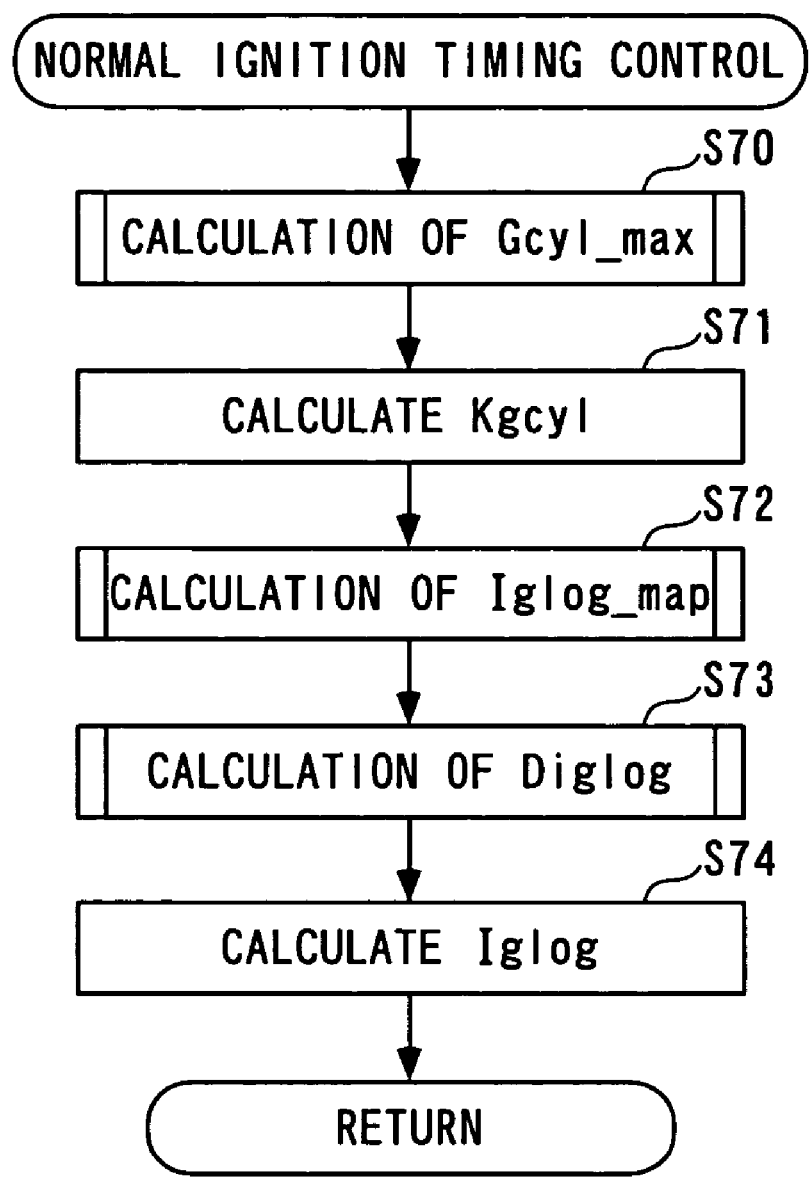
FIG. 36 is a flowchart showing a normal ignition timing control process.

More specifically, the normal ignition timing control process is executed as shown in FIG. 36. First, in a step 70, the maximum estimated intake air amount Gcyl_max is calculated by the above-described method. The basic value Gcyl_max_base of the maximum estimated intake air amount is calculated by searching the map shown in FIG. 27 according to the engine speed NE, and the correction coefficient K_gcyl_max is calculated by searching the map shown in FIG. 28 according to the engine speed NE and the cam phase Cain. Then, the maximum estimated intake air amount Gcyl_max is calculated by the aforementioned equation (26) based on the thus calculated two values Gcyl_max_base and K_gcyl_max.

Then, in a step 71, the normalized intake air amount Kgcyl is calculated by the aforementioned equation (27). After that, in a step 72, the basic ignition timing Iglog_map is calculated by the above-described method. More specifically, a plurality of values are selected by searching the basic ignition timing map e.g. in FIG. 29 or 30 according to the normalized intake air amount Kgcyl, the engine speed NE, and the cam phase Cain, and the basic ignition timing Iglog_map is calculated by interpolation of the selected values.

Then, in a step 73, the ignition correction value Diglog is calculated by the above-described method. More specifically, the various correction values are calculated by searching the maps, not shown, according to the atmosphere temperature TA, the engine coolant temperature TW, the target air-fuel ratio KCMD, and so forth, and the ignition correction value Diglog is calculated based on the calculated correction values. Then, in a step 74, the ignition timing Iglog is calculated by the aforementioned equation (28), followed by terminating the present process.

Referring again to FIG. 24, after carrying out the normal ignition timing control process as described above, in the step 57, the present process is terminated.

On the other hand, if the answer to the question of the step 50 is affirmative (YES), i.e. if at least one of the two variable mechanisms is faulty, the process proceeds to a step 58, wherein a failure time value Ig_fs is calculated. More specifically, the failure time value Ig_fs is calculated with a response-specifying control algorithm expressed by the following equations (32) to (34).

$$Ig\_fs(n) = Ig\_fs\_base - Krch\_ig^\# \cdot \sigma\_ig^\#(n) - \quad (32)$$
$$Kadp\_ig^\# \cdot \sum_{i=0}^{n} \sigma\_ig^\#(i)$$

$$\sigma\_ig^\#(n) = Enfs(n) + pole\_ig^\# \cdot Enfs(n-1) \quad (33)$$

$$Enfs(n) = NE(n) - NE\_fs \quad (34)$$

In the above equation (32), Ig_fs_base represents a predetermined reference ignition timing (e.g. TDC±0°) for a failure time, and Krch_ig$^\#$ and Kadp_ig$^\#$ represent a predetermined reaching law gain and a predetermined adaptive law gain, respectively. Further, σ_ig$^\#$ represents a switching function defined by the equation (33). In the equation (33), pole_ig$^\#$ represents a switching function-setting parameter set to a value which satisfies the relationship of −1<pole_ig$^\#$<0, and Enfs represents a follow-up error calculated by the equation (34). In the equation (34), NE_fs represents a predetermined failure-time target engine speed (e.g. 2000 rpm). With the above control algorithm, the failure time value Ig_fs is calculated as a value for causing the engine speed NE to converge to the failure-time target engine speed NE_fs.

Then, the process proceeds to a step 59, wherein the ignition timing Iglog is set to the failure time value Ig_fs, followed by terminating the present process. The, the ECU 2 controls the spark plugs 11 such that each spark plug 11 undergoes discharge in timing corresponding to the calculated ignition timing Iglog.

Figure 37:
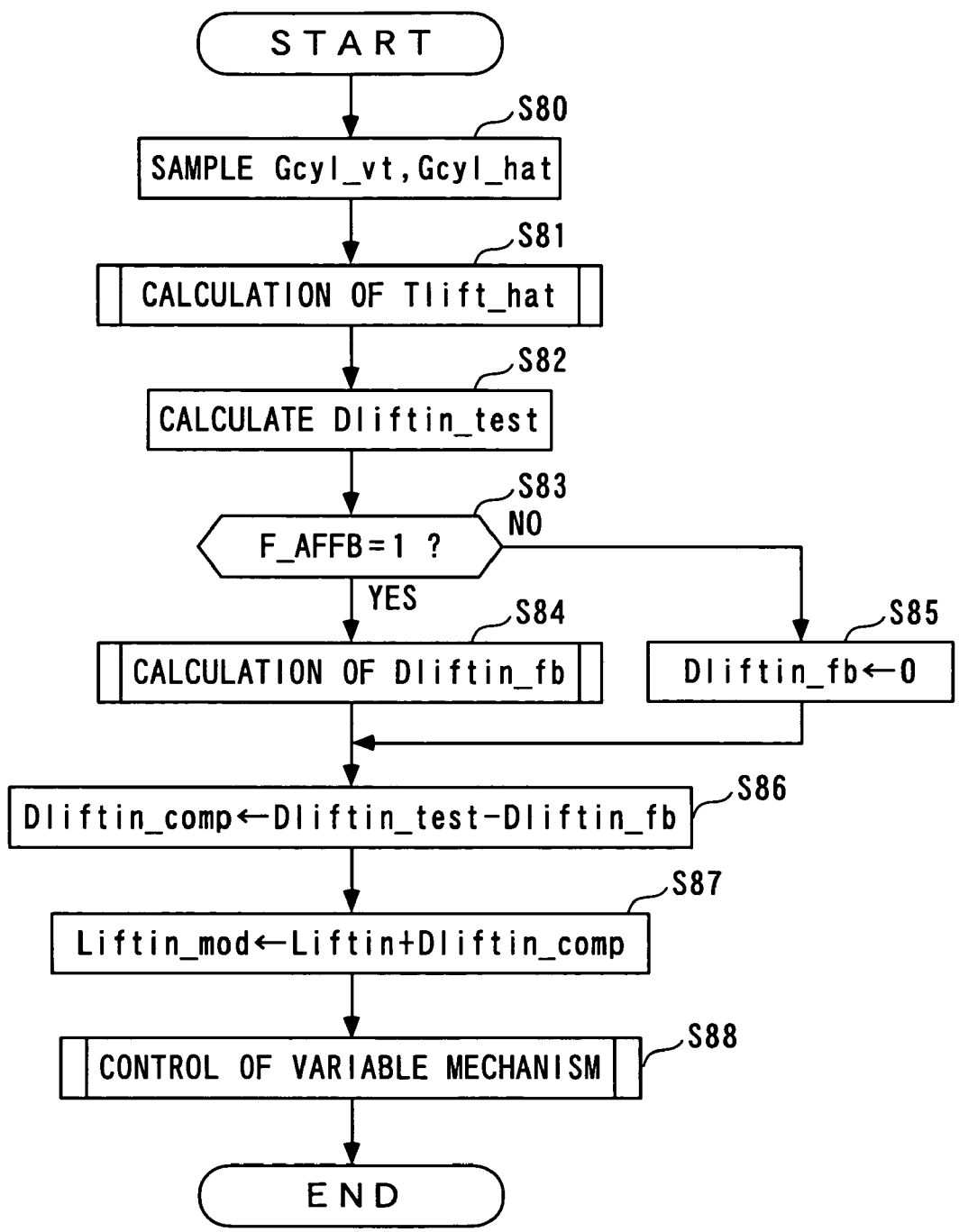
FIG. 37 is a flowchart showing a control process executed at a control period ΔT.

Next, a description will be given of a control process executed by the ECU 2 at the aforementioned control period ΔT set by timer, with reference to FIG. 37. In this process, first, in a step 80, value of the first estimated intake air amount Gcyl_vt and the third estimated intake air amount Gcyl_hat stored in the RAM are sampled. That is, the values Gcyl_vt(k) and Gcyl_hat(k) are sampled.

Figure 38:
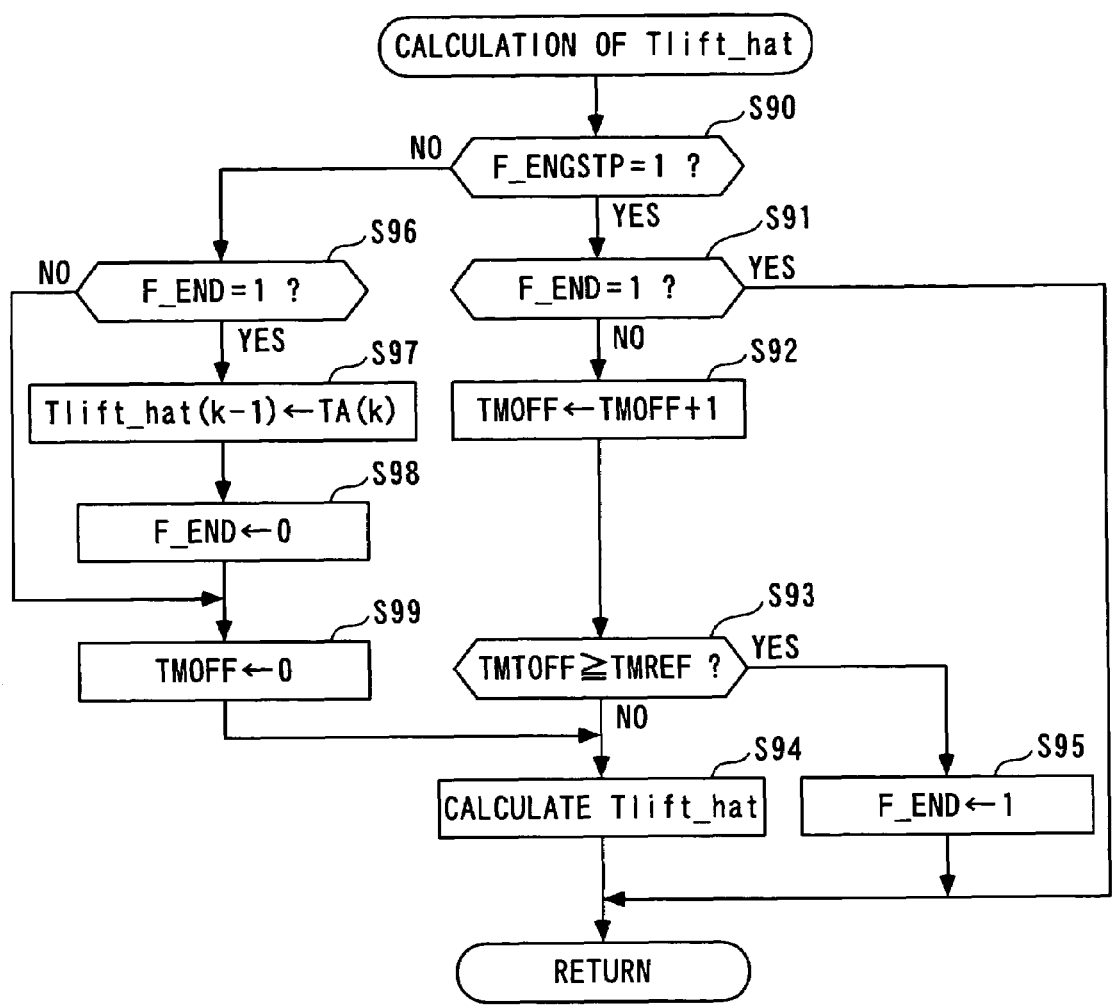
FIG. 38 is a flowchart showing a process for calculating an estimated mechanism temperature Tlift_hat.

Then, in a step 81, the estimated mechanism temperature Tlift_hat is calculated. More specifically, the calculation of the estimated mechanism temperature Tlift_hat is executed as illustrated in FIG. 38, and is executed during stoppage of the engine as well.

That is, first, in a step 90, it is determined whether or not an engine stoppage flag F_ENGSTP is equal to 1. The engine stoppage flag F_ENGSTP is set to 1 when the engine 3 is in stoppage, and to 0 when the engine 3 is in operation, based on the ON/OFF state of the IG·SW29 and the engine speed NE.

If the answer to the question of the step 90 is affirmative (YES), i.e. if the engine 3 is in stoppage, the process proceeds to a step 91, wherein it is determined whether or not an estimation termination flag F_END is equal to 1.

If the answer to the question of the step 91 is negative (NO), it is judged that the estimated mechanism temperature Tlift_hat should be calculated, the process proceeds to a step 92, wherein the count TMOFF of a stoppage timer is incremented by 1. The stoppage timer measures a time period during which the engine 3 is in stoppage.

Next, in a step 93, it is determined whether or not the count TMOFF of the stoppage timer is not smaller than a predetermined value TMREF. The predetermined value TMREF is set to such a value (corresponding to e.g. 6 hours) as corresponds to a stoppage time period long enough to allow the variable valve lift mechanism 50 to fully cool off, and hence makes it possible to determine that the temperature thereof will not undergo almost any change thereafter.

If the answer to the question of the step 93 is negative (NO), the process proceeds to a step 94, wherein the estimated mechanism temperature Tlift_hat is calculated by the aforementioned equation (14), followed by terminating the present process.

On the other hand, if the answer to the question of the step 93 is affirmative (YES), it is judged that the calculation of the estimated mechanism temperature Tlift_hat should be stopped, and hence in a step 95, the estimation termination flag F_END is set to 1, followed by terminating the present process. Hereafter, in the following loops, the answer to the question of the step 91 becomes affirmative (YES), and in this case, the present process is immediately terminated without calculating the estimated mechanism temperature Tlift_hat.

On the other hand, if the answer to the question of the step 90 is negative (NO), i.e. if the engine is in operation, the process proceeds to a step 96, wherein it is determined whether or not the estimation termination flag F_END is equal to 1. If the answer to this question is affirmative (YES), i.e. if the stoppage time of the engine 3 is long enough, the process proceeds to a step 97, wherein the atmosphere temperature TA(k) is set to the immediately preceding value Tlift_hat(k−1) of the estimated mechanism temperature.

Then, in a step 98, the estimation termination flag F_END is set to 0, and then the process proceeds to a step 99, wherein the count TMOFF of the stoppage timer is set to 0. Then, the step 94 is executed as described above, followed by terminating the present process.

On the other hand, if the answer to the question of the step 96 is negative (NO), the steps 99 and 94 are executed as described above, followed by terminating the present process.

Referring again to FIG. 37, in the step 81, the estimated mechanism temperature Tlift_hat is calculated as described above, and then the process proceeds to a step 82, wherein the FF correction value Dliftin_test is calculated by searing the above-described map shown in FIG. 16 according to the estimated mechanism temperature Tlift_hat.

Figure 39:
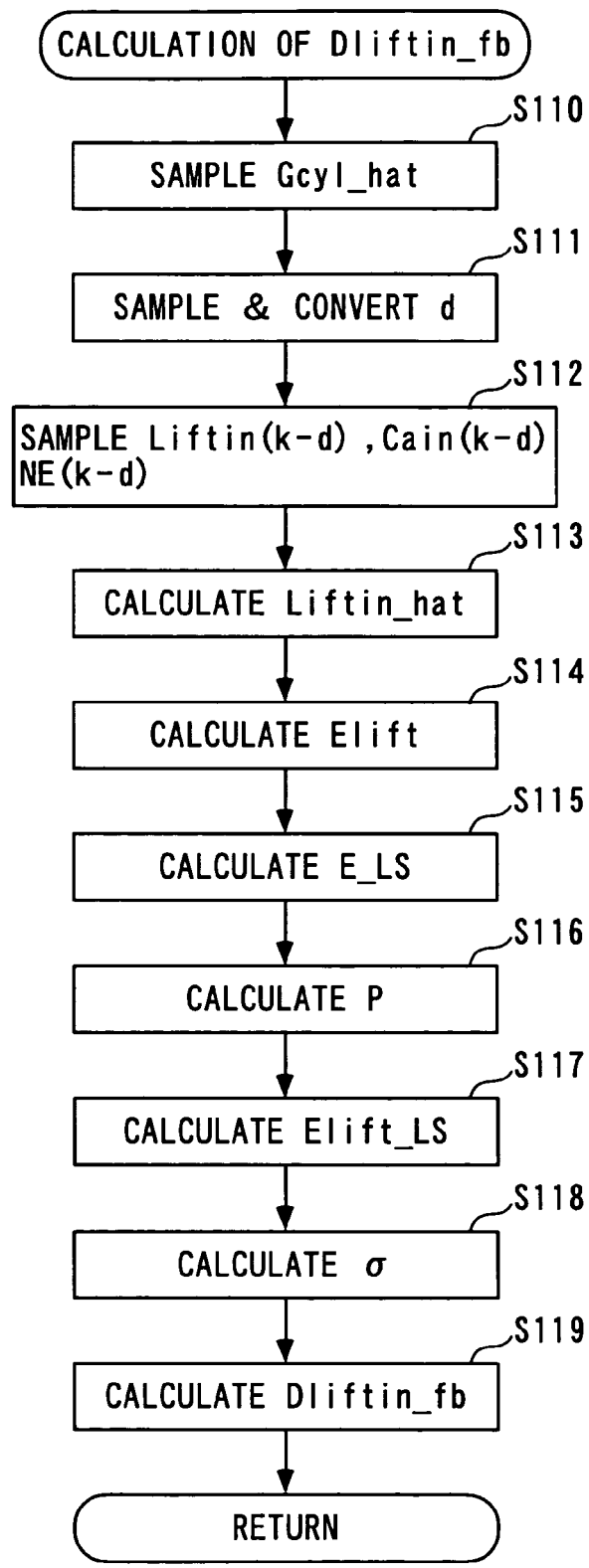
FIG. 39 is a flowchart showing a process for calculating an FB correction value Dliftin_fb.

Then, in a step 83, it is determined whether or not the feedback control execution flag F_AFFB is equal to 1. If the answer to this question is affirmative (YES), i.e. the air-fuel ratio feedback control is being executed, the process proceeds to a step 84, wherein the FB correction value Dliftin_fb is calculated. The calculation of the FB correction value Dliftin_fb is executed, specifically, as shown in FIG. 39.

First, in a step 110, a value of the third estimated intake air amount Gcyl_hat stored in the RAM is sampled. That is, the value Gcyl_hat(k) is sampled.

Then, the process proceeds to a step 111, wherein a value of the dead time d stored in the RAM is sampled, and the sampled value is converted based on the engine speed NE into a value corresponding to the number of executions of the control operation at the control period ΔT.

Thereafter, in a step 112, based the dead time d calculated in the step 111, values of the valve lift Liftin(k−d), the cam phase Cain(k−d), and the engine speed NE(k−d) stored in the RAM are sampled.

Next, in a step 113, the estimated valve lift Liftin_hat(k) is calculate by searching the maps e.g. shown in FIGS. 22 to 24 according to the third estimated intake air amount Gcyl_hat(k), the engine speed NE(k−d), and the cam phase Cain(k−d). Then, in a step 114, the estimation error Elift is calculated by the aforementioned equation (21).

Thereafter, in a step 115, the difference E_LS is calculated by the aforementioned equation (23), and then in a step 116, the weighting gain P is calculated by searching the above-described map in FIG. 25 according to the valve lift Liftin(k−d).

Then, in a step 117, the statistically-processed value Elift_LS of the estimation error is calculated by the aforementioned equation (22), and then in a step 118, the switching function a is calculated by the aforementioned equation (25).

Then, in a step 119, the FB correction value Dliftin_fb is calculated by the aforementioned equation (24), followed by terminating the present process.

Referring again to FIG. 37, in the step 84, the FB correction value Dliftin_fb is calculated, and then the process proceeds to a step 86, referred to hereinafter.

On the other hand, if the answer to the question of the step 83 is negative (NO), i.e. if the air-fuel ratio feedback control is not being executed, the process proceeds to a step 85, wherein the FB correction value Dliftin_fb is set to 0.

In the step 86 following the step 84 or 85, the lift correction value Dliftin_comp is set to the difference (Dliftin_test−Dliftin_fb) between the FF correction value and the FB correction value.

Then, the process proceeds to a step 87, wherein the corrected valve lift Liftin_mod is set to the sum (Liftin+Dliftin_comp) between the valve lift and the lift correction value.

Then, in a step 88, a variable mechanism control process is executed as described hereinbelow, followed by terminating the present process.

Figure 40:
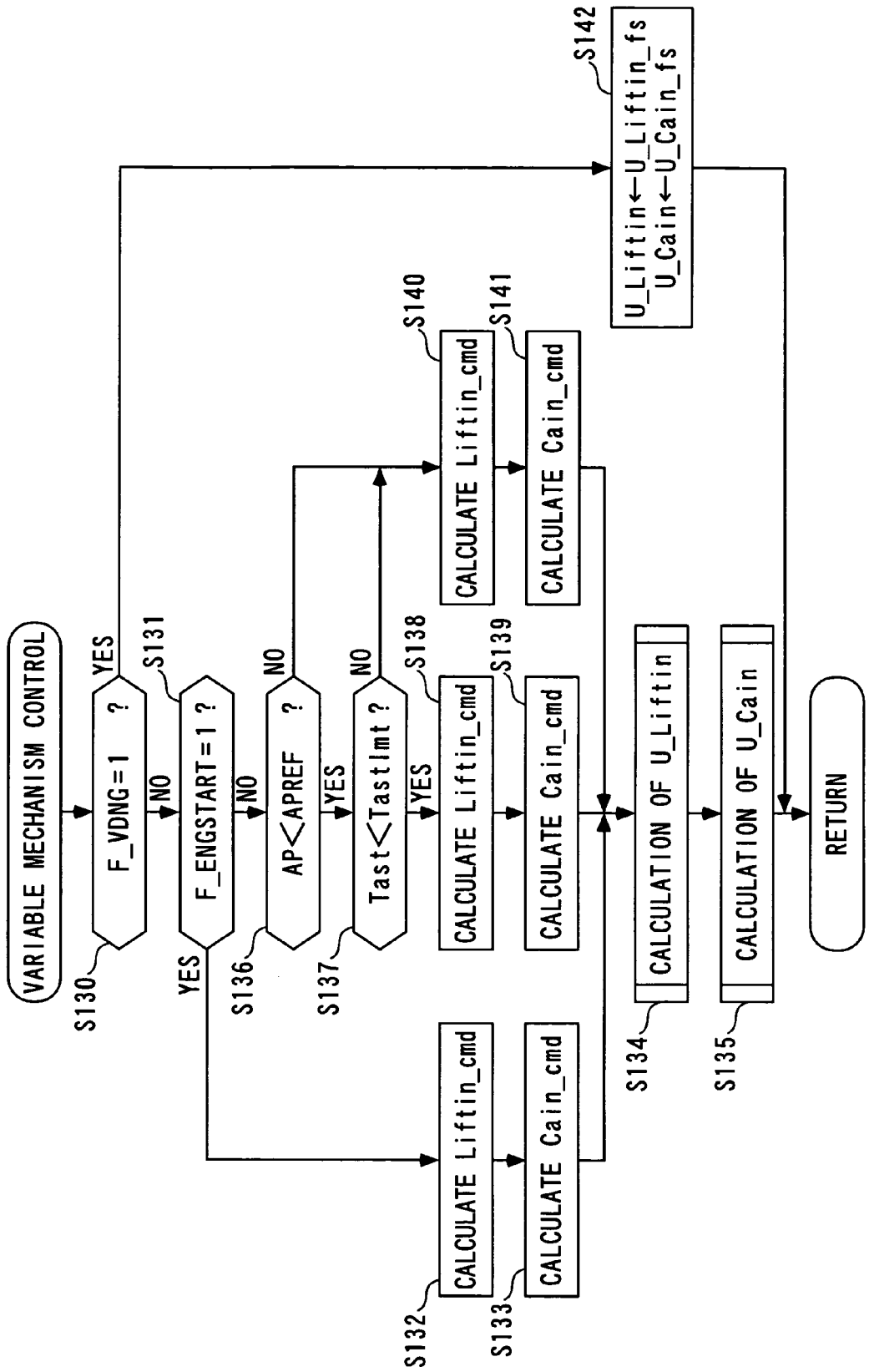
FIG. 40 is a flowchart showing a variable mechanism control process.

Hereinafter, the variable mechanism control process in the step 88 will be described with reference to FIG. 40. The present process calculates the two control inputs U_Liftin and U_Cain for controlling the two variable mechanisms, respectively.

In this process, first, it is determined in a step 130 whether or not the aforementioned variable mechanism failure flag F_VDNG is equal to 1. If the answer to this question is negative (NO), i.e. if the two variable mechanisms are both normal, the process proceeds to a step 131, wherein it is determined whether or not the aforementioned engine start flag F_ENGSTART is equal to 1.

Figure 41:
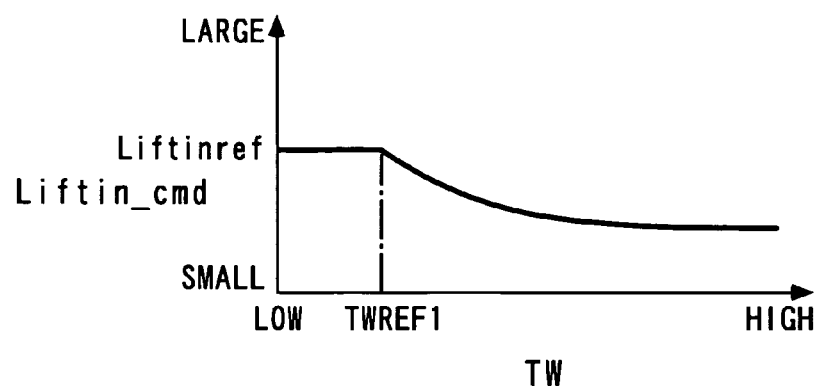
FIG. 41 is a diagram showing an example of a map for use in calculating a target valve lift Liftin_cmd during starting of the engine.

If the answer to the above question is affirmative (YES), i.e. if the engine starting control is being executed, the process proceeds to a step 132, wherein the target valve lift Liftin_cmd is calculated by searching a map shown in FIG. 41 according to the engine coolant temperature TW.

In this map, in the range where the engine coolant temperature TW is higher than a predetermined value TWREF1, the target valve lift Liftin_cmd is set to a larger value as the engine coolant temperature TW is lower, and in the range where TW≦TWREF1 holds, the target valve lift Liftin_cmd is set to a predetermined value Liftinref. This is to compensate for an increase in friction of the variable valve lift mechanism 50, which is caused when the engine coolant temperature TW is low.

Figure 42:
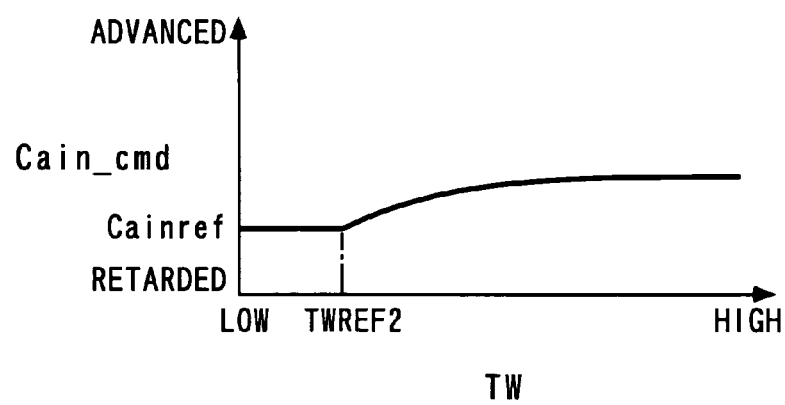
FIG. 42 is a diagram showing an example of a map for use in calculating a target cam phase Cain_cmd during starting of the engine.

Then, in a step 133, the target cam phase Cain_cmd is calculated by searching a map shown in FIG. 42 according to the engine coolant temperature TW.

In this map, in the range where the engine coolant temperature TW is higher than a predetermined value TWREF2, the target cam phase Cain_cmd is set to a more retarded value as the engine coolant temperature TW is lower, and in the range where TW≦TWREF2 holds, the target cam phase Cain_cmd is set to a predetermined value Cainref. This is to ensure the combustion stability of the engine 3 by controlling the cam phase Cain to a more retarded value when the engine coolant temperature TW is low than when the engine coolant temperature TW is high, to thereby reduce the valve overlap, to increase the flow velocity of intake air.

Subsequently, the process proceeds to a step 134, wherein the lift control input U_Liftin is calculated with a target value filter-type two-degree-of-freedom response-specifying control algorithm expressed by the following equations (35) to (38).

$$U\_Liftin(k) = -Krch\_lf \cdot \sigma\_lf(k) - Kadp\_lf \cdot \sum_{i=0}^{k} \sigma\_lf(i) \quad (35)$$

$$\sigma\_lf(k) = E\_lf(k) + pole\_lf \cdot E\_lf(k-1) \quad (36)$$

$$E\_lf(k) = Liftin\_mod(k) - Liftin\_cmd\_f(k) \quad (37)$$

$$Liftin\_cmd\_f(k) = -pole\_f\_lf \cdot Liftin\_cmd\_f(k-1) + (1 + pole\_f\_lf) \cdot Liftin\_cmd(k) \quad (38)$$

In the equation (35), Krch_lf and Kadp_lf represent a predetermined reaching law gain and a predetermined adaptive law gain, respectively. Furthermore, σ_lf represents a switching function defined by the equation (36). In the equation (36), pole_lf represents a switching function-setting parameter set to a value which satisfies the relationship of −1<pole_lf<0, and E_lf represents a follow-up error calculated by the equation (37). In the equation (37), Liftin_cmd_f represents a filtered value of the target valve lift, and is calculated with a first-order lag filter algorithm expressed by the equation (38). In the equation (38), pole_f_lf represents a target value filter-setting parameter set to a value which satisfies the relationship of −1<pole_f_lf<0.

Next, the process proceeds to a step 135, wherein the phase control input U_Cain is calculated with a target value filter-type two-degree-of-freedom response-specifying control algorithm expressed by the following equations (39) to (42).

$$U\_Cain(k) = -Krch\_ca \cdot \sigma\_ca(k) - Kadp\_ca \cdot \sum_{i=0}^{k} \sigma\_ca(i) \quad (39)$$

$$\sigma\_ca(k) = E\_ca(k) + pole\_ca \cdot E\_ca(k-1) \quad (40)$$

$$E\_ca(k) = Cain(k) - Cain\_cmd\_f(k) \quad (41)$$

-continued $$Cain\_cmd\_f(k) = -pole\_f\_ca \cdot Cain\_cmd\_f(k-1) + (1+pole\_f\_ca) \cdot Cain\_cmd(k) \qquad (42)$$

In the equation (39), Krch_ca and Kadp_ca represent a predetermined reaching law gain and a predetermined adaptive law gain, respectively. Furthermore, σ_ca represents a switching function defined by the equation (40). In the equation (40), pole_ca represents a switching function-setting parameter set to a value which satisfies the relationship of −1<pole_ca<0, and E_ca represents a follow-up error calculated by the equation (41). In the equation (41), Cain_cmd_f represents a filtered value of the target cam phase, and is calculated with a first-order lag filter algorithm expressed by the equation (42). In the equation (42), pole_f_ca represents a target value filter-setting parameter set to a value which satisfies the relationship of −1<pole_f_ca<0.

In the step 135, the phase control input U_Cain is calculated as above, followed by terminating the present process.

On the other hand, if the answer to the question of the step 131 is negative (NO), i.e. if the engine starting control is not being executed, the process proceeds to a step 136, wherein it is determined whether or not the accelerator pedal opening AP is smaller than the predetermined value APREF. If the answer to this question is affirmative (YES), i.e. if the accelerator pedal is not stepped on, the process proceeds to a step 137, wherein it is determined whether or not the count Tast of the after-start timer is smaller than the predetermined value Tastlmt.

Figure 43:
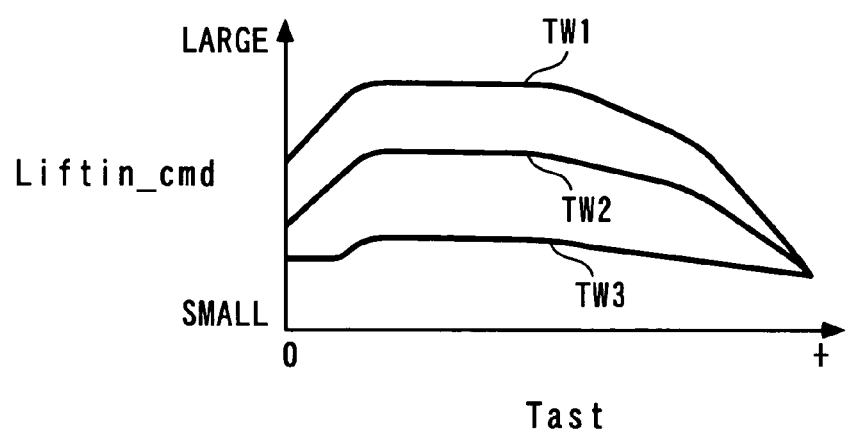
FIG. 43 is a diagram showing an example of a map for use in calculating the target valve lift Liftin_cmd during catalyst warmup control.

If the answer to this question is affirmative (YES), i.e. if Tast<Tastlmt holds, it is judged that the catalyst warmup control should be executed, and the process proceeds to a step 138, wherein the target valve lift Liftin_cmd is calculated by searching a map shown in FIG. 43 according to the count Tast of the after-start timer for the catalyst warmup control and the engine coolant temperature TW. In FIG. 43, TW1 to TW3 represent predetermined values of the engine coolant temperature TW, which satisfy the relationship of TW1<TW2<TW3. This also applies to the following description.

In this map, the target valve lift Liftin_cmd is set to a larger value as the engine coolant temperature TW is lower. This is because as the engine coolant temperature TW is lower, it takes a longer time period to activate the catalyst, and hence the volume of exhaust gasses is increased to shorten the time period required for activating the catalyst. Furthermore, in the above map, the target valve lift Liftin_cmd is set to a larger value as the count Tast of the after-start timer becomes larger in a range where the count Tast is small, whereas in a region where the count Tast is large to a certain or more extent, the target valve lift Liftin_cmd is set to a smaller value as the count Tast becomes larger. This is because the warming up of the engine 3 proceeds along with the lapse of the execution time period of the catalyst warmup control, so that when after friction lowers, unless the intake air amount is decreased, the ignition timing is excessively retarded so as to hold the engine speed NE at the target value, which makes unstable the combustion state of the engine. To avoid the combustion state from being unstable, the map is configured as described above.

Figure 44:
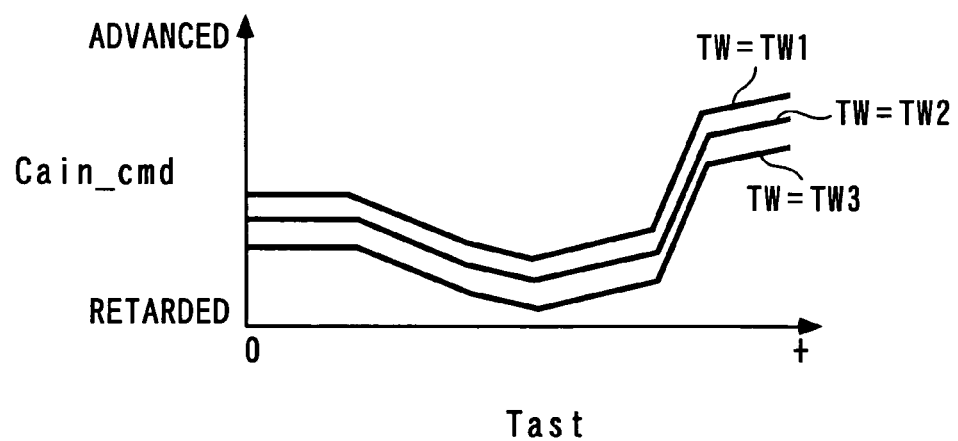
FIG. 44 is a diagram showing an example of a map for use in calculating the target cam phase Cain_cmd during catalyst warmup control.

Then, in a step 139, the target cam phase Cain_cmd is calculated by searching a map shown in FIG. 44 according to the count Tast of the after-start timer and the engine coolant temperature TW.

In this map, the target cam phase Cain_cmd is set to a more advanced value as the engine coolant temperature TW is lower. This is because as the engine coolant temperature TW is lower, it takes a longer time period to activate the catalyst, as described above, and hence the pumping loss is reduced to increase the intake air amount to thereby shorten the time period required for activating the catalyst. Furthermore, in the above map, the target cam phase Cain_cmd is set to a more retarded value as the count Tast of the after-start timer becomes larger in a range where the count Tast of the after-start timer is small, whereas in a region where the count Tast is large to a certain or more extent, the target cam phase Cain_cmd is set to a more advanced value as the count Tast of the after-start timer is larger. The reason for this is the same as given in the description of the FIG. 43 map.

Then, the steps 134 and 135 are carried out, as described hereinabove, followed by terminating the present process.

Figure 45:
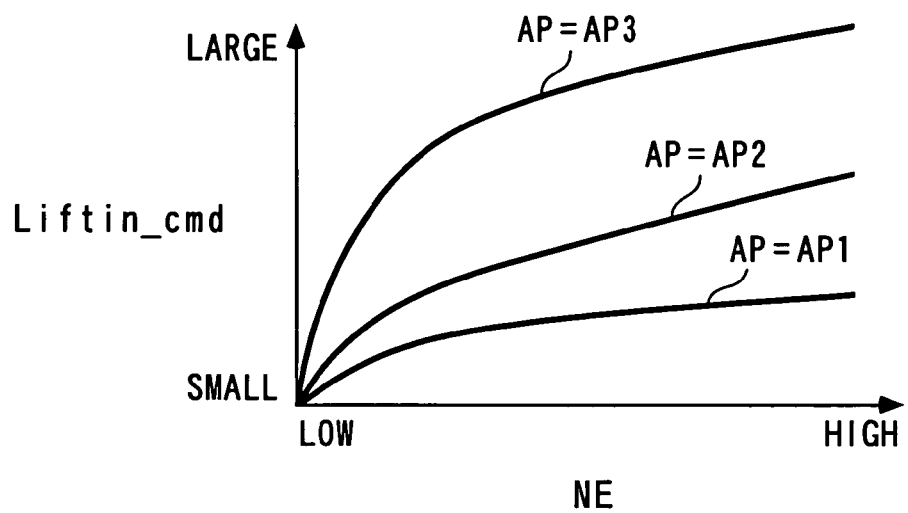
FIG. 45 is a diagram showing an example of a map for use in calculating the target valve lift Liftin_cmd during normal operation of the engine.

On the other hand, if the answer to the question of the step 136 or 137 is negative (NO), i.e. if Tast≧Tastlmt holds, or if the accelerator pedal is stepped on, the process proceeds to a step 140, wherein the target valve lift Liftin_cmd is calculated by searching a map shown in FIG. 45 according to the engine speed NE and the accelerator pedal opening AP. In FIG. 45, AP1 to AP3 indicate predetermined values of the accelerator pedal opening AP which satisfy the relationship of AP1<AP2<AP3. This also applies to the following description.

In this map, the target valve lift Liftin_cmd is set to a larger value as the engine speed NE is higher, or as the accelerator pedal opening AP is larger. This is because as the engine speed NE is higher, or as the accelerator pedal opening AP is larger, an output required of the engine 3 is larger, and hence a larger intake air amount is required.

Figure 46:
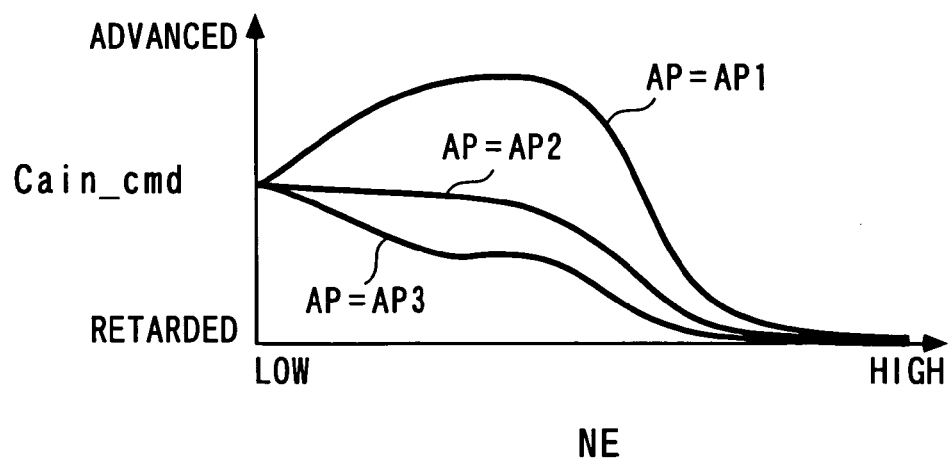
FIG. 46 is a diagram showing an example of a map for use in calculating the target cam phase Cain_cmd during normal operation of the engine.

Then, in a step 141, the target cam phase Cain_cmd is calculated by searching a map shown in FIG. 46 according to the engine speed NE and the accelerator pedal opening AP. In this map, when the accelerator pedal opening AP is small and the engine speed NE is in the medium speed region, the target cam phase Cain_cmd is set to a more advanced value than otherwise. This is because under the above operating conditions of the engine 3, it is necessary to reduce the pumping loss.

Following the step 141, the steps 134 and 135 are carried out, as described hereinabove, followed by terminating the present process.

On the other hand, if the answer to the question of the step 130 is affirmative (YES), i.e. if at least one of the two variable mechanisms is faulty, the process proceeds to a step 142, wherein the lift control input U_Liftin is set to the predetermined failure time value U_Liftin_fs, and the phase control input U_Cain to the predetermined failure time value U_Cain_fs, followed by terminating the present process. As a result, as described above, the valve lift Liftin is held at the minimum value Liftinmin, and the cam phase Cain at the predetermined locking value, whereby it is possible to suitably carry out idling or starting of the engine 3 during stoppage of the vehicle, and at the same time hold the vehicle in the state of low-speed traveling when the vehicle is traveling.

In the present process, the lift control input U_Liftin and the phase control input U_Cain are calculated as described above. Then, by inputting these control inputs U_Liftin and U_Cain to the variable valve lift mechanism 50 and the and the variable cam phase mechanism 70, respectively, whereby the intake air amount is controlled.

Figure 47:
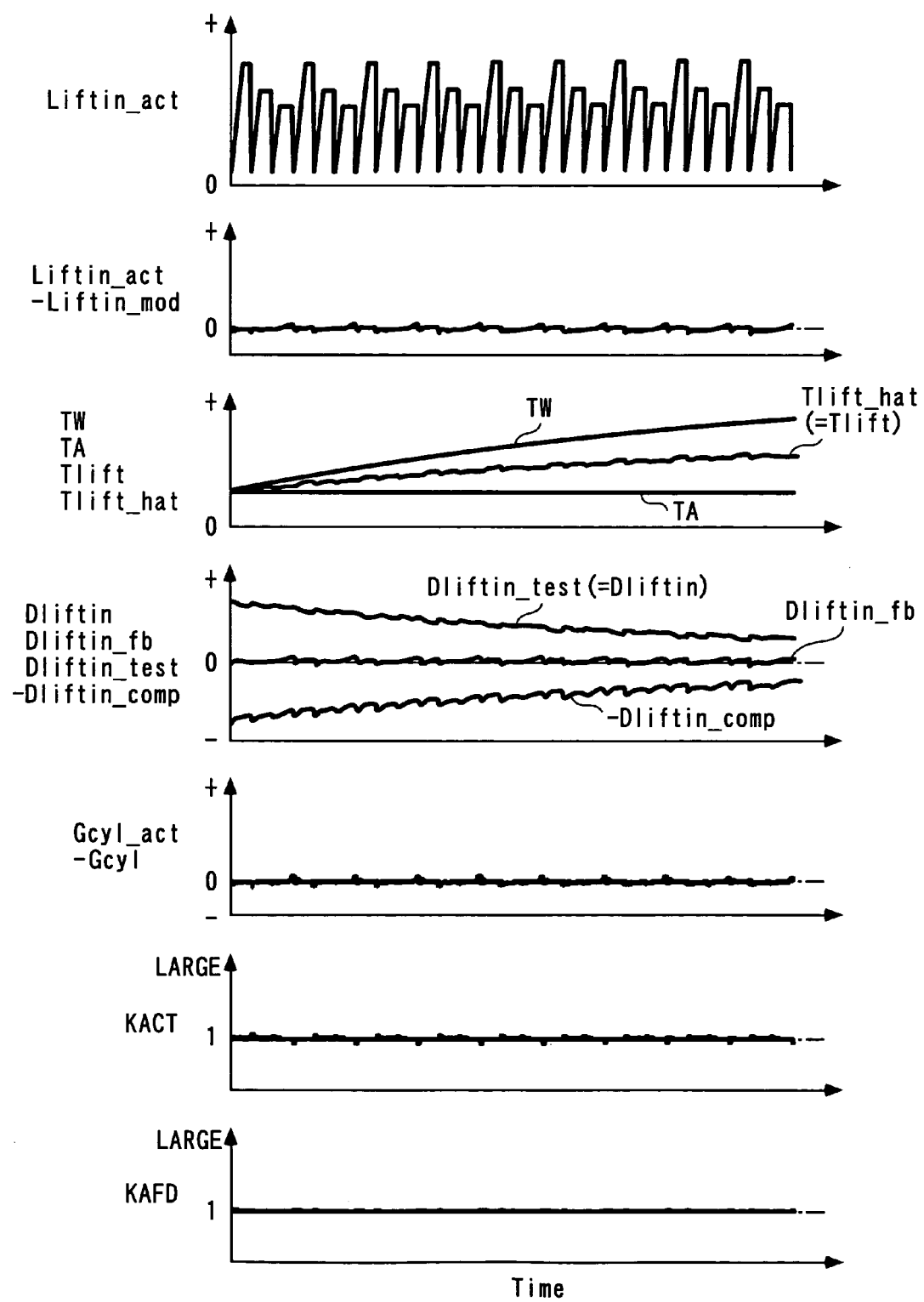
FIG. 47 is a timing diagram showing an example of a simulation of air-fuel ratio control and variable mechanism control executed by the control apparatus according to the first embodiment (without any modeling error)
Figure 48:
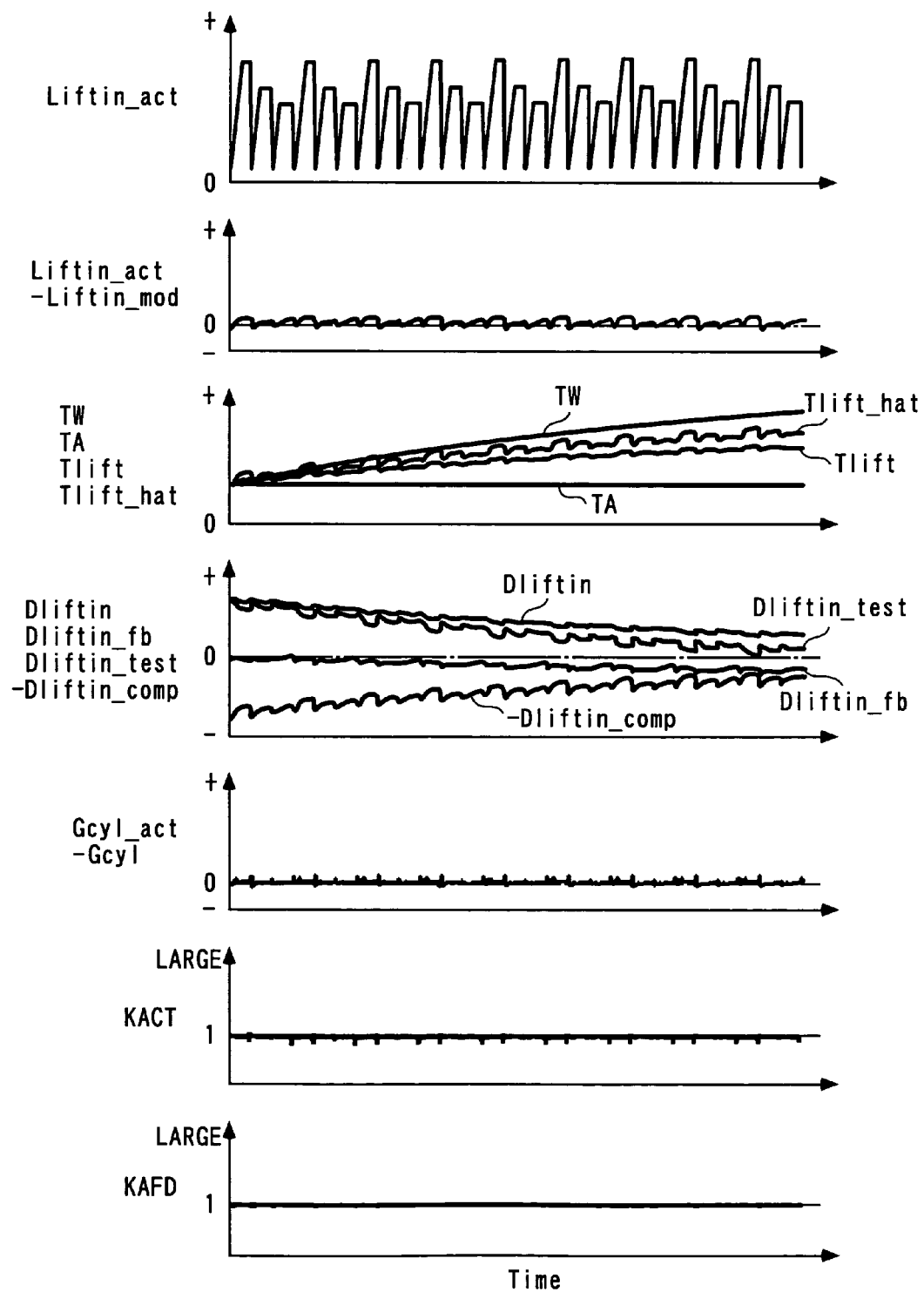
FIG. 48 is a timing diagram showing an example of a simulation of air-fuel ratio control and variable mechanism control executed by the control apparatus (with a modeling error)

Next, a description will be given of the results (hereinafter referred to as "the control results") of simulations of the control (the air-fuel ratio control, the variable mechanism control, and so forth) by the control apparatus 1 according to the first embodiment configured as described above. FIGS. 47 and 48 show examples of the control results obtained by the control apparatus 1 according to the present embodiment when the target air-fuel ratio KCMD is set to a value of 1.0 corresponding to the stoichiometric air-fuel ratio. More particularly, FIG. 47 shows an example of the control results when there is no modeling error in the aforementioned equation (14), whereas FIG. 48 shows an example of the control results when there is a modeling error in the same. On the other hand, FIG. 49 shows an example of the control results in which the valve lift Liftin is used as it is without correcting the same, for compassion purposes.

Figure 49:
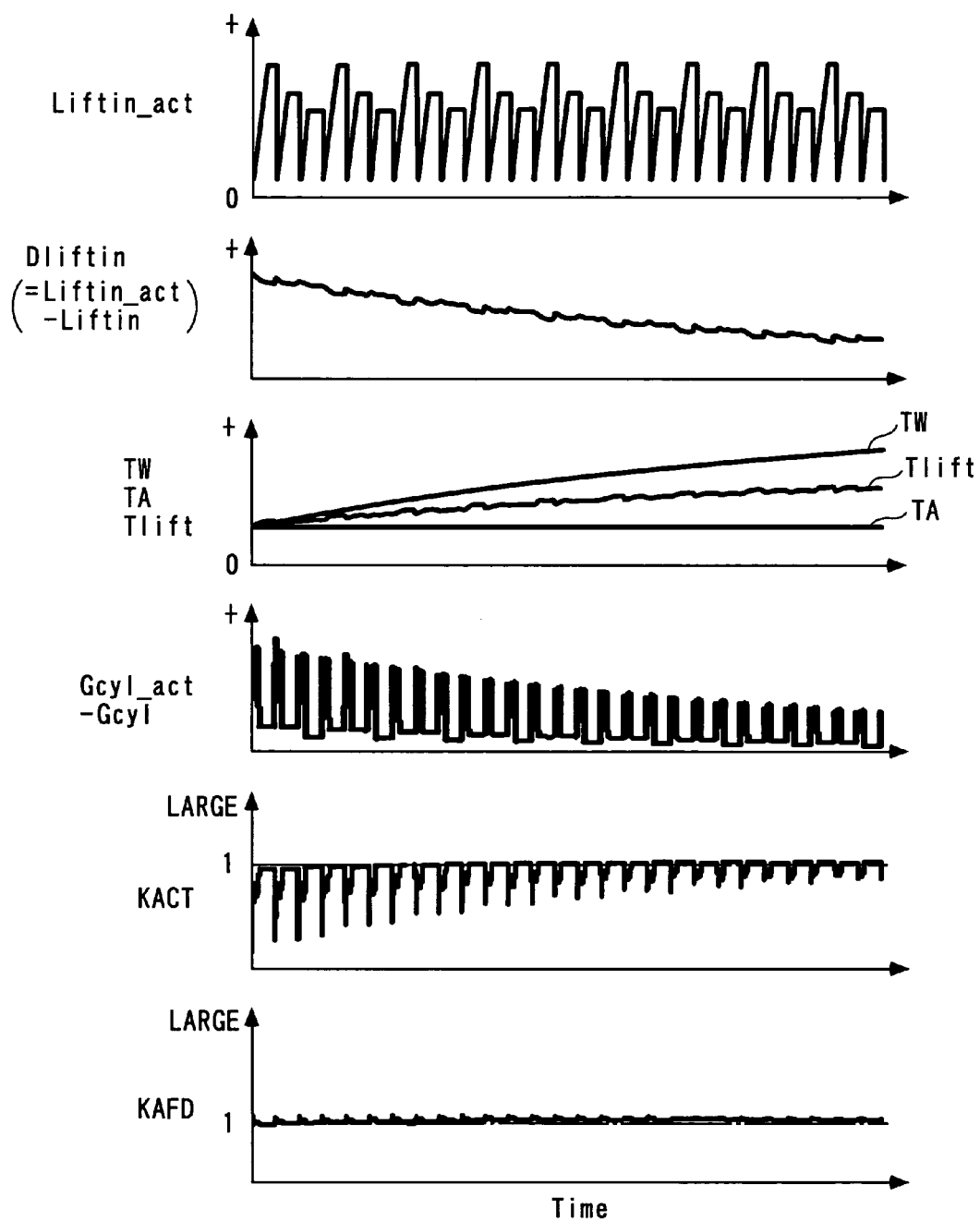
FIG. 49 is a timing diagram showing an example of a simulation of air-fuel ratio control and variable mechanism control executed by the control apparatus while using the valve lift Liftin as it is without correcting the same.

In FIGS. 47 to 49, Liftin_act represents the actual value of the valve lift Liftin (hereinafter referred to as "the actual valve lift"), and Gcyl_act represents the actual value of the intake air amount Gcyl (hereinafter referred to as "the actual intake air amount"). Further, Dliftin represents the difference (Liftin_act−Liftin) between the actual valve lift and the valve lift, and Tlift represents the actual temperature of the variable valve lift mechanism 50 (hereinafter referred to as "the actual mechanism temperature") It should be noted that in FIGS. 47 and 48, for clarity of the relationship between the difference Dliftin and the lift correction value Dliftin_comp, a negative value−Dliftin_comp is shown as the lift correction value.

First, referring to FIG. 49, the control results show that a large difference Dliftin occurs between the actual valve lift Liftin_act and the valve lift Liftin, so that a large difference also periodically occurs between the actual intake air amount Gcyl_act and the intake air amount Gcyl, and as a result, a large difference also occurs between the target air-fuel ratio KCMD and the actual air-fuel ratio KACT (a value of 1.0). Further, it is also known that during the control, as the actual mechanism temperature Tlift rises, the difference Dliftin slightly lowers, whereby the difference between the target air-fuel ratio KCMD and the actual air-fuel ratio KACT also slightly decreases.

In contrast, as shown in FIG. 47, when there is no modeling error, the estimated mechanism temperature Tlift_hat becomes equal to the actual mechanism temperature Tlift, whereby the FF correction value Dliftin_test becomes equal to the difference Dliftin. This causes the corrected valve lift Liftin_mod to be substantially equal to a value obtained by correcting the valve lift Liftin only by the FF correction value Dliftin_test, and the FB correction value Dliftin_fb becomes substantially equal to 0. Further, the difference between the actual valve lift Liftin_act and the corrected valve lift Liftin_mod become substantially equal to 0. As a result, the difference between the actual intake air amount Gcyl_act and the intake air amount Gcyl also becomes substantially equal to 0, so that almost no difference occurs between the target air-fuel ration KCMD and the actual air-fuel ratio KACT, from which it is known that a high accuracy of the air-fuel ratio control is secured.

Further, as shown in FIG. 48, when there is a modeling error, differently from the aforementioned FIG. 47 case where there is no modeling error, there occurs a slight difference between the estimated mechanism temperature Tlift_hat and the actual mechanism temperature Tlift, so that the FF correction value Dliftin_test develops a slight difference between the same and the difference Dliftin, and at the same time, the FB correction value Dliftin_fb becomes such a value as will correct the difference. More specifically, the corrected valve lift Liftin_mod becomes a value which is obtained by correcting the valve lift Liftin both by the FF correction value Dliftin_test and the FB correction value Dliftin_fb, whereby the difference between the actual valve lift Liftin_act and the corrected valve lift Liftin_mod becomes substantially equal to 0. As a result, the difference between the actual intake air amount Gcyl_act and the intake air amount Gcyl becomes substantially equal to 0, so that almost no difference occurs between the target air-fuel ratio KCMD and the actual air-fuel ratio KACT, either, from which it is known that a high accuracy of the air-fuel ratio control is secured. More specifically, even if there is an modeling error, the modeling error can be compensated for by the FB correction value Dliftin_fb, from which it is known that the same control accuracy as that obtained when there is no modeling error is secured.

As described above, according to the control apparatus 1 of the first embodiment, when the air-fuel ratio feedback control is not being executed, the corrected valve lift Liftin_mod is calculated by correcting the valve lift Liftin by the lift correction value Dliftin_comp corresponding to the FF correction value Dliftin_test, and the fuel injection amount TOUT and the ignition timing Iglog are calculated according to the corrected valve lift Liftin_mod. Further, the FF correction value Dliftin_test is calculated by calculating the estimated mechanism temperature Tlift_hat by the equation (14) based on thermodynamic model of the variable valve lift mechanism 50, and searching the map shown in FIG. 16 according to the estimated mechanism temperature Tlift_hat.

Therefore, even when the control accuracy of the air-fuel ratio is low due to non-execution of the air-fuel ratio feedback control, e.g. before the LAF sensor 24 has been activated, it is possible to calculate the intake air amount Gcyl while compensating fro a deviation of the valve lift Liftin from the actual value due to thermal expansion and contraction of the variable valve lift mechanism 50, and calculate the fuel injection amount TOUT and the ignition timing Iglog by using the thus calculated intake air amount Gcyl. As a result, it is possible to execute the air-fuel ratio control and the ignition timing control while compensating for the deviation of the intake air amount Gcyl due to thermal expansion and contraction of the variable valve lift mechanism 50, without using a special sensor for directly detecting the temperature or the degree of thermal expansion and contraction of the variable valve lift mechanism 50, and therefore, it is possible to make the engine 3 compact in size, increase the degree of freedom of design, and reduce manufacturing costs. In addition, compared with the case where the correction is carried out only using the engine coolant temperature, it is possible to improve the accuracy of calculating the corrected valve lift Liftin_mod, whereby the control accuracy can be improved.

In addition, the estimated mechanism temperature Tlift_hat is continuously calculated after the engine 3 has stopped and until a predetermined time period elapses before the variable valve lift mechanism 50 fully cools off, and it is estimated that the temperature will no longer vary. Therefore, it is possible to properly calculate the FF correction value Dliftin_test, even when the engine is restated before the predetermined time period elapses after the engine has stopped. This makes it possible to ensure a high calculation accuracy of the corrected valve lift Liftin_mod even when the engine is restarted.

Further, when the air-fuel ratio feedback control is being executed, the corrected valve lift Liftin_mod is calculated by correcting the valve lift Liftin by the lift correction value Dliftin_comp corresponding to the difference (Dliftin_test−Dliftin_fb) between the FF correction value and the FB correction value, and the FB correction value Dliftin_fb is calculated by calculating the estimated valve lift Liftin_hat according to the air-fuel ratio correction coefficient KAFD and the actual air-fuel ratio KACT, and being calculated according to the estimated valve lift Liftin_hat and the valve lift Liftin.

Now, during the air-fuel ratio feedback control, if the valve lift Liftin deviates from the actual value, the intake air amount Gcyl deviates from the proper value, so that the air-fuel ratio of the mixture deviates toward the lean side or the rich side with respect to the target air-fuel ratio KCMD, and the air-fuel ratio correction coefficient KAFD and the actual air-fuel ratio KACT reflect such a deviation of the air-fuel ratio. Therefore, the FB correction value Dliftin_fb is calculated according to the air-fuel ratio correction coefficient KAFD and the actual air-fuel ratio KACT, and the corrected valve lift Liftin_mod is calculated by correcting the valve lift Liftin using the lift correction value Dliftin_comp into which the FB correction value Dliftin_fb is factored. Therefore, the corrected valve lift Liftin_mod is calculated as a proper value in which the deviation between the valve lift Liftin and the actual value, i.e. the deviation of the intake air amount Gcyl is properly calculated.

As a result, even when the valve lift Liftin calculated based on the detection signal from the pivot angle sensor 25 deviates from the actual value due to a drift in the value of the detection signal from the pivot angle sensor 25, wear of components of the variable valve lift mechanism 50, attachment of stain, and play produced by aging, in addition to thermal expansion and contraction of the variable valve lift mechanism 50, it is possible to properly calculate the intake air amount Gcyl while compensating for the deviation. Therefore, during the air-fuel ratio feedback control, it is possible to carry out the air-fuel ratio control and the ignition timing control while compensating for the deviation of the intake air amount Gcyl caused by the thermal expansion and contraction of the variable valve lift mechanism 50 and other events, without using a special sensor or the like for directly detecting the temperature of the variable valve lift 50 or the thermal expansion and contraction of the same. This makes it possible to improve the control accuracy, make the engine 3 compact in size, increase the degree of freedom of design, and reduce manufacturing costs. More specifically, the FB correction value Dliftin_fb makes it possible to compensate for the deviation of the intake air amount Gcyl caused by events other than the thermal expansion and contraction, and even when there is a modeling error in the thermodynamic model, it is possible to compensate for the error whereby the control accuracy can be markedly improved.

In addition to this, even during the air-fuel ratio feedback control, the lift correction value Dliftin_comp is calculated as a value into which the FF correction value Dliftin_test is factored, and hence even when the capability of the FB correction value Dliftin_fb for compensating for the deviation of the intake air amount Gcyl is low e.g. at the start of the air-fuel ratio feedback control, it is possible to compensate for the deviation of the intake air amount Gcyl from the proper value caused by the thermal expansion and contraction using the FF correction value Dliftin_test, and hence even in such a condition, it is possible to secure the high control accuracy.

Further, the FB correction value Dliftin_fb is calculated by calculating the estimation error Elift as the difference [Liftin_hat(k)−Liftin(k−d)] between the estimated valve lift and the valve lift, calculating the statistically-processed value Elift_LS of the estimation error with the sequential statistical processing algorithm expressed by the equations (22) and (23), and performing the calculation with the response-specifying control algorithm expressed by the equations (24) and (25) such that the statistically-processed value Elift_LS becomes the minimum (i.e. becomes equal to 0). Thus, by using the statistically-processed value Elift_LS of the estimation error, even when the estimation error Elift becomes temporarily too large a value, it is possible to calculate the FB correction value Dliftin_fb while avoiding influence of the too large value. In addition, by using the response-specifying control algorithm, the FB correction value Dliftin_fb is calculated such that the statistically processing value Elift_LS, i.e. the estimation error Elift is gently exponentially reduced. From the above, it is possible to further improve the control accuracy.

Further, in the variable valve lift mechanism 50, as the valve lift Liftin is larger, the degree of deviation between the estimated valve lift Liftin_hat and the valve lift Liftin, i.e. the estimation error Elift tends to become larger. However, in the sequential statistical processing algorithm, the weighting gain P for weighting the difference Elift−Elift_LS is set to a smaller value as the valve lift Liftin is larger, and hence as the degree of deviation between the estimated valve lift Liftin_hat and the valve lift Liftin is larger, the weight of the estimation error Elift is set to a smaller value, whereby it is possible to enhance the calculation accuracy of the statistically processed value Elift_LS, i.e. the calculation accuracy of the FB correction value Dliftin_fb. This makes it possible to further enhance the control accuracy.

Further, when the two variable mechanisms are both normal, the first estimated intake air amount Gcyl_vt calculated according to the corrected valve lift Liftin_mod is selected as the intake air amount Gcyl, and otherwise, the second estimated intake air amount Gcyl_afm calculated based on the detection signal from the air-flow sensor 22 is selected as the intake air amount Gcyl, and hence in spite of whether or not the two variable mechanism are faulty or not, it is possible to properly carry out the air-fuel ratio control and the ignition timing control.

Although the first embodiment is an example in which the engine coolant temperature TW and the oil temperature Toil are used as the temperature parameters indicative of the temperature condition of the engine 3, the temperature parameter is not limited to these, but it may be any suitable temperature insofar as it represents a temperature condition of the engine 3. For example, cylinder block temperature or exhaust gas temperature may be used as the temperature parameter.

Further, although the first embodiment is an example in which the first estimated intake air amount Gcyl_vt is used as the load parameter indicative of load on the engine 3, the load parameter is not limited to this, but it may be any suitable load representative of the load on the engine. For example, as the load parameter, the second estimated intake air amount Gcyl_afm, estimated torque which the engine is estimated to generate, the engine speed NE, or intake pipe pressure may be used.

Further, the first embodiment is an example in which the estimated valve lift Liftin_hat is calculated according to both the actual air-fuel ratio KACT and the air-fuel ratio indicator value KAF, the estimated valve lift Liftin_hat may be calculated according to one of the actual air-fuel ratio KACT and the air-fuel ratio indicator value KAF. In this case, for example, the error estimation coefficient KEGCYL may be calculated e.g. by searching a map according to one of the actual intake air amount KACT and the air-fuel ratio indicator value KAF.

On the other hand, although the first embodiment is an example in which the estimation error Elift is set to the difference [Liftin_hat(k) Liftin(k−d)] between the estimated valve lift and the valve lift, this is not limitative, but inversely, the estimation error Elift may be set to the difference [Liftin(k−d)−Liftin_hat(k)] between the valve lift and the estimated valve lift.

Further, although the first embodiment is an example in which the control apparatus according to the invention is applied to a control apparatus which carries out air-fuel ratio control (i.e. fuel injection control) and ignition timing control, this is not limitative, but it may be applied to any apparatuses and devices which carry out various control processes, such as the intake air amount control of internal combustion engines. For example, in the case of the intake air amount control, the intake air amount Gcyl calculated based on the corrected valve lift Liftin_mod may be controlled via the variable intake valve-actuating mechanism 40 such that it is caused to converge to a target value.

Now, a description will be given of a control apparatus 1A according to a second embodiment of the present invention with reference to FIG. 50. The control apparatus 1A is distinguished from the above-described control apparatus 1 according to the first embodiment in that the corrected valve lift-calculating section 120 of the air-fuel ratio controller 100 is replaced by a corrected valve lift-calculating section 220 shown in FIG. 50, and hence the following description will be given of the corrected valve lift-calculating section 220. It should be noted that the corrected valve lift-calculating section 220 corresponds to the estimated mechanism temperature-calculating means and the correction means.

Figure 50:
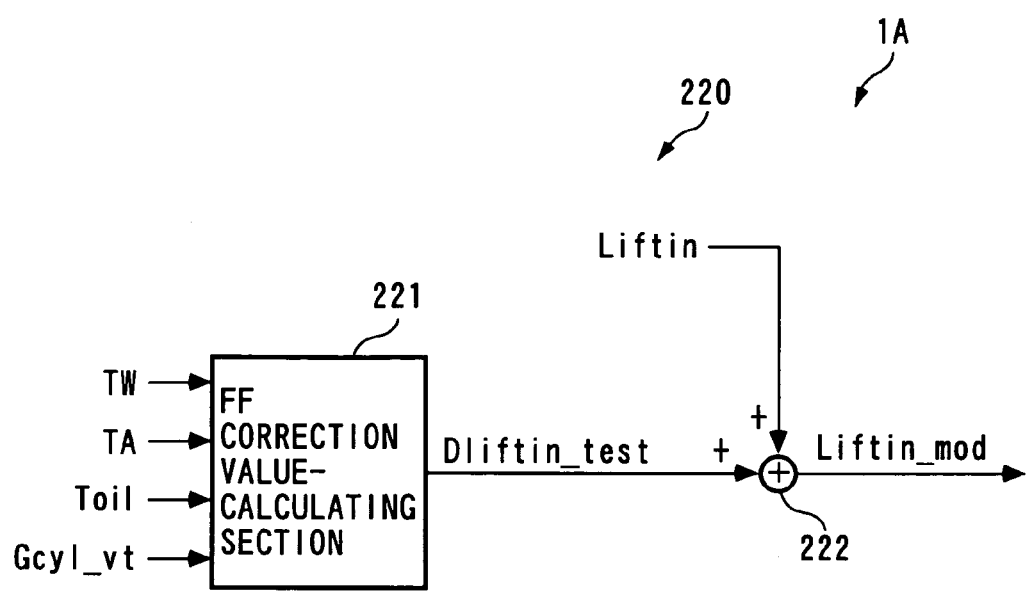
FIG. 50 is a schematic block diagram of a corrected valve lift-calculating section of a control apparatus according to a second embodiment of the present invention.

The corrected valve lift-calculating section 220 corresponds to a construction as shown in FIG. 50 in which the FB correction value-calculating section 130, the air-fuel ratio control-determining section 134, and the correction value-selecting section 135 are omitted from the corrected valve lift-calculating section 120 described above, and is comprised of an FF correction value-calculating section 221 and an addition element 222.

The FF correction value-calculating section 221 calculates the FF correction value Dliftin_test by the same method as that of the FF correction value-calculating section 131. That is, by the aforementioned equation (14), the estimated mechanism temperature Tlift_hat is calculated, and by searching the map in FIG. 16 according thereto, the FF correction value Dliftin_test is calculated.

Then, the addition element 222 calculates the corrected valve lift Liftin_mod by the following equation (43):

$$\text{Liftin\_mod}(k) = \text{Liftin}(k) + \text{Dliftin\_test}(k) \quad (43)$$

As described above, the corrected valve lift-calculating section 220 calculates the corrected valve lift Liftin_mod as the sum Liftin+Dliftin_test of the valve lift and the FF correction value.

Figure 51:
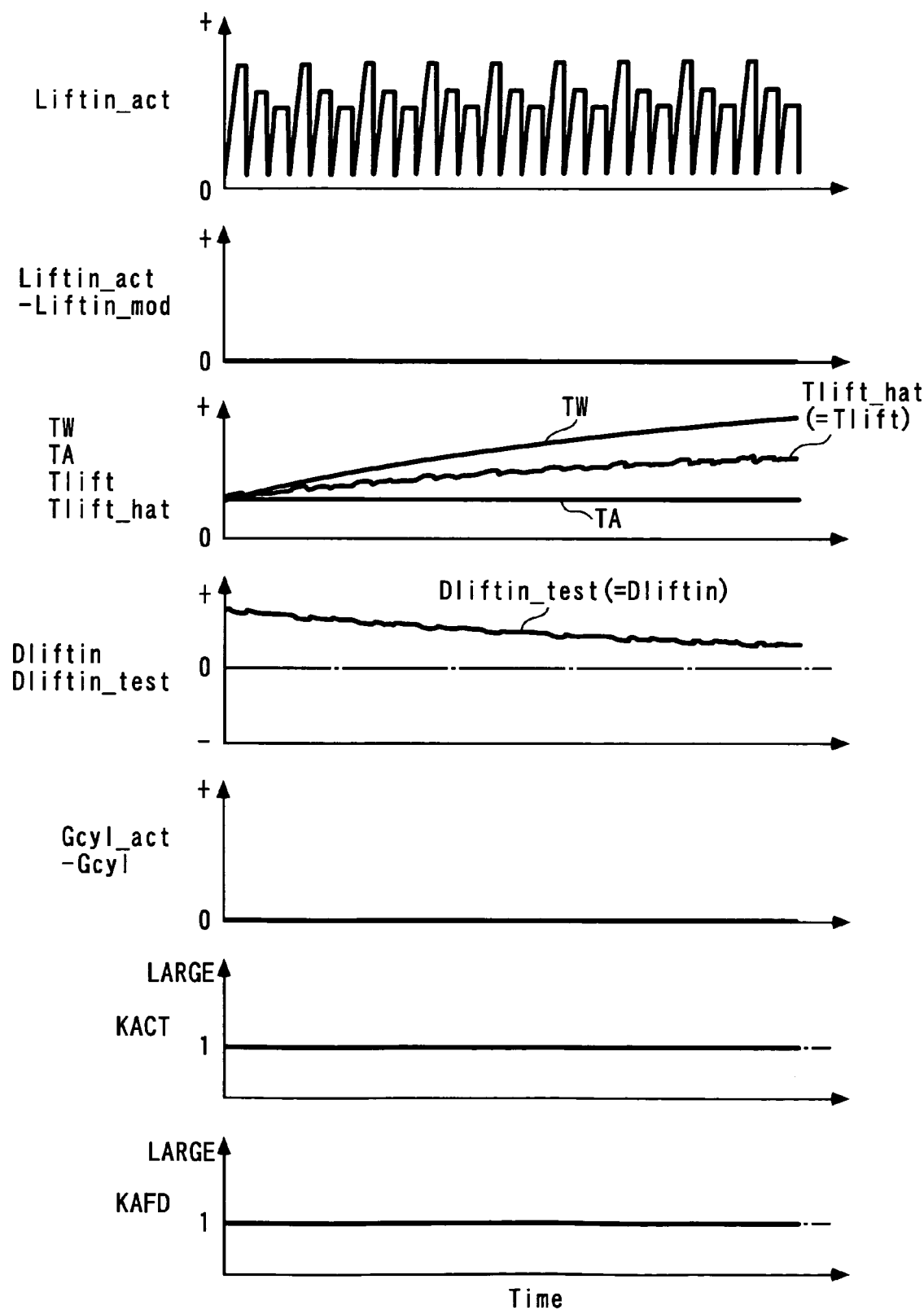
FIG. 51 is a timing diagram showing an example of a simulation of air-fuel ratio control and variable mechanism control executed by the control apparatus according to the second embodiment (without any modeling error)
Figure 52:
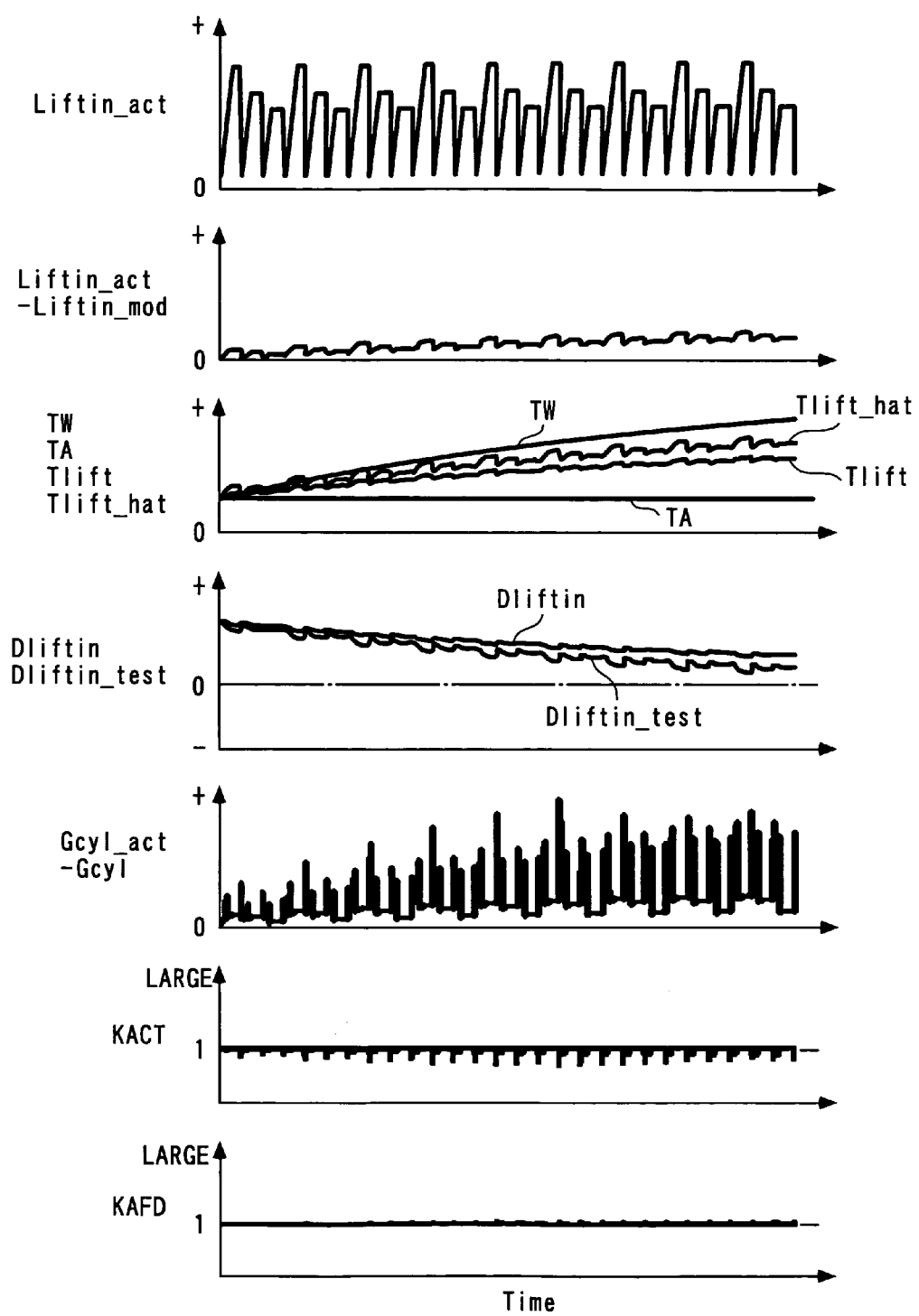
FIG. 52 is a timing diagram showing an example of a simulation of air-fuel ratio control and variable mechanism control executed by the control apparatus according to the second embodiment (with a modeling error)

Next, a description will be given of the control results obtained by the control apparatus 1A according to the second embodiment. FIGS. 51 and 52 show examples of the control results obtained by the control apparatus 1A according to the second embodiment when the target air-fuel ratio KCMD is set to a value of 1.0 corresponding to the stoichiometric air-fuel, and particularly, FIG. 51 shows an example of the control results in which there is no modeling error in the aforementioned equation (14), while FIG. 52 shows an example of the control results in which there is a modeling error in the same.

First, referring to FIG. 51, when there is no modeling error, as described hereinabove, the estimated mechanism temperature Tlift_hat becomes equal to the actual mechanism temperature Tlift, whereby the FF correction value Dliftin_test becomes equal to the difference Dliftin. This causes the difference between the actual valve lift Liftin_act and the corrected valve lift Liftin_mod to become substantially equal to 0. As a result, the difference between the actual intake air amount Gcyl_act and the intake air amount Gcyl also becomes substantially equal to 0, so that almost no difference occurs between the target air-fuel ration KCMD and the actual air-fuel ratio KACT, from which it is known that a high accuracy of the air-fuel ratio control is secured.

On the other hand, as shown in FIG. 52, when there is a modeling error, differently from the aforementioned FIG. 51 case where there is no modeling error, there occurs a difference between the estimated mechanism temperature Tlift_hat and the actual mechanism temperature Tlift, so that the FF correction value Dliftin_test develops a difference between the same and the difference Dliftin, whereby there occurs a difference between actual valve lift Liftin_act and the corrected valve lift Liftin_mod.

As a result, a spikelike difference also occurs between the actual intake air amount Gcyl_act and the intake air amount Gcyl, so that a spikelike difference also occurs between the target air-fuel ratio KCMD and the actual air-fuel ratio KACT, from which it is known that the accuracy of control of the air-fuel ratio control is slightly degraded compared with the case where there is no modeling error. That is, it is known that when there is a modeling error, similarly to the control apparatus 1 according to the first embodiment, a higher control accuracy can be attained by using both the FF correction value Dliftin_test and the FB correction value Dliftin_fb than not.

Further, when compared with the case in which the valve lift Liftin shown in FIG. 49 is not corrected but directly used, it is known that the accuracy of the air-fuel ratio control is improved by using the FF correction value Dliftin_test as in the present embodiment.

As described, according to the control apparatus 1A according to the second embodiment, the corrected valve lift Liftin_mod is calculated by correcting the valve lift Liftin using the FF correction value Dliftin_test, and hence as described hereinabove, it is possible to carry out the air-fuel ratio control and the ignition timing control while compensating for the deviation of the valve lift Liftin from the actual value thereof caused by thermal expansion and contraction of the variable valve lift mechanism 50 as described hereinabove. That is, the air-fuel ratio control and the ignition timing control can be executed while compensating for the deviation of the intake air amount Gcyl caused by the thermal expansion and contraction of the variable valve lift mechanism 50 without using a special sensor for directly detecting the temperature or the degree of expansion and contraction of the variable valve lift mechanism 50, and hence, it is possible to make the engine 3 compact in size, increase the degree of freedom of design, and reduce manufacturing costs. In addition, compared with the conventional cases where the correction is performed using only the engine coolant temperature, it is possible to enhance the calculation accuracy of the corrected valve lift Liftin_mod, whereby the control accuracy can be improved.

Hereafter, a description will be given of a control apparatus 1B according to a third embodiment of the present invention with reference to FIG. 53. The control apparatus 1B is distinguished from the control apparatus 1 according to the first embodiment, in that the corrected valve lift-calculating section 120 of the above-described air-fuel ratio controller 100 is replaced by a corrected valve lift-calculating section 320 shown in FIG. 53. The following description will be given mainly of the corrected valve lift-calculating section 320. It should be noted that the corrected valve lift-calculating section 320 corresponds to the correction means, the operating state parameter estimated value-calculating means, the correction amount-calculating means, and the corrected parameter-calculating means.

The corrected valve lift-calculating section 320 corresponds to a construction as shown in FIG. 53 in which the FF correction value-calculating section 131, the air-fuel ratio control-determining section 134, the correction value-selecting section 135, etc. are omitted from the corrected valve lift-calculating section 120 of the first embodiment, and is comprised of an FB correction value-calculating section 321, and a subtractor element 322.

The FB correction value-calculating section 321 calculates the FB correction value Dliftin_fb by the same method as that of the FB correction value-calculating section 130. That is, as described hereinabove, the third estimated intake air amount Gcyl_hat is calculated according to the engine speed NE, the cam phase Cain, the valve lift Liftin, the actual air-fuel ratio KACT, and the air-fuel ratio indicator value KAF, and the estimated valve lift Liftin_hat is calculated according to the third estimated intake air amount Gcyl_hat, the engine speed NE, and the cam phase Cain. Then, based on the estimated valve lift Liftin_hat and the valve lift Liftin, the FB correction value Dliftin_fb is calculated by the aforementioned equations (21) to (25).

Then, the subtraction element 322 calculates the corrected valve lift Liftin_mod by the following equation (44):

$$\text{Liftin\_mod}(k) = \text{Liftin}(k) - \text{Dliftin\_fb}(k) \quad (44)$$

As described above, the corrected valve lift-calculating section 320 calculates the corrected valve lift Liftin_mod as a value (Liftin−Dliftin_fb) obtained by subtracting the FB correction value from the valve lift.

Figure 54:
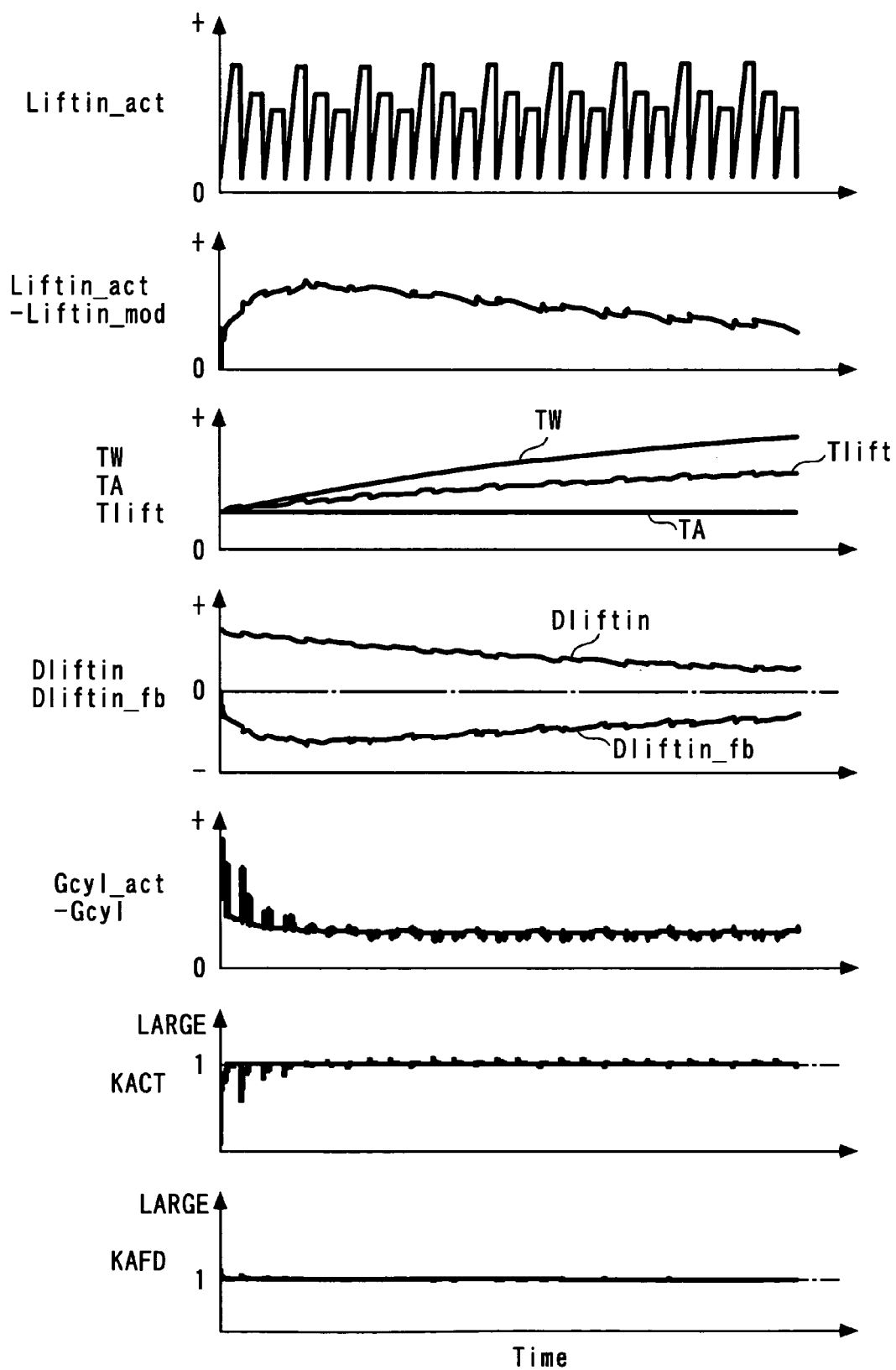
FIG. 54 is a timing diagram showing an example of a simulation of air-fuel ratio control and variable mechanism control executed by the control apparatus according to the third embodiment.

Next, a description will be given of the control results obtained by the control apparatus 1B according to the third embodiment configured as described above. FIG. 54 shows an example of the control results obtained by the control apparatus 1B according to the third embodiment in which the target air-fuel ratio KCMD is set to a value of 1.0 corresponding to the stoichiometric air-fuel ratio.

As is clear from FIG. 54, immediately after the start of the control, the absolute value of the FB correction value Dliftin_fb becomes smaller than the difference Dliftin, and hence the difference between the actual valve lift Liftin_act and the corrected valve lift Liftin_mod increases. As a result, there also occurs a slight difference between the actual intake air amount Gcyl_act and the intake air amount Gcyl, so that a spikelike difference occurs between the target air-fuel ratio KCMD and the actual air-fuel ratio KACT, from which it is known that the accuracy of the air-fuel ration control is slightly degraded.

On the other hand, as the control operation proceeds, the absolute value of the FB correction value Dliftin_fb becomes equal to the difference Dliftin, and hence the difference between the actual valve lift Liftin_act and corrected valve lift Liftin_mod decreases, so that the difference between the actual intake air amount Gcyl_act and the intake air amount Gcyl also decreases, and hence there occurs almost no difference between the target air-fuel ratio KCMD and the actual air-fuel ratio KACT, from which it is known that a high accuracy of the air-fuel ratio control can be secured.

Further, when comparison is made between FIG. 54 and FIGS. 47 and 48, referred to hereinbefore, it is known that the use of both the FF correction value Dliftin_test and the FB correction value Dliftin_fb as in the control apparatus 1 according to the first embodiment can ensure a higher control accuracy even immediately after the start of the control than when only the FB correction value Dliftin_fb is used.

As described above, according to the control apparatus 1B of the third embodiment, the corrected valve lift Liftin_mod is calculated by correcting the valve lift Liftin using the FB correction value Dliftin_fb. Therefore, as described above, the corrected valve lift Liftin_mod is calculated as a proper value in which the deviation between the valve lift Liftin and the actual value, i.e. the deviation of the intake air amount Gcyl is properly corrected. As a result, even when the valve lift Liftin calculated based on the detection signal from the pivot angle sensor 25 deviates from the actual value due to a drift in the value of the detection signal from the pivot angle sensor 25, wear of components of the variable valve lift mechanism 50, attachment of stain, and play produced by aging, in addition to the thermal expansion and contraction of the variable valve lift mechanism 50, it is possible to properly calculate the intake air amount Gcyl while compensating for such a deviation. Therefore, during the air-fuel ratio feedback control, it is possible to carry out the air-fuel ratio control and the ignition timing control while compensating for the deviation of the intake air amount Gcyl caused by the thermal expansion and contraction of the variable valve lift mechanism 50 and other events, without using a special sensor or the like for directly detecting the temperature or the degree of thermal expansion and contraction of the variable valve lift 50. This makes it possible to improve the control accuracy, make the engine 3 compact in size, increase the degree of freedom of design, and reduce manufacturing costs.

It is further understood by those skilled in the art that the foregoing are preferred embodiments of the invention, and that various changes and modifications may be made without departing from the spirit and scope thereof.

What is claimed is:

1. A control apparatus for an internal combustion engine in which an amount of intake air drawn into a cylinder is changed by a variable intake mechanism thereof, comprising:

estimated mechanism temperature-calculating means for calculating an estimated value of temperature of the variable intake mechanism as an estimated mechanism temperature, based on a thermodynamic model formed by thermodynamically modeling the variable intake mechanism;

operating state parameter-detecting means for detecting an operating state parameter indicative of an operating state of the variable intake mechanism;

correction means for correcting a detected value of the operating state parameter according to the estimated mechanism temperature to thereby calculate a corrected parameter; and control means for controlling the engine according to the corrected parameter.

2. A control apparatus as claimed in claim 1, wherein the thermodynamic model is a model which defines a relationship between the estimated mechanism temperature, a temperature parameter indicative of a temperature condition of the engine, atmosphere temperature, and a load parameter indicative of load on the engine.

3. A control apparatus as claimed in claim 1 or 2, wherein said control means controls at least one of the amount of intake air of the engine, an air-fuel ratio of the engine, an amount of fuel supplied to the engine, and ignition timing of the engine.

4. A control apparatus for an internal combustion engine in which an amount of intake air drawn into a cylinder is changed by a variable intake mechanism thereof, comprising:
operating state parameter-detecting means for detecting an operating state parameter indicative of an operating state of the variable intake mechanism;
air-fuel ratio parameter-detecting means for detecting an air-fuel ratio parameter indicative of an air-fuel ratio of exhaust gases flowing through an exhaust passage of the engine;
target air-fuel ratio-calculating means for calculating a target air-fuel ratio which serves as a target of air-fuel ratio control of a mixture supplied to the engine;
air-fuel ratio control parameter-calculating means for calculating an air-fuel ratio control parameter for controlling the air-fuel ratio of the mixture such that the air-fuel ratio becomes equal to the target air-fuel ratio;
correction means for correcting a detected value of the operating state parameter according to the air-fuel ratio control parameter and the air-fuel ratio parameter to thereby calculate a corrected parameter; and
fuel amount-determining means for determining an amount of fuel to be supplied to the engine according to the corrected parameter and the air-fuel ratio control parameter.

5. A control apparatus for an internal combustion engine in which an amount of intake air drawn into a cylinder is changed by a variable intake mechanism thereof, comprising:
operating state parameter-detecting means for detecting an operating state parameter indicative of an operating state of the variable intake mechanism;
air-fuel ratio parameter-detecting means for detecting an air-fuel ratio parameter indicative of an air-fuel ratio of exhaust gases flowing through an exhaust passage of the engine;
target air-fuel ratio-calculating means for calculating a target air-fuel ratio which serves as a target of air-fuel ratio control of a mixture supplied to the engine;
air-fuel ratio control means for controlling an air-fuel ratio of the mixture supplied to the engine according to the air-fuel ratio parameter such that the air-fuel ratio becomes equal to the target air-fuel ratio;
correction means for correcting a detected value of the operating state parameter according to an air-fuel ratio control parameter indicative of a state of control of the air-fuel ratio by said air-fuel ratio control means and the air-fuel ratio parameter to thereby calculate a corrected parameter; and
ignition timing-determining means for determining ignition timing of the mixture supplied to the engine according to the corrected parameter.

6. A control apparatus as claimed in claim 4 or 5, further comprising estimated mechanism temperature-calculating means for calculating an estimated value of temperature of the variable intake mechanism as an estimated mechanism temperature, based on a thermodynamic model formed by thermodynamically modeling the variable intake mechanism, and
wherein said correction means calculates the corrected parameter further according to the estimated mechanism temperature.

7. A control apparatus as claimed in claim 6, wherein the thermodynamic model is a model which defines a relationship between the estimated mechanism temperature, a temperature parameter indicative of a temperature condition of the engine, atmosphere temperature, and a load parameter indicative of load on the engine.

8. A control apparatus for an internal combustion engine in which an amount of intake air drawn into a cylinder is changed by a variable intake mechanism thereof, comprising:
operating state parameter-detecting means for detecting an operating state parameter indicative of an operating state of the variable intake mechanism;
air-fuel ratio parameter-detecting means for detecting an air-fuel ratio parameter indicative of an air-fuel ratio of exhaust gases flowing through an exhaust passage of the engine;
target air-fuel ratio-calculating means for calculating a target air-fuel ratio which serves as a target of air-fuel ratio control of a mixture supplied to the engine;
air-fuel ratio control parameter-calculating means for calculating an air-fuel ratio control parameter for controlling the air-fuel ratio of the mixture such that the air-fuel ratio becomes equal to the target air-fuel ratio;
operating state parameter estimated value-calculating means for calculating an estimated value of the operating state parameter according to at least one of the air-fuel ratio parameter and the air-fuel ratio control parameter;
correction amount-calculating means for calculating a correction amount according to the estimated value of the operating state parameter and a detected value of the operating state parameter;
corrected parameter-calculating means for correcting the detected value of the operating state parameter by the correction amount to thereby calculate a corrected parameter; and
fuel amount-determining means for determining an amount of fuel to be supplied to the engine according to the corrected parameter and the air-fuel ratio control parameter.

9. A control apparatus as claimed in claim 8, further comprising estimated mechanism temperature-calculating means for calculating an estimated value of temperature of the variable intake mechanism as an estimated mechanism temperature, based on a thermodynamic model formed by thermodynamically modeling the variable intake mechanism, and
wherein said correction amount-calculating means calculates the correction amount further according to the estimated mechanism temperature.

10. A control apparatus as claimed in claim 9, wherein the thermodynamic model is a model which defines a relationship between the estimated mechanism temperature, a temperature parameter indicative of a temperature condition of the engine, atmosphere temperature, and a load parameter indicative of load on the engine.

11. A control apparatus for an internal combustion engine in which an amount of intake air drawn into a cylinder is changed by a variable intake mechanism thereof, comprising:
operating state parameter-detecting means for detecting an operating state parameter indicative of an operating state of the variable intake mechanism;

air-fuel ratio parameter-detecting means for detecting an air-fuel ratio parameter indicative of an air-fuel ratio of exhaust gases flowing through an exhaust passage of the engine;

target air-fuel ratio-calculating means for calculating a target air-fuel ratio which serves as a target of air-fuel ratio control of a mixture supplied to the engine;

air-fuel ratio control means for controlling an air-fuel ratio of the mixture supplied to the engine according to the air-fuel ratio parameter such that the air-fuel ratio becomes equal to the target air-fuel ratio;

operating state parameter estimated value-calculating means for calculating an estimated value of the operating state parameter according to at least one of an air-fuel ratio control parameter indicative of a state of control of the air-fuel ratio by said air-fuel ratio control means and the air-fuel ratio parameter;

correction amount-calculating means for calculating a correction amount according to the estimated value of the operating state parameter and a detected value of the operating state parameter;

corrected parameter-calculating means for correcting the detected value of the operating state parameter by the correction amount to thereby calculate a corrected parameter; and ignition timing-determining means for determining ignition timing of the mixture supplied to the engine according to the corrected parameter.

12. A control apparatus as claimed in claim 11, further comprising estimated mechanism temperature-calculating means for calculating an estimated value of temperature of the variable intake mechanism as an estimated mechanism temperature, based on a thermodynamic model formed by thermodynamically modeling the variable intake mechanism, and wherein said correction amount-calculating means calculates the correction amount further according to the estimated mechanism temperature.

13. A control apparatus as claimed in claim 12, wherein the thermodynamic model is a model which defines a relationship between the estimated mechanism temperature, a temperature parameter indicative of a temperature condition of the engine, atmosphere temperature, and a load parameter indicative of load on the engine.

14. A control apparatus as claimed in any one of claims 8 to 13, wherein said correction amount-calculating means calculates a difference between the estimated value of the operating state parameter and the detected value of the operating state parameter as an estimation error, and calculates the correction amount with a predetermined algorithm to which is applied a response-specifying control algorithm, such that the estimation error becomes minimum.

15. A control apparatus as claimed in any one of claims 8 to 13, wherein said correction amount-calculating means calculates a difference between the estimated value of the operating state parameter and the detected value of the operating state parameter as an estimation error, calculates a statistically processed value of the estimation error by subjecting the estimation error to predetermined sequential statistical processing, and calculates the correction amount with a predetermined algorithm, such that the statistically-processed value of the estimation error becomes minimum.

16. A control apparatus as claimed in claim 15, wherein the variable intake mechanism is a variable valve lift mechanism that changes the amount of intake air by changing a lift of intake valves of the engine, wherein the operating state parameter is the lift of the intake valves, wherein an algorithm of the predetermined sequential statistical processing is a weighted sequential statistical processing algorithm which weights the estimation error with a weighting gain, and wherein the weighting gain is set to a smaller value as the detected value of the lift of the intake valves is larger.

* * * * *